United States Patent
Tapscott et al.

(10) Patent No.: US 12,458,668 B2
(45) Date of Patent: Nov. 4, 2025

(54) METHODS FOR TREATING FACIOSCAPULOHUMERAL MUSCULAR DYSTROPHY

(71) Applicant: FRED HUTCHINSON CANCER CENTER, Seattle, WA (US)

(72) Inventors: Stephen J. Tapscott, Seattle, WA (US); Sean Shadle, Seattle, WA (US); Amy Campbell, Seattle, WA (US)

(73) Assignee: Fred Hutchinson Cancer Center, Seattle, WA (US)

( * ) Notice: Subject to any disclaimer, the term of this patent is extended or adjusted under 35 U.S.C. 154(b) by 1186 days.

(21) Appl. No.: 16/966,823

(22) PCT Filed: Feb. 1, 2019

(86) PCT No.: PCT/US2019/016315
§ 371 (c)(1),
(2) Date: Jul. 31, 2020

(87) PCT Pub. No.: WO2019/152820
PCT Pub. Date: Aug. 8, 2019

(65) Prior Publication Data
US 2021/0038653 A1    Feb. 11, 2021

Related U.S. Application Data

(60) Provisional application No. 62/625,881, filed on Feb. 2, 2018.

(51) Int. Cl.
*A61K 35/34* (2015.01)
*A61K 38/17* (2006.01)
*C12N 15/113* (2010.01)

(52) U.S. Cl.
CPC .......... *A61K 35/34* (2013.01); *A61K 38/1709* (2013.01); *C12N 15/113* (2013.01)

(58) Field of Classification Search
None
See application file for complete search history.

(56) References Cited

U.S. PATENT DOCUMENTS

| | | | |
|---|---|---|---|
| 9,814,728 B2 * | 11/2017 | Sverdrup | A61K 31/517 |
| 2010/0292348 A1 | 11/2010 | Zhou et al. | |
| 2013/0288976 A1 | 10/2013 | van der Maarel et al. | |
| 2015/0087636 A1 * | 3/2015 | Sverdrup | A61K 31/4745 514/266.3 |
| 2015/0301067 A1 * | 10/2015 | Miller | G01N 33/5023 435/7.1 |
| 2018/0016577 A1 | 1/2018 | Dumonceaux et al. | |

FOREIGN PATENT DOCUMENTS

| | | |
|---|---|---|
| WO | 2016/124793 A1 | 8/2016 |
| WO | 2017201585 A1 | 11/2017 |
| WO | 2019/071147 A1 | 4/2019 |

OTHER PUBLICATIONS

Sacconi et al., Biochimicet Biphysica Acta, 1852: 607-614 (Year: 2015).*
Powel et al., Frontiers in Pharmacology 12: 1-13 (Year: 2021).*
Himeda et al., J of Personalized Medicine 12: 865 (Year: 2022).*
Brown, Elvin E., "ATP-Dependent Chromatin Remodeling Complexes in Xenopus Development", Thesis Presented to the Faculty of the University of Alaska Fairbanks, Dec. 2010, 99 pages.
European Patent Office: Extended European Search Report for EP Application No. 19748161.7 dated Nov. 9, 2021; 11 pages.
Ansseau et al., "Antisense Oligonucleotides Used to Target the DUX4 mRNA as Therapeutic Approaches in FaciosScapuloHumeral Muscular Dystrophy (FSHD)"; Genes, vol. 8, No. 93, Mar. 3, 2017; 21 pages.
Lemmers et al., "Deep characterization of a common D4Z4 variant identifies biallelic DUX4 expression as a modifier for disease penetrance in FSHD2"; European Journal of Human Genetics, vol. 26, No. 1, Nov. 21, 2017; 13 pages.
Jin et al., "MBD3L2 Interacts with MBD3 and Components of the NuRD Complex and can Oppose MBD2-MeCP1-mediated Methylation Silencing"; Journal of Biological Chemistry, vol. 280, No. 13, Apr. 1, 2005; 10 pages.
Desimone, et al., "Facioscapulohumeral Muscular Dystrophy"; Comprehensive Physiology, vol. 7, Sep. 12, 2017; pp. 1229-1279.
He et al., "Predicting siRNA efficacy based on multiple selective siRNA representations and their combination at score level," Nature Scientific Reports, vol. 7, pp. 1-13 (2017). [DOI: 10.1038/srep44836].
Jiang et al., "MBD3L1 and MBD3L2, Two New Proteins Homologous to the Methyl-CpG-Binding Proteins MBD2 and MBD3: Characterization of MBD3L1 as a Testis-Specific Transcriptional Repressor," Genomics, vol. 80, Issue 6, pp. 621-629 (Dec. 2002).

* cited by examiner

*Primary Examiner* — Phuong Huynh
(74) *Attorney, Agent, or Firm* — Schwabe, Williamson & Wyatt PC

(57) ABSTRACT

Disclosed herein are methods of treating facioscapulohumeral muscular dystrophy (FSHD). In an example, a method of treatment includes administering to a subject an agent that increases NuRD and/or CAF-1 complex repression of DUX4, thereby reducing or inhibiting one or more signs or symptoms associated with muscular dystrophy. In other examples, the treatment method includes administering an agent that increases the activity and/or expression of NuRD/MBD2 and/or MBD1/CAF-1 complex members, thereby reducing or inhibiting one or more signs or symptoms associated with muscular dystrophy. Also disclosed is a method of treatment of FSHD including administering to a subject an effective amount of an MBD3L protein inhibitor to treat one or more signs or symptoms associated with FSHD.

4 Claims, 32 Drawing Sheets
Specification includes a Sequence Listing.

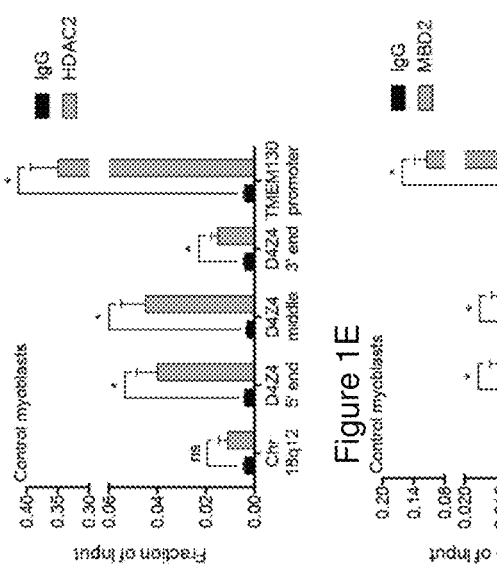
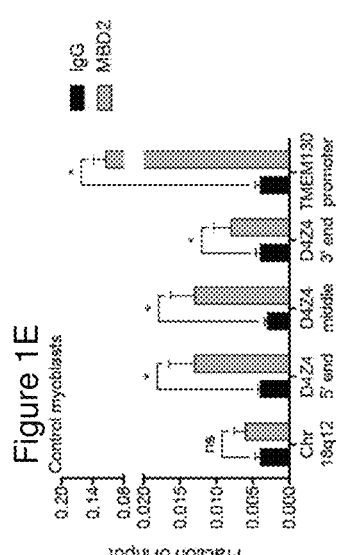
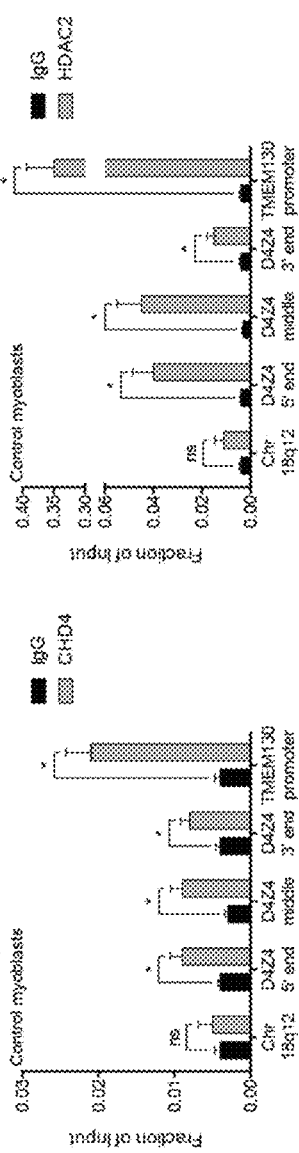
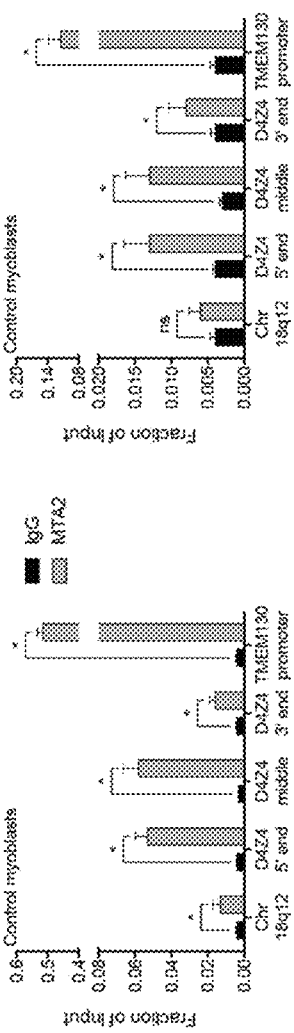
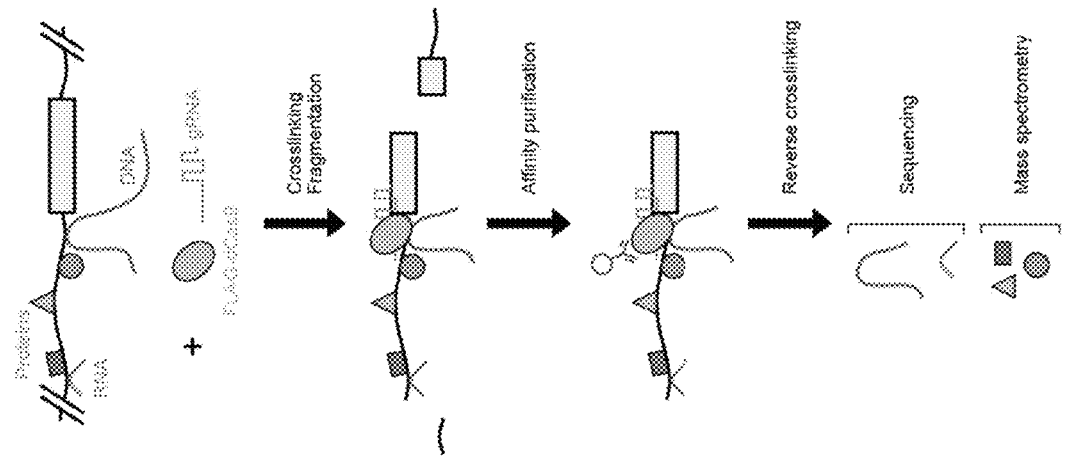

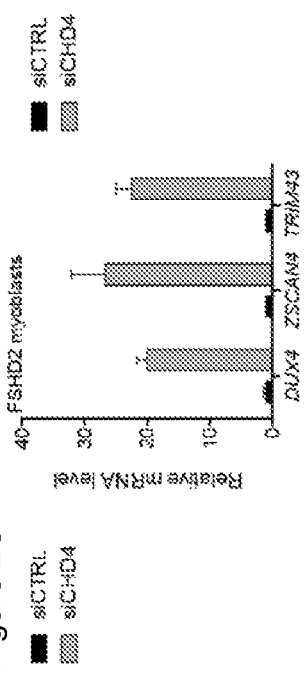
Figure 2E
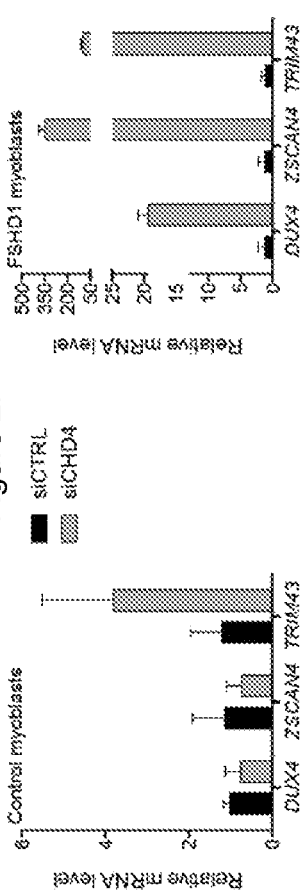
Figure 2F
Figure 2G
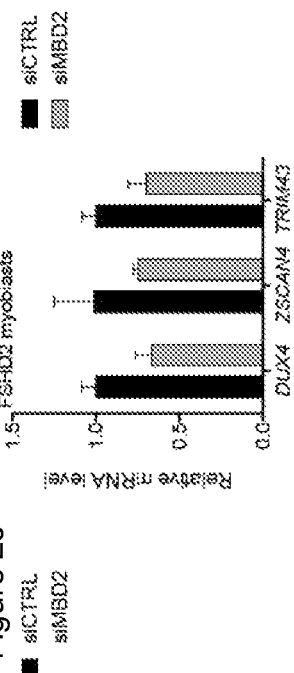
Figure 2H
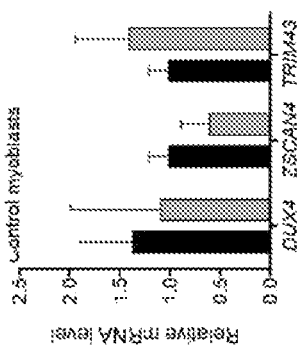
Figure 2I
Figure 2J

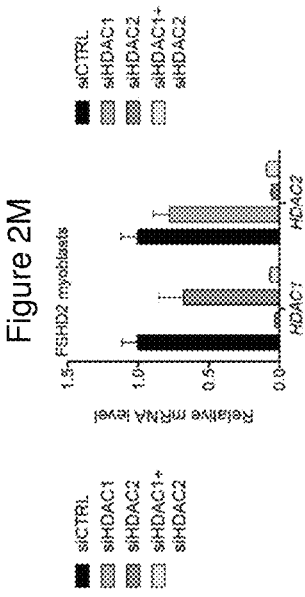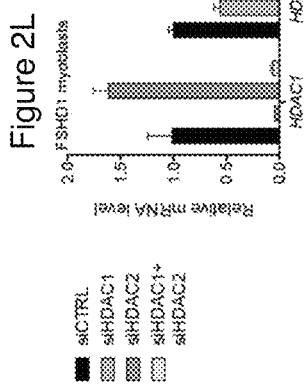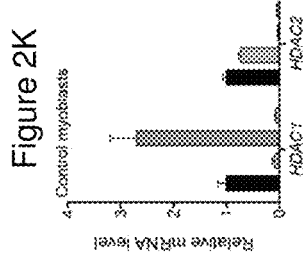

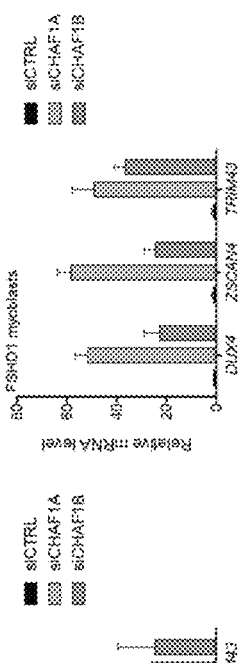
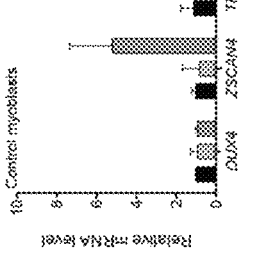
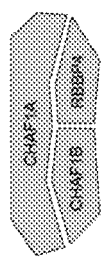
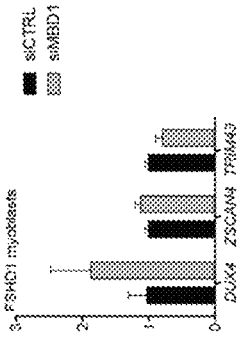
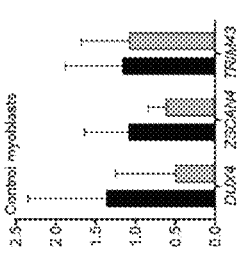
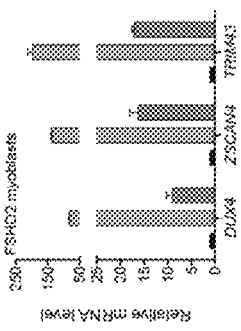

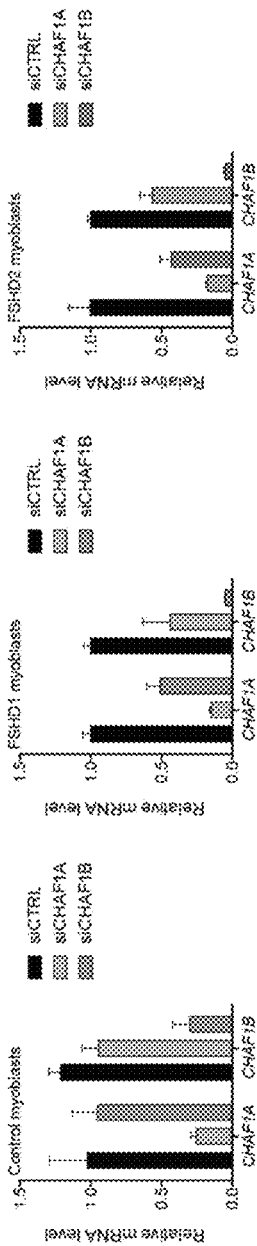

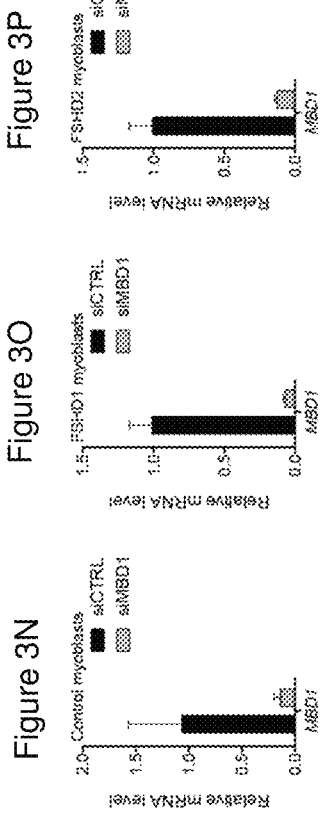

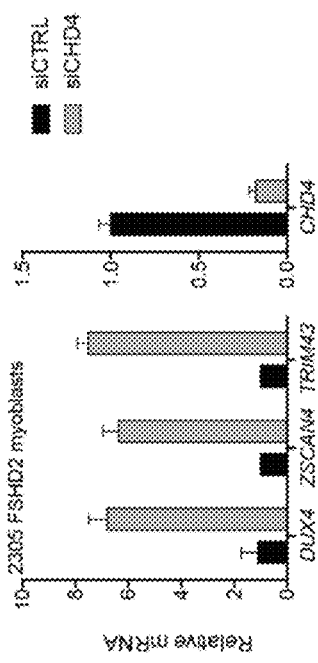
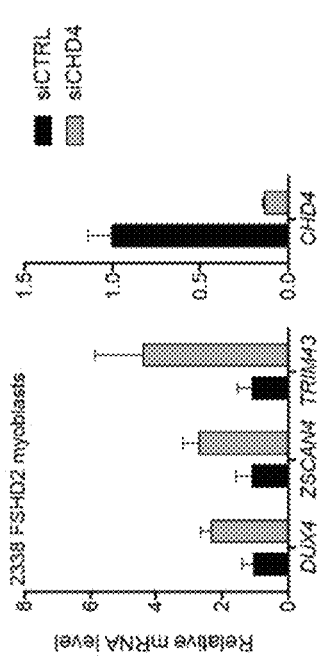
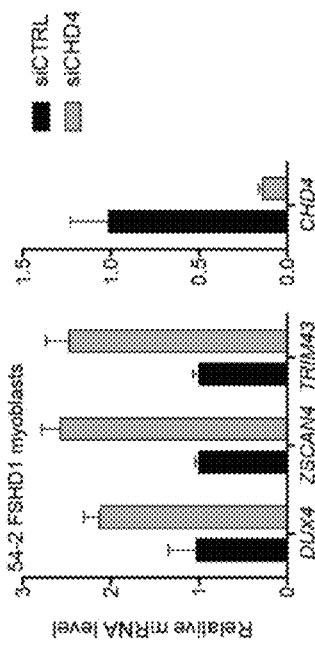
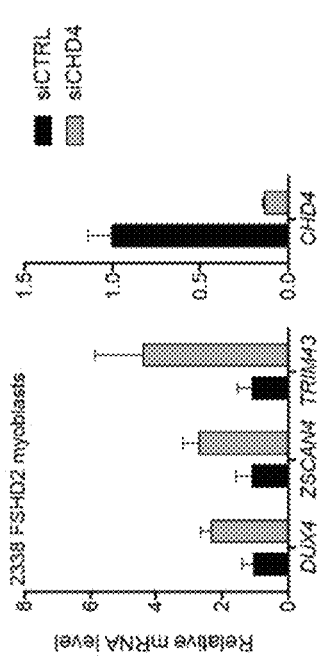
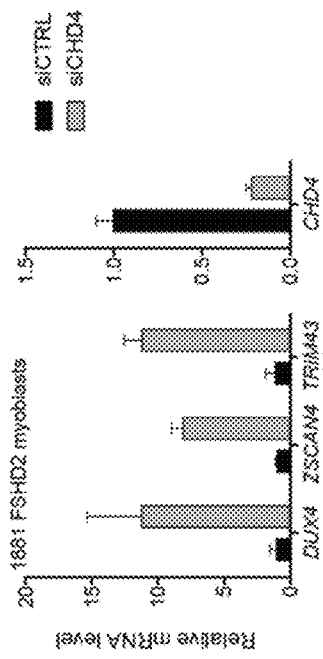

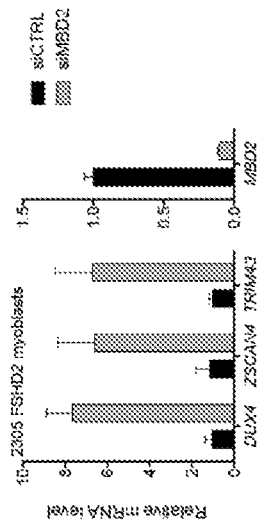
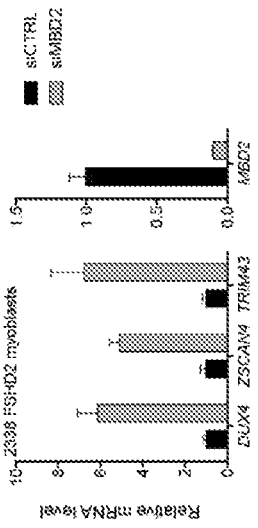
Figure 3Y　　Figure 3Z
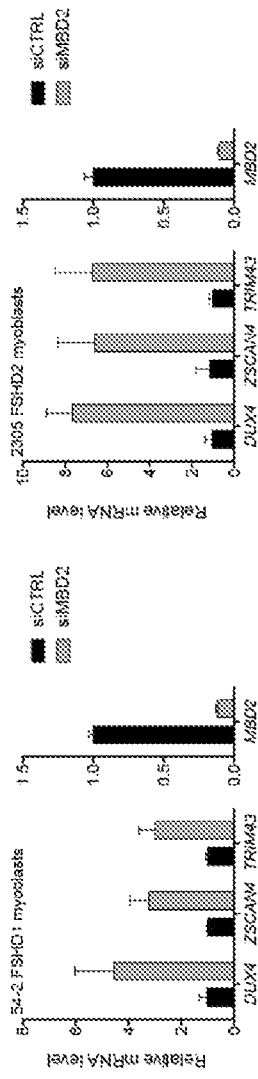
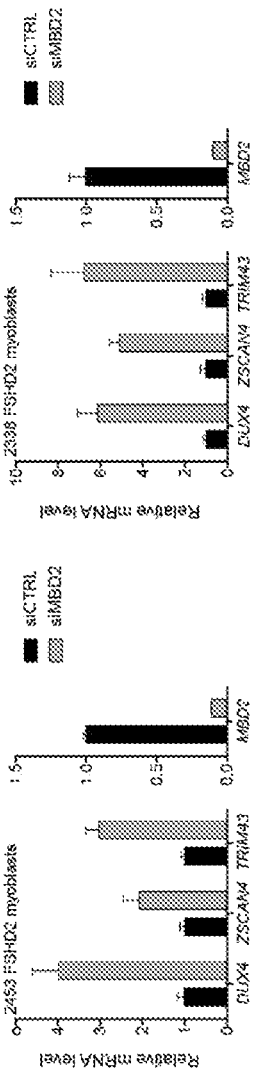
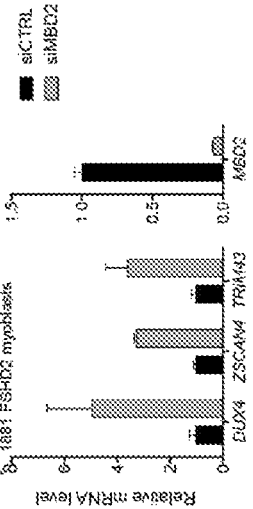
Figure 3AA　　Figure 3BB
Figure 3CC

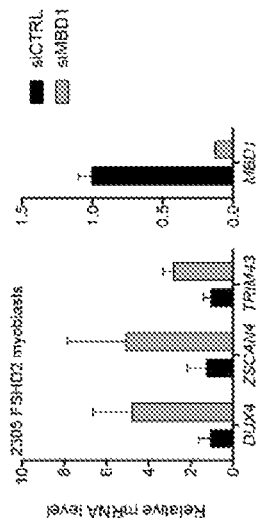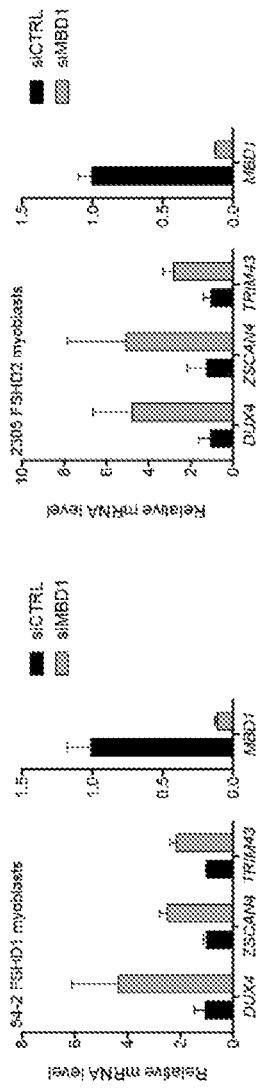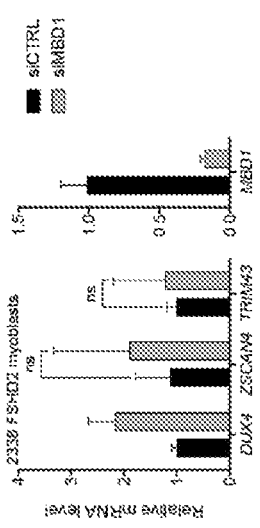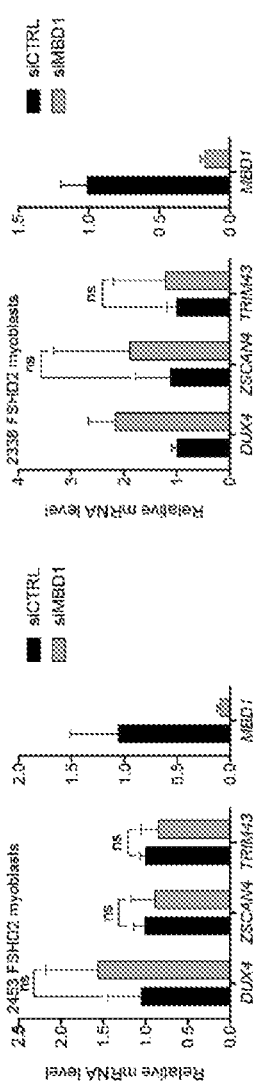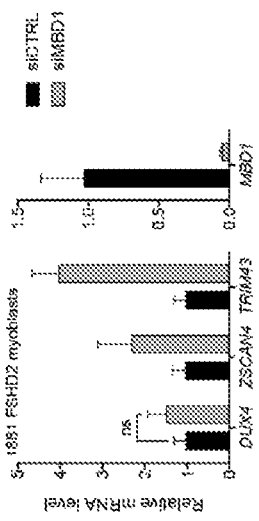
Figure 3II  Figure 3JJ
Figure 3KK  Figure 3LL
Figure 3MM

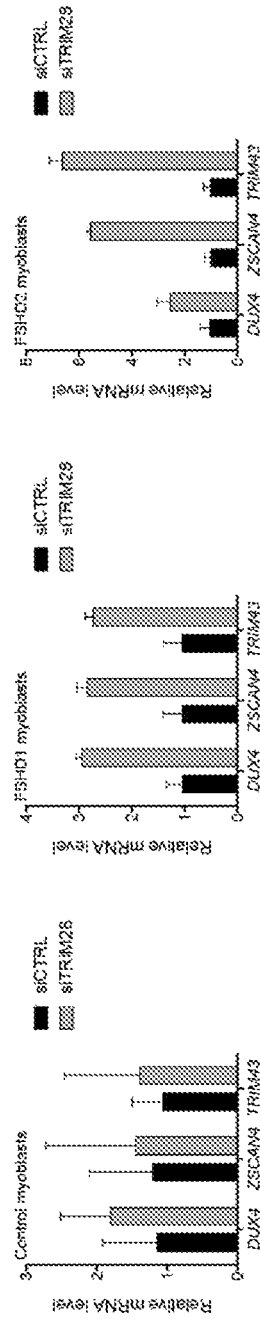
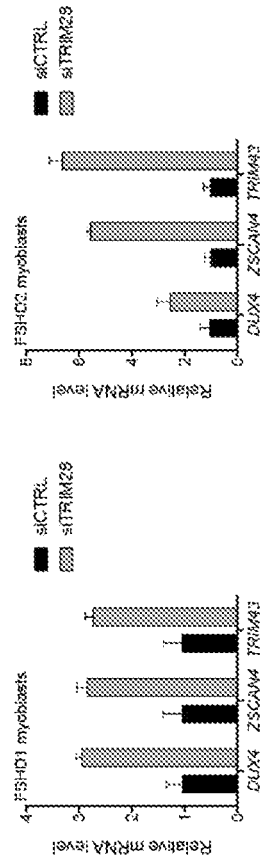
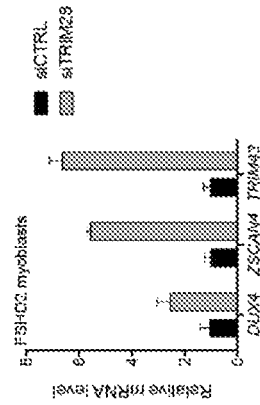
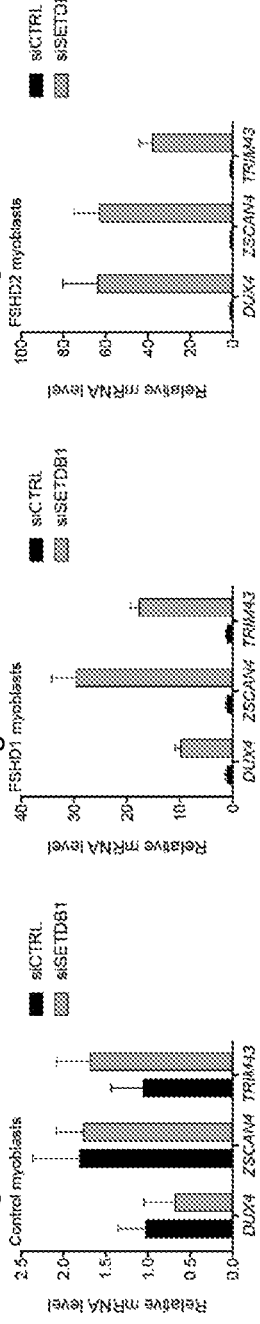
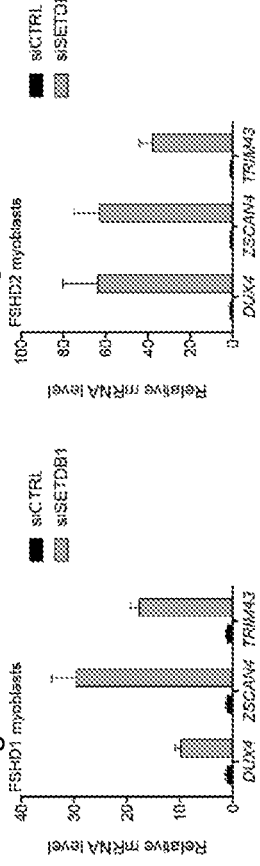
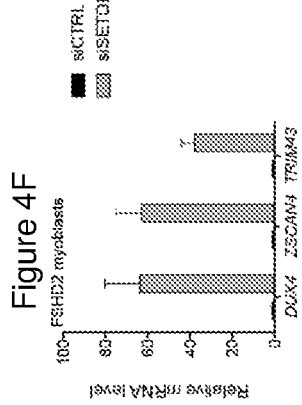
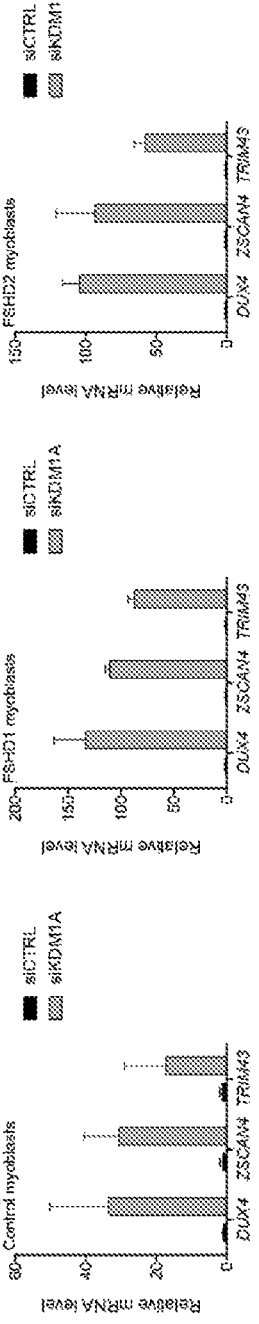
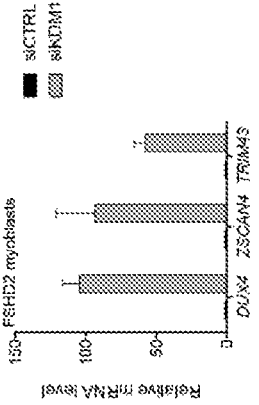
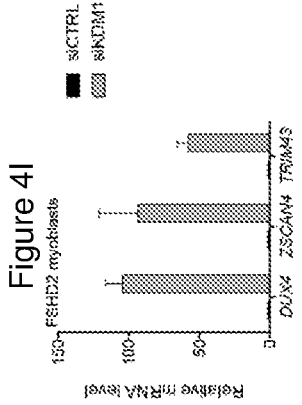

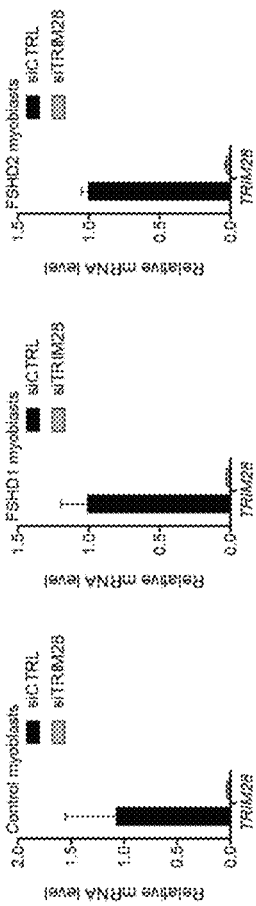

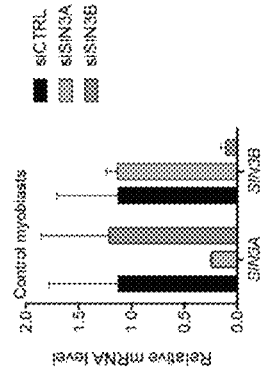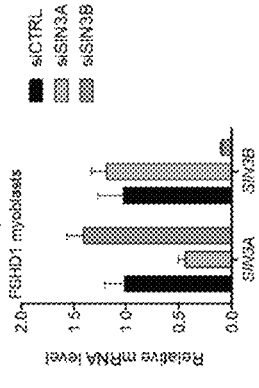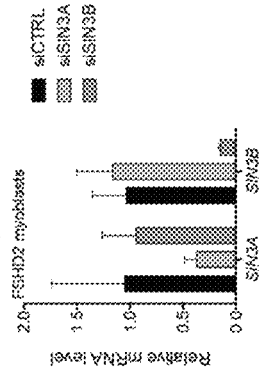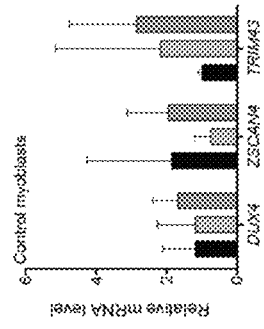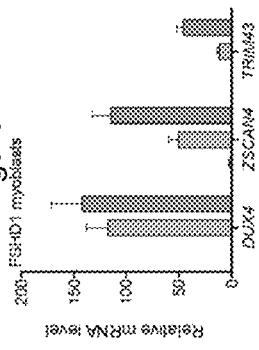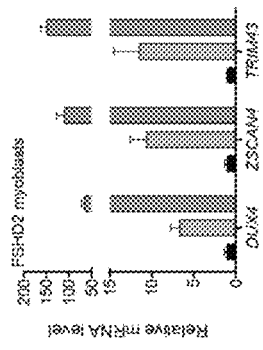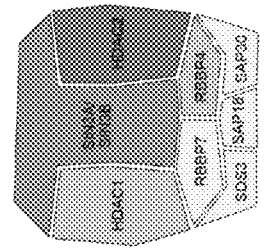

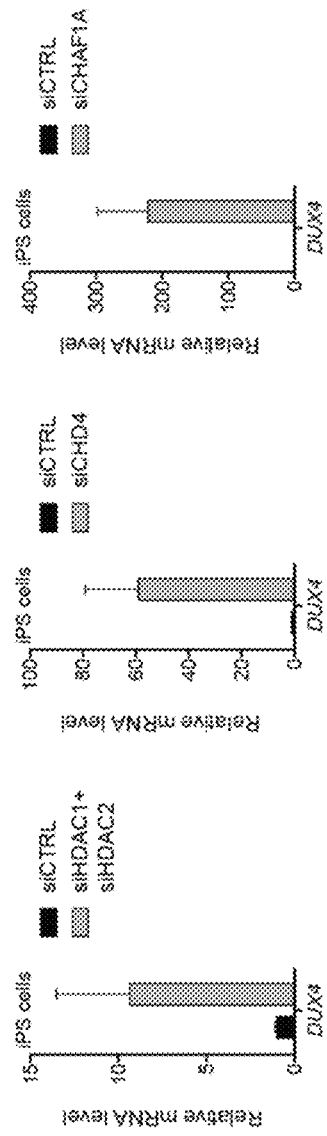
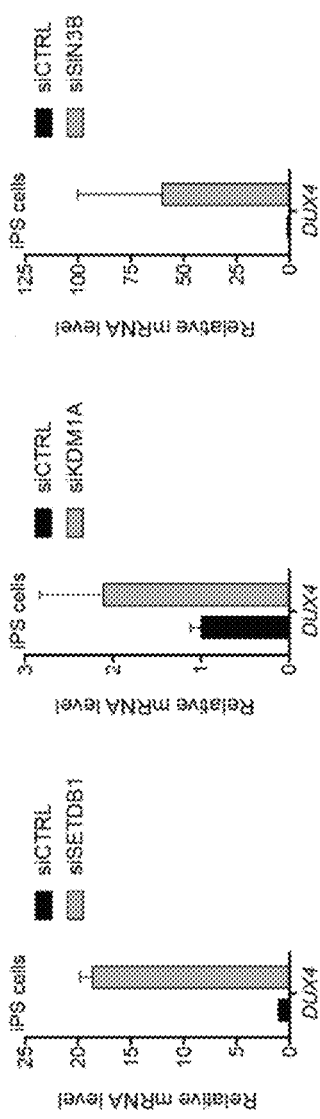
Figure 5A
Figure 5B
Figure 5C
Figure 5D
Figure 5E
Figure 5F

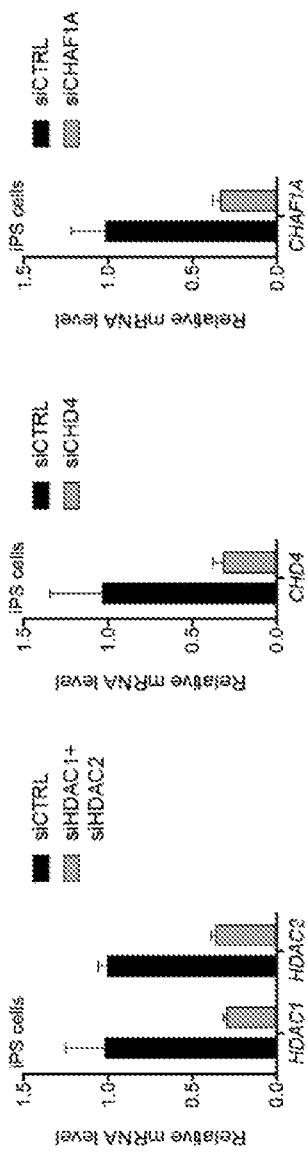
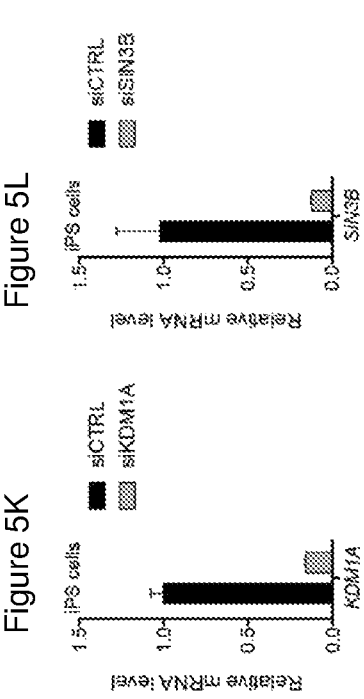
Figure 5G, Figure 5H, Figure 5I, Figure 5J, Figure 5K, Figure 5L

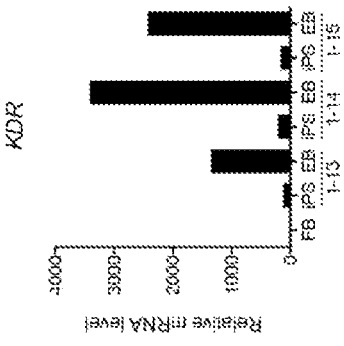
Figure 5M OCT4
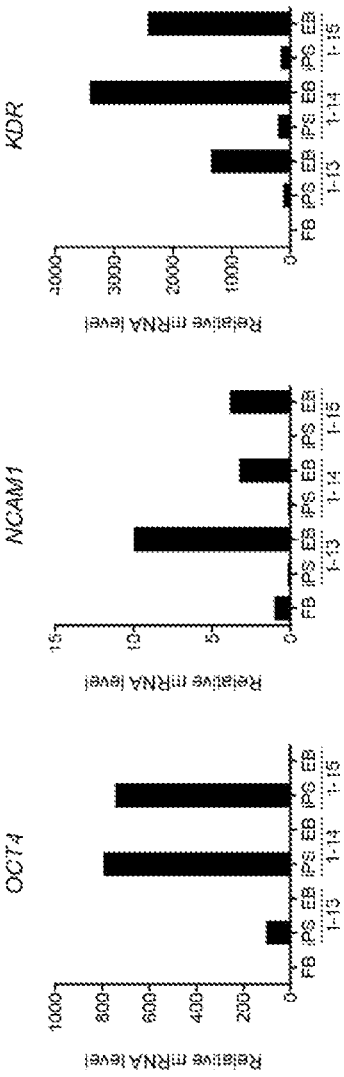
Figure 5N NCAM1
Figure 5O KDR
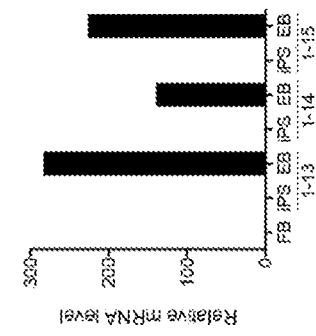
Figure 5P AFP
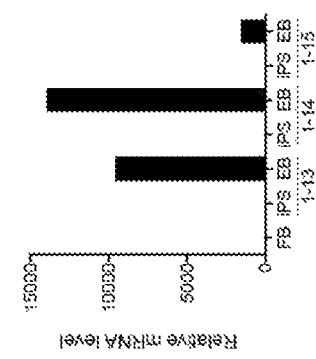
Figure 5Q CDX2

*DUX4*

*DUX4*

*CHD4*

*CHAF1A*

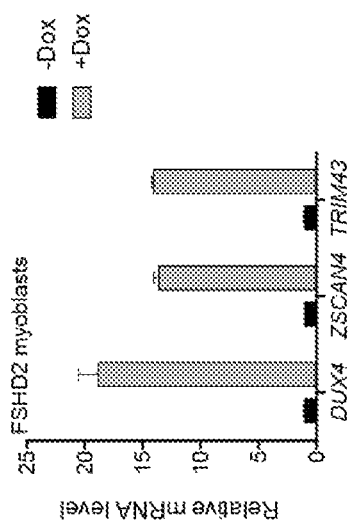
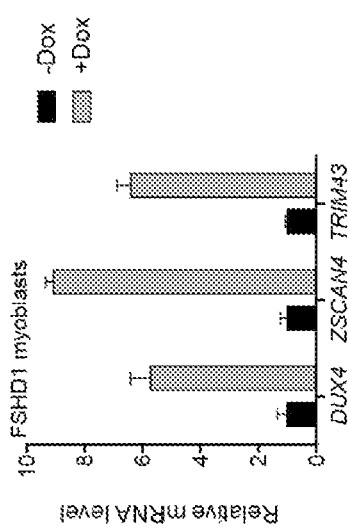
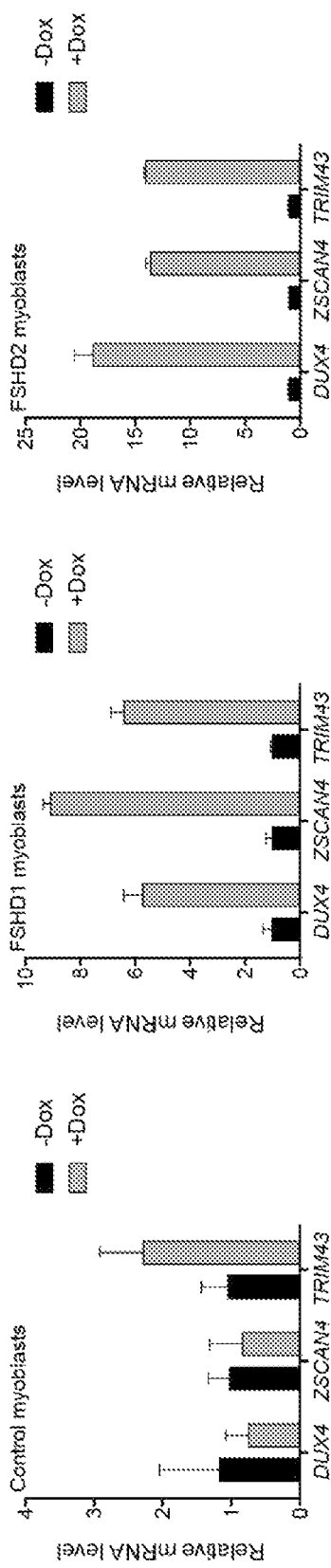
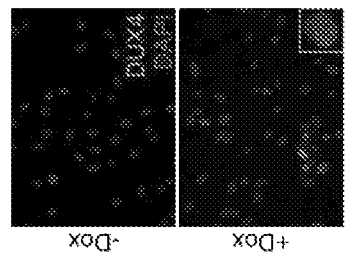
Figure 6A
Figure 6B
Figure 6C
Figure 6D

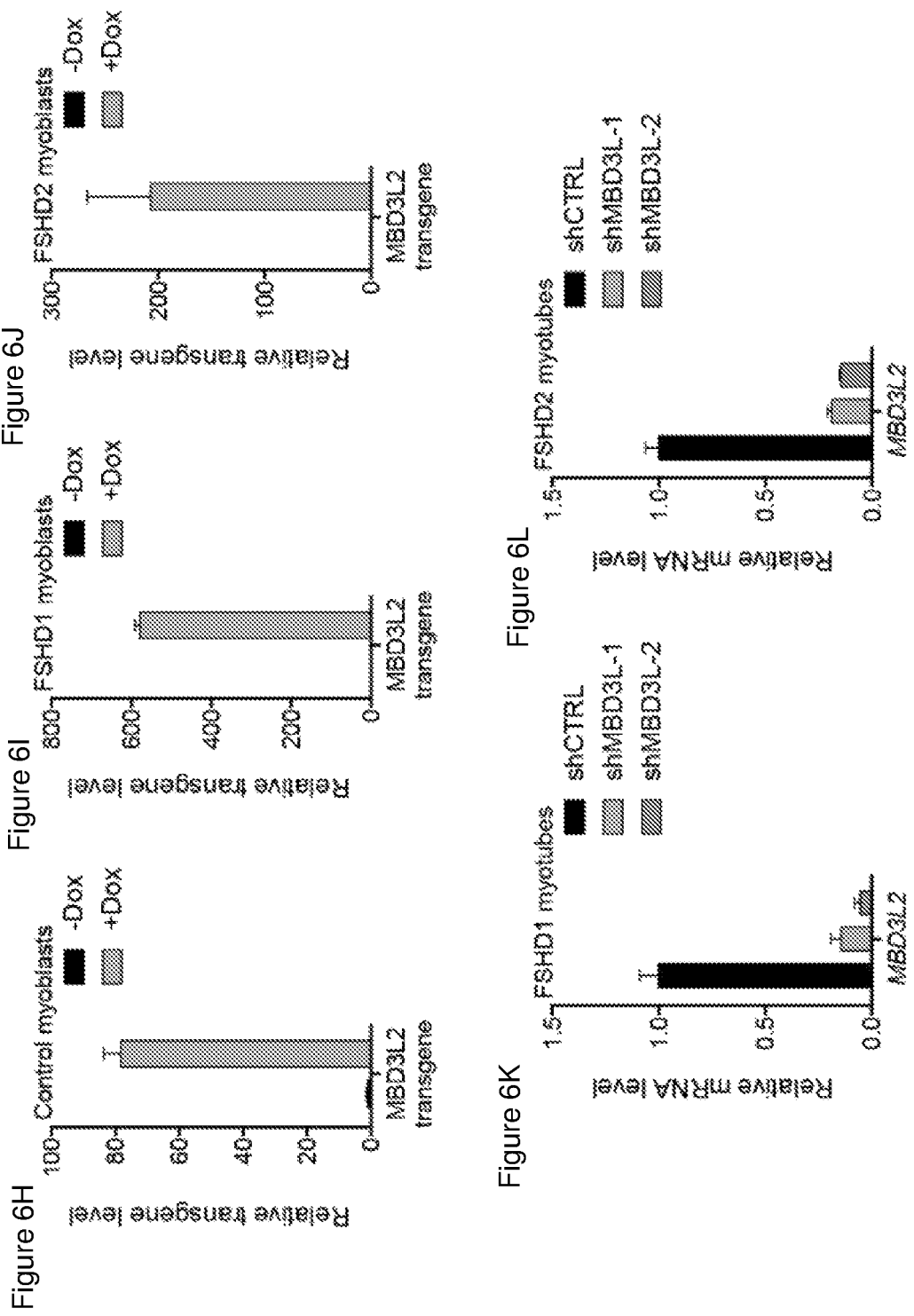

METHODS FOR TREATING FACIOSCAPULOHUMERAL MUSCULAR DYSTROPHY

CROSS REFERENCE TO RELATED APPLICATION

This application claims the benefit of priority to U.S. Patent Application No. 62/625,881 filed on Feb. 2, 2018, which is hereby incorporated by reference in its entirety.

ACKNOWLEDGMENT OF GOVERNMENT SUPPORT

This invention was made with government support under NS069539 awarded by the National Institutes of Health. The government has certain rights in the invention.

FIELD

This disclosure relates to the field of muscular dystrophy and in particular, to methods for treating patients with facioscapulohumeral muscular dystrophy (FSHD).

BACKGROUND

Muscular dystrophies are a group of diverse, heritable neuromuscular disorders which represent a group of devastating neuromuscular diseases characterized by primary or secondary skeletal muscle involvement. Facioscapulohumeral muscular dystrophy (FSHD) is a form of muscular dystrophy associated with progressive muscle weakness and loss of muscle tissue. It is caused by the mis-expression of DUX4 in skeletal muscle (Tawil et al., 2014). In individuals with FSHD, the epigenetic repression of DUX4 is incomplete as a consequence of having fewer than 11 D4Z4 repeats (FSHD type 1, FSHD1) or mutations in trans-acting chromatin repressors of D4Z4 (FSHD type 2, FSHD2), either of which results in ectopic expression of DUX4 in skeletal muscle when combined with a permissive chromosome 4qA haplotype that provides a polyadenylation site for the DUX4 mRNA (Lemmers et al., 2012; Lemmers et al., 2010; van den Boogaard et al., 2016). The mis-expression of DUX4 in skeletal muscle has many consequences that include induction of a cleavage-stage transcriptional program, suppression of the innate immune response and nonsense-mediated RNA decay (NMD) pathways, inhibition of myogenesis, and induction of cell death through mechanisms that involve the accumulation of aberrant and double-stranded RNAs (Bosnakovski et al., 2008; Feng et al., 2015; Geng et al., 2012; Kowaljow et al., 2007; Rickard et al., 2015; Shadle et al., 2017; Snider et al., 2009; Wallace et al., 2011; Winokur et al., 2003; Young et al., 2013). These cellular insults lead to progressive muscle weakness initiating in the face and upper body but eventually involving nearly all skeletal muscle groups (Tawil et al., 2014). Currently, there is no treatment or cure for FSHD.

SUMMARY

Disclosed are methods of treating FSHD. In some examples, the method includes administering to the subject with FSHD an effective amount of an agent that modulates the expression or biological activity of a muscular dystrophy-associated molecule, such as DUX4, thereby treating the muscular dystrophy and/or delaying the onset of one or more signs or symptoms associated with FSHD, including preventing, reducing or inhibiting muscle weakness. For example, some embodiments provide methods of improving muscular health, such as enhancing muscle regeneration, maintenance, or repair in a subject. Further implementations of the disclosed methods include diagnosing the subject as having a condition treatable by inhibiting DUX4 expression.

In particular embodiments, a method of treating FSHD, in a subject in need thereof comprises administering to the subject an agent that increases NuRD and/or CAF-1 complex repression of DUX4. In some embodiments, a method of treating FSHD, in a subject in need thereof comprises administering to the subject an agent that increases the activity and/or expression of NuRD/MBD2 and/or MBD1/CAF-1 complex members, such as one or more of HDAC1, HDAC2, CHD4, and MBD2. For example, MBD1/CAF-1 complex members can comprise one or more of CHAF1A, CHAF1B, RBBP4, and MBD1. In some further embodiments, a method of treating FSHD in a subject in need thereof comprises administering to a subject an effective amount of an MBD3L protein inhibitor (such as MBD3L2, MBD3L3, MBD3L4 and/or MBD3L5 protein inhibitor), for example, to decrease DUX4 activity or expression, thereby treating one or more signs or symptoms associated with the muscular dystrophy in the subject. In examples, the inhibitor comprises a small molecule inhibitor and/or an antisense compound, such as a siRNA, that inhibits the expression of MBD3L2 protein. Additional methods include treating FSHD in a subject in need thereof by transplanting muscle with myoblasts containing larger D4Z4 repeat sizes of non-permissive alleles of DUX4 to serve as "decoy" nuclei to redirect MBD3L2, or by autologous transplant following deletion of the D4Z4 array and/or the MBD3L2-5 cluster to serve as "decoy" nuclei.

In further embodiments, the method of the present disclosure includes administering a DUX4 regulating composition, such as a composition that decreases DUX4 expression or activity, with one or more additional pharmacological substances, such as a therapeutic agent. In some aspects, the additional therapeutic agent enhances the therapeutic effect of the DUX4 regulating composition. In further aspects, the therapeutic agent provides independent therapeutic benefit for the condition being treated. In some examples, a DUX4 regulating composition is applied to a particular area of the subject to be treated. For example, the composition may be injected into a particular area to be treated, such as skeletal muscle. In further examples, a composition is administered such that it is distributed to multiple areas of the subject, such as systemic administration or regional administration.

It is contemplated that the disclosed compositions can be administered by any suitable method, such as topically, parenterally (such as intravenously or intraperitoneally), or orally. In a specific example, the composition is administered systemically, such as through parenteral administration, such as stomach injection or peritoneal injection.

It is contemplated that the disclosed methods may be used to enhance repair or maintenance, or prevent damage to muscles, as well as other tissues and organs. For example, the methods of the present disclosure can be used to treat symptoms of muscular dystrophy stemming from effects to cells or tissue other than skeletal muscle.

The foregoing and other features of the disclosure will become more apparent from the following detailed description, which proceeds with reference to the accompanying figures.

BRIEF DESCRIPTION OF THE DRAWINGS

FIGS. 1A-1E. NuRD complex components bind the D4Z4 macrosatellite repeat. (FIG. 1A) Schematic summary of the enChIP procedure. A 3×FLAG-dCas9-HA-2×NLS fusion protein (FLAG-dCas9) consisting of an N-terminal triple FLAG (3×FLAG) epitope tag, catalytically inactive Cas9 endonuclease (dCas9), C-terminal human influenza hemagglutinin (HA) epitope tag and tandem nuclear localization signal (2×NLS) is expressed with one or more guide RNA (gRNA) in an appropriate cell context. Cells are crosslinked, chromatin is fragmented and complexes containing FLAG-dCas9 are immunoprecipitated with an anti-FLAG antibody. After reversing the crosslinks, molecules associated with the targeted genomic region are purified and identified by downstream analyses including mass spectrometry and next-generation sequencing. Adapted from (Fujita et al., 2016). (FIGS. 1B-1E) ChIP-qPCR enrichment of NuRD complex components CHD4 (1B), HDAC2 (1C), MTA2 (1D) and MBD2 (1E) along the D4Z4 repeat in MB2401 control myoblasts. The Chr18q12 amplicon contains no CpG dinucleotides and serves as a negative control site, while the TMEM130 promoter is occupied by NuRD complex components in published ENCODE datasets (Consortium, 2012) and functions as a positive control locus. Error bars denote the standard deviation from the mean of three biological replicates. Statistical significance was calculated by comparing the specific pulldown to the IgG control at each site using a two-tailed, two-sample Mann-Whitney U test. *, $p \leq 0.05$; ns, not significant, $p > 0.05$.

(FIG. 1F) Diagram showing the location of the three gRNAs targeting the D4Z4 unit and their relationship to the DUX4 open reading frame. 1, gD4Z4-1; 2, gD4Z4-2; 3, gD4Z4-3. (1G-I) MB135 control myoblasts stably expressing FLAG-dCas9 together with gRNA targeting the D4Z4 repeat (gD4Z4-1, gD4Z4-2, gD4Z4-3) or the MYOD1 distal regulatory region (DRR) (gMYOD1) were examined for FLAG-dCas9 expression level by immunoblot (1G), subcellular localization by immunofluorescence (1H) and chromatin occupancy by enChIP-qPCR (1I). A + indicates that existing cell lines were super-infected to enhance FLAG-dCas9 levels and/or to co-express two D4Z4 gRNAs. The arrowhead in (IG) indicates the expected size of full-length FLAG-dCas9.

FIGS. 2A-2J. The MBD2/NuRD complex represses the D4Z4 array. (FIG. 2A) Schematic representation of the NuRD complex. Subunits colored darkest grey have the most lines of evidence linking them to DUX4 regulation (e.g. enChIP, siRNA and ChIP data), while more lightly colored subunits have progressively less experimental support. Adapted from (Hota and Bruneau, 2016). (FIGS. 2B-2J) DUX4 and DUX4 target gene expression as determined by RT-qPCR following control (CTRL), HDAC1/HDAC2 (FIGS. 2B-2D), CHD4 (FIGS. 2E-2G) or MBD2 (FIGS. 2H-2J) siRNA knockdown in MB2401 control (FIGS. 2B, 2E, 2H), MB073 FSHD1 (FIGS. 2C, 2F, 2I) or MB200 FSHD2 (FIGS. 2D, 2G, 2J) myoblasts. Error bars denote the standard deviation from the mean of three biological replicates. Statistical significance was calculated by comparing the specific knockdown to the control knockdown for each gene using a two-tailed, two-sample Mann-Whitney U test. *, $p \leq 0.05$.

FIGS. 2K-2M. Validation of HDAC1 and HDAC2 knockdown. HDAC1 and HDAC2 gene expression as determined by RT-qPCR following control (CTRL), HDAC1, HDAC2 or simultaneous HDAC1/HDAC2 siRNA knockdown in MB2401 control (FIG. 2K), MB073 FSHD1 (FIG. 2L) or MB200 FSHD2 (FIG. 2M) myoblasts. Error bars denote the standard deviation from the mean of three biological replicates.

(FIG. 2N) DUX4 and DUX4 target gene expression as determined by RT-qPCR in MB200 FSHD2 myoblasts treated with 2.5 µM MS-275 for the indicated times. Statistical significance was calculated by comparing the mRNA level at each time point to that at 0 hours using a two-tailed, two-sample Mann-Whitney U test. (FIG. 2O) ChIP-qPCR enrichment of histone H4 acetylation (H4Ac) along the D4Z4 repeat in MB200 FSHD2 myoblasts treated with 2.5 µM MS-275 for 24 hours. Statistical significance was calculated by comparing the H4Ac signal in untreated versus MS-275-treated cells at each site using a one-tailed, one-sample Wilcoxon signed-rank test. *, $p \leq 0.05$; ns, not significant, $p > 0.05$. Error bars denote the standard deviation from the mean of three (or six, for the 0 hour and 12 hour time points in (A)) biological replicates.

FIGS. 2Y-2AA. MBD3 depletion in control and FSHD myoblasts. DUX4 and MBD3 gene expression as determined by RT-qPCR following control (CTRL) or MBD3 siRNA knockdown in MB2401 control (FIG. 2Y), MB073 FSHD1 (FIG. 2Z) or MB200 FSHD2 (FIG. 2AA) myoblasts. Error bars denote the standard deviation from the mean of three biological replicates.

FIGS. 3A-3J. MBD1/CAF-1 components repress the D4Z4 array. (FIG. 3A) Schematic representation of the CAF-1 complex, with shading as in FIG. 2A. All subunits have one line of evidence linking them to DUX4 regulation. (FIGS. 3B-3J) DUX4 and DUX4 target gene expression as determined by RT-qPCR following control (CTRL), CHAF1A/CHAF1B (FIGS. 3B-3D), MBD1 (FIGS. 3E-3G) or CHAF1A/CHD4 (FIGS. 3H-3J) siRNA knockdown in MB2401 control (FIGS. 3B, 3E, 3H), MB073 FSHD1 (FIGS. 3C, 3F, 3I) or MB200 FSHD2 (FIGS. 3D, 3G, 3J) myoblasts. Error bars denote the standard deviation from the mean of three biological replicates.

FIGS. 3K-3M. Validation of CHAFA1 and CHAF1B knockdown. CHAF1A and CHAF1B gene expression as determined by RT-qPCR following control (CTRL), CHAF1A or CHAF1B siRNA knockdown in MB2401 control (FIG. 3K), MB073 FSHD1 (FIG. 3L) or MB200 FSHD2 (FIG. 3M) myoblasts. Error bars denote the standard deviation from the mean of three biological replicates.

FIGS. 3N-3P. Validation of MBD1 knockdown. MBD1 gene expression as determined by RT-qPCR following control (CTRL) or MBD1 siRNA knockdown in MB2401 control (FIG. 3N), MB073 FSHD1 (FIG. 3O) or MB200 FSHD2 (FIG. 3P) myoblasts. Error bars denote the standard deviation from the mean of three biological replicates.

FIGS. 3T-3X. CHD4 depletion in additional FSHD cell lines. CHD4, DUX4, and DUX4 target gene expression as determined by RT-qPCR following control (CTRL) or CHD4 siRNA knockdown in 54-2 FSHD1 (FIG. 3T), 2305 FSHD2 (FIG. 3U), 2453 FSHD2 (FIG. 3V), 2338 FSHD2 (FIG. 3W) or 1881 FSHD2 (FIG. 3X) myoblasts. Error bars denote the standard deviation from the mean of three biological replicates. Statistical significance was calculated by comparing the specific knockdown to the control knockdown for each gene using a two-tailed, two-sample Mann-Whitney U test and p was ≤0.05 unless otherwise specified as not significant (ns).

FIGS. 3Y-3CC. MBD2 depletion in additional FSHD cell lines. MBD2, DUX4, and DUX4 target gene expression as determined by RT-qPCR following control (CTRL) or MBD2 siRNA knockdown in 54-2 FSHD1 (FIG. 3Y), 2305 FSHD2 (FIG. 3Z), 2453 FSHD2 (FIG. 3AA), 2338 FSHD2 (FIG. 3BB) or 1881 FSHD2 (FIG. 3CC) myoblasts. Error bars denote the standard deviation from the mean of three biological replicates. Statistical significance was calculated by comparing the specific knockdown to the control knockdown for each gene using a two-tailed, two-sample Mann-Whitney U test and p was ≤0.05 unless otherwise specified as not significant (ns).

FIGS. 3DD-3HH. CHAF1A depletion in additional FSHD cell lines. CHAF1A, DUX4, and DUX4 target gene expression as determined by RT-qPCR following control (CTRL) or CHAF1A siRNA knockdown in 54-2 FSHD1 (FIG. 3DD), 2305 FSHD2 (FIG. 3EE), 2453 FSHD2 (FIG. 3FF), 2338 FSHD2 (FIG. 3GG) or 1881 FSHD2 (FIG. 3HH) myoblasts. Error bars denote the standard deviation from the mean of three biological replicates. Statistical significance was calculated by comparing the specific knockdown to the control knockdown for each gene using a two-tailed, two-sample Mann-Whitney U test and p was ≤0.05 unless otherwise specified as not significant (ns).

FIGS. 3II-3MM. MBD1 depletion in additional FSHD cell lines. MBD1, DUX4, and DUX4 target gene expression as determined by RT-qPCR following control (CTRL) or MBD1 siRNA knockdown in 54-2 FSHD1 (FIG. 3II), 2305 FSHD2 (FIG. 3JJ), 2453 FSHD2 (FIG. 3KK), 2338 FSHD2 (FIG. 3LL) or 1881 FSHD2 (FIG. 3MM) myoblasts. Error bars denote the standard deviation from the mean of three biological replicates. Statistical significance was calculated by comparing the specific knockdown to the control knockdown for each gene using a two-tailed, two-sample Mann-Whitney U test and p was ≤0.05 unless otherwise specified as not significant (ns).

FIGS. 4A-4I. Additional transcriptional repressors silence the D4Z4 repeat. (A-I) DUX4 and DUX4 target gene expression as determined by RT-qPCR following control (CTRL), TRIM28 (FIGS. 4A-4C), SETDB1 (FIGS. 4D-4F) or KDM1A (FIGS. 4G-4I) siRNA knockdown in MB2401 control (FIGS. 4A, 4D, 4G), MB073 FSHD1 (FIGS. 4B, 4E, 4H) or MB200 FSHD2 (FIGS. 4C, 4F, 4I) myoblasts. Error bars denote the standard deviation from the mean of three biological replicates. Statistical significance was calculated by comparing the specific knockdown to the control knockdown for each gene using a two-tailed, two-sample Mann-Whitney U test and p was ≤0.05 for all comparisons except those in (FIG. 4A) and (FIG. 4D).

FIGS. 4J-4L. Validation of TRIM28 knockdown. TRIM28 gene expression as determined by RT-qPCR following control (CTRL) or TRIM28 siRNA knockdown in MB2401 control (FIG. 4J), MB073 FSHD1 (FIG. 4K) or MB200 FSHD2 (FIG. 4L) myoblasts. Error bars denote the standard deviation from the mean of three biological replicates.

FIGS. 4S-4Y. SIN3A/SIN3B knockdown. FIG. 4S, Schematic representation of the SIN3 complex, with shading as in FIG. 2A depicting the amount of experimental support linking each subunit to DUX4 regulation. SIN3A, SIN3B, DUX4, and DUX4 target gene expression as determined by RT-qPCR following control (CTRL), SIN3A or SIN3B siRNA knockdown in MB2401 control (FIGS. 4T-4U), MB073 FSHD1 (FIGS. 4V-4W) or MB200 FSHD2 (FIGS. 4X-4Y) myoblasts. Error bars denote the standard deviation from the mean of three biological replicates.

FIGS. 5A-5F. NuRD and CAF-1 complex components repress DUX4 in iPS cells. DUX4 gene expression as determined by RT-qPCR in human eMHF2 iPS cells following control (CTRL), HDAC1/HDAC2 (FIG. 5A), CHD4 (FIG. 5B), CHAF1A (FIG. 5C), SETDB1 (FIG. 5D), KDM1A (FIG. 5E) or SIN3B (FIG. 5F) siRNA knockdown. Error bars denote the standard deviation from the mean of three biological replicates. Statistical significance was calculated by comparing the specific knockdown to the control knockdown for each gene using a two-tailed, two-sample Mann-Whitney U test and p was ≤0.05 unless otherwise specified as not significant (ns).

FIGS. 5G-5L. Validation of repressor protein knockdowns in eMHF2 iPS cells. Gene expression as determined by RT-qPCR in human eMHF2 iPS cells following control (CTRL), HDAC1/HDAC2 (FIG. 5G), CHD4 (FIG. 5H), CHAF1A (FIG. 5I), SETDB1 (FIG. 5J), KDM1A (FIG. 5K) or SIN3B (FIG. 5L) siRNA knockdown. Error bars denote the standard deviation from the mean of three biological replicates.

FIGS. 5M-5Q. Validation of HFF3 iPS cell generation. Gene expression as determined by RT-qPCR in HFF3 fibroblasts (FB), three isogenic iPS cell lines generated by reprogramming the fibroblast line, and embryoid bodies (EB) derived from the iPS cells. OCT4 (FIG. 5M) is a pluripotency gene, while NCAM1 (FIG. 5N), KDR (FIG. 5O), AFP (FIG. 5P), and CDX2 (FIG. 5Q) are highly expressed in ectoderm, mesoderm, endoderm, and trophoblast, respectively.

FIGS. 6A-6G. MBD3L2 expression de-represses the D4Z4 array. (FIG. 6A-6C) DUX4 and DUX4 target gene expression as determined by RT-qPCR in MB2401 control (FIG. 6A), MB073 FSHD1 (FIG. 6B) or MB200 FSHD2 (FIG. 6C) myoblasts without (−) or with (+) doxycycline (Dox) treatment for 48 hours to induce MBD3L2 transgene expression in clonal cell lines. (FIGS. 6D-6E) DUX4-positive nuclei upon overexpression of MBD3L2 in MB200 FSHD2 myoblasts as in (FIG. 6C) were detected by immunofluorescence (D) and quantified by counting 3 fields representing 125 nuclei (FIG. 6E). (FIGS. 6F-6G) DUX4 and DUX4 target gene expression as determined by RT-qPCR following control (CTRL) or MBD3L family gene shRNA knockdown in MB073 FSHD1 (FIG. 6F) or MB200 FSHD2 (FIG. 6G) myotubes. Error bars denote the standard deviation from the mean of three biological replicates. Statistical significance was calculated by comparing the specific knockdown to the control knockdown for each gene using a two-tailed, two-sample Mann-Whitney U test and p was ≤0.05 for all comparisons except in (FIG. 6A).

FIGS. 6H-6L. Validation of MBD3L2 overexpression and depletion. The ectopic (FIGS. 6H-6J) or endogenous (FIGS. 6K-6L) expression of MBD3L2 as determined by RT-qPCR in MB2401 control (FIG. 6H), MB073 FSHD1 (FIG. 6I) or MB200 FSHD2 (FIG. 6J) myoblasts cultured without (−) or with (+) doxycycline (Dox) for 48 hours, or in MB073 FSHD1 (FIG. 6K) or MB200 FSHD2 (FIG. 6L) myotubes expressing control (CTRL) or MBD3L gene shRNAs. Error bars denote the standard deviation from the mean of three biological replicates.

DETAILED DESCRIPTION OF SEVERAL EMBODIMENTS

I. Terms

Figure 1G:
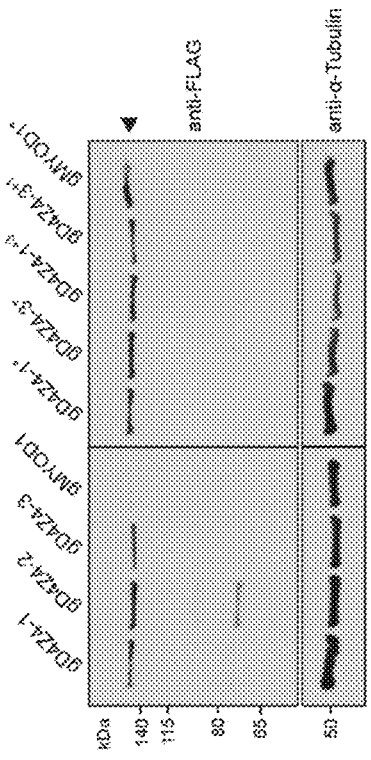
FIGS. 1F-1I. Validation of myoblast cell lines used for enChIP-MS.
Figure 1I:
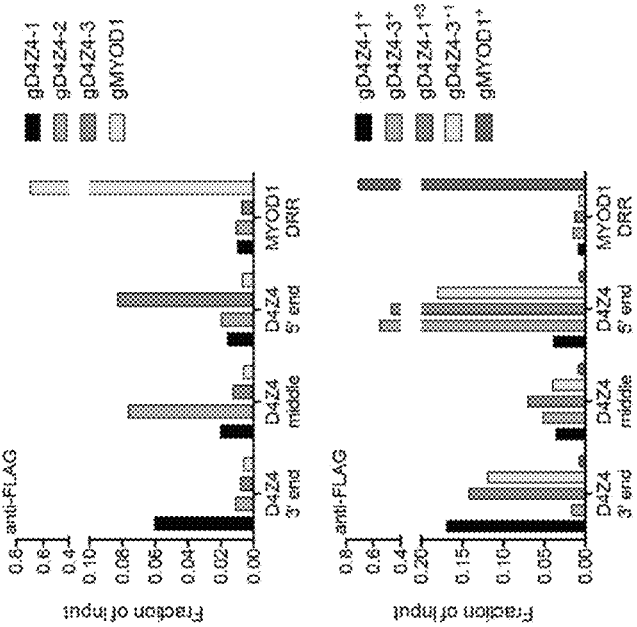
Figure 1F:
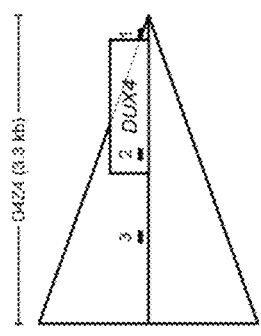
Figure 1H:
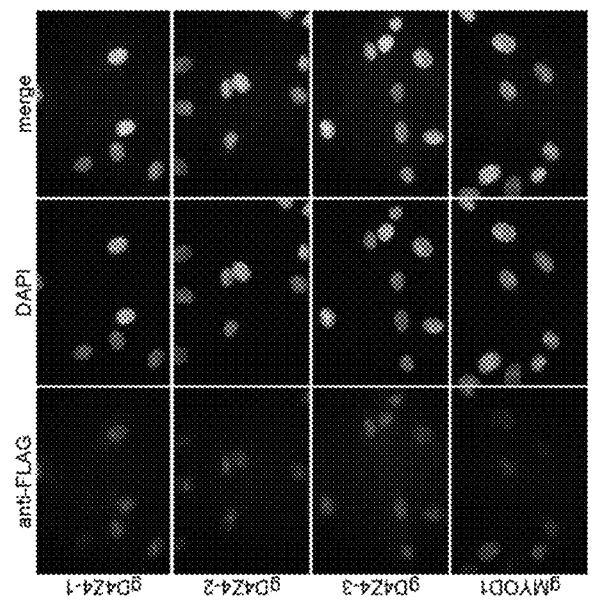

The following explanations of terms and methods are provided to better describe the present disclosure and to guide those of ordinary skill in the art in the practice of the present disclosure. The singular terms "a," "an," and "the" include plural referents unless context clearly indicates otherwise. Similarly, the word "or" is intended to include "and" unless the context clearly indicates otherwise. The term "comprises" means "includes." Thus, "comprising A or B," means "including A, B, or A and B," without excluding additional elements.

Although methods and materials similar or equivalent to those described herein can be used in the practice or testing of this disclosure, suitable methods and materials are described below.

Unless otherwise explained, all technical and scientific terms used herein have the same meaning as commonly understood by one of ordinary skill in the art to which this disclosure belongs. Definitions of common terms in molecular biology may be found in Benjamin Lewin, Genes V, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.), *Molecular Biology and Biotechnology: a Comprehensive Desk Reference*, published by VCH Publishers, Inc., 1995 (ISBN 1-56081-569-8).

All publications, patent applications, patents, and other references mentioned herein are incorporated by reference in their entirety. All sequences provided in the disclosed Genbank Accession numbers are incorporated herein by reference as available on Feb. 2, 2018. In case of conflict, the present specification, including explanations of terms, will control. In addition, the materials, methods, and examples are illustrative only and not intended to be limiting.

In order to facilitate review of the various embodiments of this disclosure, the following explanations of specific terms are provided:

Administration: To provide or give a subject an agent by any effective route. Exemplary routes of administration include, but are not limited to, injection (such as subcutaneous, intramuscular, intradermal, intraperitoneal, and intravenous), oral, sublingual, rectal, transdermal, intranasal, vaginal and inhalation routes or any combination of techniques thereof. In some particular examples, administration of anti-sense nucleic acids are provided as described by Rudolph Juliano (Nucleic Acids Res. 106 August 19; 44(14): 6518-6548) which is hereby incorporated by reference. In some examples, anti-sense RNAs are administered by intramuscular delivery (see, for example, IONIS pharmaceuticals).

Suitable solid or liquid pharmaceutical preparation forms are, for example, aerosols, (micro)capsules, creams, drops, drops or injectable solution in ampoule form, emulsions, granules, powders, suppositories, suspensions, syrups, tablets, coated tablets, and also preparations with protracted release of active compounds, in whose preparation excipients and additives and/or auxiliaries such as binders, coating agents, disintegrants, flavorings, lubricants, solubilizers, sweeteners, or swelling agents are customarily used as described above. The pharmaceutical compositions are suitable for use in a variety of drug delivery systems. For a brief review of various methods for drug delivery, see Langer, "New Methods of Drug Delivery," Science 249:1527-1533 (1990), incorporated by reference herein to the extent not inconsistent with the present disclosure.

The disclosed compositions or other therapeutic agents of the present disclosure can be formulated into therapeutically-active pharmaceutical compositions that can be administered to a subject parenterally or orally. Parenteral administration routes include, but are not limited to epidermal, intraarterial, intramuscular (IM, and depot IM), intraperitoneal (IP), intravenous (IV), intrasternal injection or infusion techniques, intranasal (inhalation), intrathecal, injection into the stomach, subcutaneous injections (subcutaneous (SQ and depot SQ), transdermal, topical, and ophthalmic.

The disclosed compositions or other therapeutic agent can be mixed or combined with a suitable pharmaceutically acceptable excipients to prepare pharmaceutical compositions. Pharmaceutically acceptable excipients include, but are not limited to, alumina, aluminum stearate, buffers (such as phosphates), glycine, ion exchangers (such as to help control release of charged substances), lecithin, partial glyceride mixtures of saturated vegetable fatty acids, potassium sorbate, serum proteins (such as human serum albumin), sorbic acid, water, salts or electrolytes such as cellulose-based substances, colloidal silica, disodium hydrogen phosphate, magnesium trisilicate, polyacrylates, polyalkylene glycols, such as polyethylene glycol, polyethylene-polyoxypropylene-block polymers, polyvinyl pyrrolidone, potassium hydrogen phosphate, protamine sulfate, group 1 halide salts such as sodium chloride, sodium carboxymethylcellulose, waxes, wool fat, and zinc salts, for example. Liposomal suspensions may also be suitable as pharmaceutically acceptable carriers.

Upon mixing or addition of a disclosed composition, or other therapeutic agent, the resulting mixture may be a solid, solution, suspension, emulsion, or the like. These may be prepared according to methods known to those of ordinary skill in the art. The form of the resulting mixture depends upon a number of factors, including the intended mode of administration and the solubility of the agent in the selected carrier.

Pharmaceutical carriers suitable for administration of the disclosed compositions or other therapeutic agent include any such carriers known to be suitable for the particular mode of administration. In addition, the disclosed composition or other therapeutic substance can also be mixed with other inactive or active materials that do not impair the desired action, or with materials that supplement the desired action, or have another action.

Methods for solubilizing may be used where the agents exhibit insufficient solubility in a carrier. Such methods are known and include, but are not limited to, dissolution in aqueous sodium bicarbonate, using cosolvents such as dimethylsulfoxide (DMSO), and using surfactants such as TWEEN® (ICI Americas, Inc., Wilmington, DE).

The disclosed compositions or other therapeutic agent can be prepared with carriers that protect them against rapid elimination from the body, such as coatings or time-release formulations. Such carriers include controlled release formulations, such as, but not limited to, microencapsulated delivery systems. The disclosed compositions or other therapeutic agent is included in the pharmaceutically acceptable carrier in an amount sufficient to exert a therapeutically useful effect, typically in an amount to avoid undesired side effects, on the treated subject. The therapeutically effective concentration may be determined empirically by testing the compounds in known in vitro and in vivo model systems for the treated condition. For example, mouse models of muscular dystrophy may be used to determine effective amounts or concentrations that can then be translated to other subjects, such as humans, as known in the art.

Injectable solutions or suspensions can be formulated, using suitable non-toxic, parenterally-acceptable diluents or solvents, such as 1,3-butanediol, isotonic sodium chloride solution, mannitol, Ringer's solution, saline solution, or water; or suitable dispersing or wetting and suspending agents, such as sterile, bland, fixed oils, including synthetic mono- or diglycerides, and fatty acids, including oleic acid; a naturally occurring vegetable oil such as coconut oil, cottonseed oil, peanut oil, sesame oil, and the like; glycerine; polyethylene glycol; propylene glycol; or other synthetic solvent; antimicrobial agents such as benzyl alcohol and methyl parabens; antioxidants such as ascorbic acid and sodium bisulfite; buffers such as acetates, citrates, and phosphates; chelating agents such as ethylenediaminetetraacetic acid (EDTA); agents for the adjustment of tonicity such as sodium chloride and dextrose; and combinations thereof. Parenteral preparations can be enclosed in ampoules, disposable syringes, or multiple dose vials made of glass, plastic, or other suitable material. Buffers, preservatives, antioxidants, and the like can be incorporated as required. Where administered intravenously, suitable carriers include physiological saline, phosphate-buffered saline (PBS), and solutions containing thickening and solubilizing agents such as glucose, polyethylene glycol, polypropyleneglycol, and mixtures thereof. Liposomal suspensions, including tissue-targeted liposomes, may also be suitable as pharmaceutically acceptable carriers.

If a disclosed composition or other therapeutic agent is administered orally as a suspension, the pharmaceutical compositions can be prepared according to techniques well known in the art of pharmaceutical formulation and may contain a suspending agent, such as alginic acid or sodium alginate, bulking agent, such as microcrystalline cellulose, a viscosity enhancer, such as methylcellulose, and sweeteners/flavoring agents. Oral liquid preparations can contain conventional additives such as suspending agents, e.g., gelatin, glucose syrup, hydrogenated edible fats, methyl cellulose, sorbitol, and syrup; emulsifying agents, e.g., acacia, lecithin, or sorbitan monooleate; non-aqueous carriers (including edible oils), e.g., almond oil, fractionated coconut oil, oily esters such as glycerine, propylene glycol, or ethyl alcohol; preservatives such as methyl or propyl p-hydroxybenzoate or sorbic acid; and, if desired, conventional flavoring or coloring agents. When formulated as immediate release tablets, these compositions can contain dicalcium phosphate, lactose, magnesium stearate, microcrystalline cellulose, and starch and/or other binders, diluents, disintegrants, excipients, extenders, and lubricants.

If oral administration is desired, a disclosed composition, or other therapeutic substance can be provided in a composition that protects it from the acidic environment of the stomach. For example, a disclosed composition, or other therapeutic agent can be formulated with an enteric coating that maintains its integrity in the stomach and releases the active compound in the intestine. A disclosed composition or other therapeutic agent can also be formulated in combination with an antacid or other such ingredient.

Oral compositions generally include an inert diluent or an edible carrier and can be compressed into tablets or enclosed in gelatin capsules. For the purpose of oral therapeutic administration, the disclosed composition or other therapeutic substance can be incorporated with excipients and used in the form of capsules, tablets, or troches. Pharmaceutically compatible adjuvant materials or binding agents can be included as part of the composition.

The capsules, pills, tablets, troches, and the like can contain any of the following ingredients or compounds of a similar nature: a binder such as, but not limited to, acacia, corn starch, gelatin, gum tragacanth, polyvinylpyrrolidone, or sorbitol; a filler such as calcium phosphate, glycine, lactose, microcrystalline cellulose, or starch; a disintegrating agent such as, but not limited to, alginic acid and corn starch; a lubricant such as, but not limited to, magnesium stearate, polyethylene glycol, silica, or talc; a gildant, such as, but not limited to, colloidal silicon dioxide; a sweetening agent such as sucrose or saccharin; disintegrants such as potato starch; dispersing or wetting agents such as sodium lauryl sulfate; and a flavoring agent such as peppermint, methyl salicylate, or fruit flavoring.

When the dosage unit form is a capsule, it can contain, in addition to material of the above type, a liquid carrier, such as a fatty oil. In addition, dosage unit forms can contain various other materials that modify the physical form of the dosage unit, for example, coatings of sugar and other enteric agents. The disclosed composition or other therapeutic agent can also be administered as a component of an elixir, suspension, syrup, wafer, tea, chewing gum, or the like. A syrup may contain, in addition to the active compounds, sucrose or glycerin as a sweetening agent and certain preservatives, dyes and colorings, and flavors.

When administered orally, the compounds can be administered in usual dosage forms for oral administration. These dosage forms include the usual solid unit dosage forms of tablets and capsules as well as liquid dosage forms such as solutions, suspensions, and elixirs. When the solid dosage forms are used, they can be of the sustained release type so that the compounds need to be administered less frequently.

Agent: Any protein, nucleic acid molecule (including chemically modified nucleic acids), compound, antibody, small molecule, organic compound, inorganic compound, or other molecule of interest. Agent can include a therapeutic agent, a diagnostic agent or a pharmaceutical agent. A therapeutic or pharmaceutical agent is one that alone or together with an additional compound induces the desired response (such as inducing a therapeutic or prophylactic effect when administered to a subject, including treating a subject with FSHD).

In some examples, an agent can act directly or indirectly to alter the activity and/or expression of DUX4. In a particular example, a therapeutic agent (such as an antisense compound or antibody) significantly alters the expression and/or activity of a muscular dystrophy associated molecule. An example of a therapeutic agent is one that can decrease the activity of a gene or gene product associated with muscular dystrophy, such as DUX4, for example as measured by a clinical response (such as an increase survival time or a decrease in one or more signs or symptoms associated with the muscular dystrophy). Therapeutically agents also include organic or other chemical compounds that mimic the effects of the therapeutically effective peptide, antibody, or nucleic acid molecule.

A "pharmaceutical agent" is a chemical compound or composition capable of inducing a desired therapeutic or prophylactic effect when administered to a subject, alone or in combination with another therapeutic agent(s) or pharmaceutically acceptable carriers. In a particular example, a pharmaceutical agent significantly reduces the expression and/or activity of a muscular dystrophy associated molecule thereby increasing a subject's survival time or reducing a sign or symptom associated with the disease.

Antibody: A polypeptide including at least a light chain or heavy chain immunoglobulin variable region which specifically recognizes and binds an epitope of an antigen, such as a muscular dystrophy-associated molecule or a fragment thereof. Antibodies are composed of a heavy and a light chain, each of which has a variable region, termed the variable heavy ($V_H$) region and the variable light ($V_L$) region. Together, the $V_H$ region and the $V_L$ region are responsible for binding the antigen recognized by the antibody. Antibodies of the present disclosure include those that are specific for a disclosed muscular dystrophy-associated molecule.

The term antibody includes intact immunoglobulins, as well the variants and portions thereof, such as Fab' fragments, F(ab)'$_2$ fragments, single chain Fv proteins ("scFv"), and disulfide stabilized Fv proteins ("dsFv"). A scFv protein is a fusion protein in which a light chain variable region of an immunoglobulin and a heavy chain variable region of an immunoglobulin are bound by a linker, while in dsFvs, the chains have been mutated to introduce a disulfide bond to stabilize the association of the chains. The term also includes genetically engineered forms such as chimeric antibodies (for example, humanized murine antibodies), heteroconjugate antibodies (such as, bispecific antibodies). See also, *Pierce Catalog and Handbook*, 1994-1995 (Pierce Chemical Co., Rockford, IL); Kuby, J., *Immunology*, 3$^{rd}$ Ed., W.H. Freeman & Co., New York, 1997.

Typically, a naturally occurring immunoglobulin has heavy (H) chains and light (L) chains interconnected by disulfide bonds. There are two types of light chain, lambda (λ) and kappa (k). There are five main heavy chain classes (or isotypes) which determine the functional activity of an antibody molecule: IgM, IgD, IgG, IgA and IgE.

Each heavy and light chain contains a constant region and a variable region, (the regions are also known as "domains"). In combination, the heavy and the light chain variable regions specifically bind the antigen. Light and heavy chain variable regions contain a "framework" region interrupted by three hypervariable regions, also called "complementarity-determining regions" or "CDRs". The extent of the framework region and CDRs have been defined (see, Kabat et al., *Sequences of Proteins of Immunological Interest*, U.S. Department of Health and Human Services, 1991). The Kabat database is now maintained online. The sequences of the framework regions of different light and heavy chains are relatively conserved within a species. The framework region of an antibody, that is the combined framework regions of the constituent light and heavy chains, serves to position and align the CDRs in three-dimensional space.

The CDRs are primarily responsible for binding to an epitope of an antigen. The CDRs of each chain are typically referred to as CDR1, CDR2, and CDR3, numbered sequentially starting from the N-terminus, and are also typically identified by the chain in which the particular CDR is located. Thus, a $V_H$ CDR3 is located in the variable domain of the heavy chain of the antibody in which it is found, whereas a $V_L$ CDR1 is the CDR1 from the variable domain of the light chain of the antibody in which it is found. An antibody that binds RET will have a specific $V_H$ region and the $V_L$ region sequence, and thus specific CDR sequences. Antibodies with different specificities (such as different combining sites for different antigens) have different CDRs. Although it is the CDRs that vary from antibody to antibody, only a limited number of amino acid positions within the CDRs are directly involved in antigen binding. These positions within the CDRs are called specificity determining residues (SDRs).

References to "$V_H$" or "VH" refer to the variable region of an immunoglobulin heavy chain, including that of an Fv, scFv, dsFv or Fab. References to "$V_L$" or "VL" refer to the variable region of an immunoglobulin light chain, including that of an Fv, scFv, dsFv or Fab.

A "monoclonal antibody" is an antibody produced by a single clone of B-lymphocytes or by a cell into which the light and heavy chain genes of a single antibody have been transfected. Monoclonal antibodies are produced by methods known to those of skill in the art, for instance by making hybrid antibody-forming cells from a fusion of myeloma cells with immune spleen cells. Monoclonal antibodies include humanized monoclonal antibodies.

A "polyclonal antibody" is an antibody that is derived from different B-cell lines. Polyclonal antibodies are a mixture of immunoglobulin molecules secreted against a specific antigen, each recognizing a different epitope. These antibodies are produced by methods known to those of skill in the art, for instance, by injection of an antigen into a suitable mammal (such as a mouse, rabbit or goat) that induces the B-lymphocytes to produce IgG immunoglobulins specific for the antigen, which are then purified from the mammal's serum.

A "chimeric antibody" has framework residues from one species, such as human, and CDRs (which generally confer antigen binding) from another species, such as a murine antibody that specifically binds a muscular dystrophy-associated molecule.

A "humanized" immunoglobulin is an immunoglobulin including a human framework region and one or more CDRs from a non-human (for example a mouse, rat, or synthetic) immunoglobulin. The non-human immunoglobulin providing the CDRs is termed a "donor," and the human immunoglobulin providing the framework is termed an "acceptor." In one example, all the CDRs are from the donor immunoglobulin in a humanized immunoglobulin. Constant regions need not be present, but if they are, they are ly identical to human immunoglobulin constant regions, e.g., at least about 85-90%, such as about 95% or more identical. Hence, all parts of a humanized immunoglobulin, except possibly the CDRs, are substantially identical to corresponding parts of natural human immunoglobulin sequences. Humanized immunoglobulins can be constructed by means of genetic engineering (see for example, U.S. Pat. No. 5,585,089).

Alteration or modulation in expression: An alteration in expression of a gene, gene product or modulator thereof, such as one or more muscular dystrophy associated molecules disclosed herein, refers to a change or difference, such as an increase or decrease, in the level of the gene, gene product, or modulators thereof that is detectable in a biological sample (such as a sample from a subject at risk or having muscular dystrophy) relative to a control (such as a sample from a subject without a muscular dystrophy) or a reference value known to be indicative of the level of the gene, gene product or modulator thereof in the absence of the disease. An "alteration" in expression includes an increase in expression (up-regulation) or a decrease in expression (downregulation).

Antisense compound: An oligomeric compound that is at least partially complementary to the region of a target nucleic acid molecule to which it hybridizes. As used herein, an antisense compound that is "specific for" a target nucleic acid molecule is one which specifically hybridizes with and modulates expression of the target nucleic acid molecule. As used herein, a "target" nucleic acid is a nucleic acid molecule to which an antisense compound is designed to specifically hybridize and modulate expression.

Nonlimiting examples of antisense compounds include primers, probes, antisense oligonucleotides, siRNAs, miRNAs, shRNAs and ribozymes. As such, these compounds can be introduced as single-stranded, double-stranded, circular, branched or hairpin compounds and can contain structural elements such as internal or terminal bulges or loops. Double-stranded antisense compounds can be two strands hybridized to form double-stranded compounds or a single strand with sufficient self-complementarity to allow for hybridization and formation of a fully or partially double-stranded compound. In particular examples herein, the antisense compound is siRNA.

In some examples, an antisense compound is an "antisense oligonucleotide." An antisense oligonucleotide is a single-stranded antisense compound that is a nucleic acid-based oligomer. An antisense oligonucleotide can include one or more chemical modifications to the sugar, base, and/or internucleoside linkages. Generally, antisense oligonucleotides are "DNA-like" such that when the antisense oligonucleotide hybridizes to a target RNA molecule, the duplex is recognized by RNase H (an enzyme that recognizes DNA:RNA duplexes), resulting in cleavage of the RNA. Exemplary methods of designing and using RNA therapeutics are disclosed in Nature Reviews Drug Discovery 11, 15-14 (2012), which are each hereby incorporated by reference in its entirety.

In one example, an antisense oligonucleotide sequence targets human MBD3L2 (Gene ID 125997 as provided on Nov. 5, 2017 on the World Wide Web ncbi.nlm.nih.gov address which is hereby incorporated by reference in its entirety). In other examples, an antisense oligonucleotide sequence targets MBD3L3 (Gene ID 653657), MBD3L4 (Gene ID 653656), MBD3L5 (Gene ID 284428), UHRF1 (Gene ID 29128), AFF4 (Gene ID 27125), SUPT16H (Gene ID 11198), SSRP1 (Gene ID 6749), PAF1 (Gene ID 54623), CDC173 (Gene ID 79577), BRD2 (Gene ID 6046), BRD3 (Gene ID 8019), BRD4 (Gene ID 23476), PHF8 (Gene ID 23133), PARP1 (Gene ID 142), DDX3X (Gene ID 1654), DDX3Y (Gene ID 8653), PTBP1 (Gene ID 5725), NUDT21 (Gene ID 11051), EIF4A3 (Gene ID 9775), ALYREF (Gene ID 10189), DDX39B (Gene ID 7919), NCBP1 (Gene ID 4686), THOC2 (Gene ID 57187), THOC6 (Gene ID 79228), POLDIP3 (Gene ID 84271), or ERH (Gene ID 2079). In one example, an antisense oligonucleotide is one provided in Example 5 and sequencing listing submitted herewith. In one example, an antisense oligonucleotide is a 2'-4'-constrained ethyl (cEt) or a 2'-O-methoxyethyl (MOE) gapmer, such as disclosed in Jauvin et al. (Molecular Therapy-Nucleic Acids Vol. 7, 16 Jun. 2017, pages 465-474) which is hereby incorporated by reference in its entirety.

Biological activity: The beneficial or adverse effects of an agent on living matter. When the agent is a complex chemical mixture, this activity is exerted by the substance's active ingredient or pharmacophore, but can be modified by the other constituents. Activity is generally dosage-dependent and it is not uncommon to have effects ranging from beneficial to adverse for one substance when going from low to high doses. In one example, the agent significantly reduces the biological activity of the one or more muscular dystrophy associated molecules disclosed herein which reduces one or more signs or symptoms associated with the muscular dystrophy, such as FSHD.

Contacting: Placement in direct physical association, including both a solid and liquid form. Contacting an agent with a cell can occur in vitro by adding the agent to isolated cells or in vivo by administering the agent to a subject.

Control: A sample or standard used for comparison with a test sample, such as a biological sample obtained from a patient (or plurality of patients) without a particular disease or condition, such as a muscular dystrophy. In some embodiments, the control is a sample obtained from a healthy patient (or plurality of patients) (also referred to herein as a "normal" control), such as a normal biological sample. In some embodiments, the control is a historical control or standard value (e.g., a previously tested control sample or group of samples that represent baseline or normal values (e.g., expression values), such as baseline or normal values of a particular gene, gene product in a subject without a muscular dystrophy). In some examples, the control is a standard value representing the average value (or average range of values) obtained from a plurality of patient samples (such as an average value or range of values of the gene or gene products in the subjects without a muscular dystrophy, such as FSHD).

Decrease: To reduce the quality, amount, or strength of something. In one example, a therapy decreases one or more symptoms associated with the muscular dystrophy, for example as compared to the response in the absence of the therapy. In a particular example, a therapy decreases (also known as down-regulates) the expression of a muscular dystrophy-associated molecule, such as a decrease of at least 10%, at least 20%, at least 25%, at least 30%, at least 40%, at least 50%, or even at least 90% in DUX4 expression. A gene product can be RNA (such as mRNA, rRNA, tRNA, and structural RNA) or protein. Therefore, gene downregulation or deactivation includes processes that decrease transcription of a gene or translation of mRNA.

Examples of processes that decrease transcription include those that facilitate degradation of a transcription initiation complex, those that decrease transcription initiation rate, those that decrease transcription elongation rate, those that decrease processivity of transcription and those that increase transcriptional repression. Gene downregulation can include reduction of expression above an existing level. Examples of processes that decrease translation include those that decrease translational initiation, those that decrease translational elongation and those that decrease mRNA stability.

Gene downregulation includes any detectable decrease in the production of a gene product. In certain examples, production of a gene product decreases by at least 2-fold, for example at least 3-fold or at least 4-fold, as compared to a control (such an amount of gene expression in a normal cell). In one example, a control is a relative amount of gene expression or protein expression in a biological sample taken from a subject who does not have muscular dystrophy, such as FSHD. Such decreases can be measured using the methods disclosed herein. For example, "detecting or measuring expression of a gene product" includes quantifying the amount of the gene, gene product or modulator thereof present in a sample. Quantification can be either numerical or relative. Detecting expression of the gene, gene product or modulators thereof can be achieved using any method known in the art or described herein, such as by measuring nucleic acids by PCR (such as RT-PCR) and proteins by ELISA. In primary embodiments, the change detected is an increase or decrease in expression as compared to a control, such as a reference value or a healthy control subject. In some examples, the detected increase or decrease is an increase or decrease of at least two-fold compared with the control or standard. Controls or standards for comparison to a sample, for the determination of differential expression, include samples believed to be normal (in that they are not altered for the desired characteristic, for example a sample from a subject who does not have muscular dystrophy, such as FHSD) as well as laboratory values (e.g., range of values), even though possibly arbitrarily set, keeping in mind that such values can vary from laboratory to laboratory.

Laboratory standards and values can be set based on a known or determined population value and can be supplied in the format of a graph or table that permits comparison of measured, experimentally determined values.

In other embodiments of the methods, the increase or decrease is of a diagnostically significant amount, which refers to a change of a sufficient magnitude to provide a statistical probability of the diagnosis.

The level of expression in either a qualitative or quantitative manner can detect nucleic acid or protein. Exemplary methods include microarray analysis, RT-PCR, Northern blot, Western blot, and mass spectrometry.

Diagnosis: The process of identifying a disease, such as muscular dystrophy, for example FSHD, by its signs, symptoms and results of various tests. The conclusion reached through that process is also called "a diagnosis." Forms of testing commonly performed include blood tests, medical imaging, urinalysis, and biopsy.

Effective amount: An amount of agent that is sufficient to generate a desired response, such as reducing lessening, ameliorating, eliminating, preventing, or inhibiting one or more signs or symptoms associated with a condition or disease treated and may be empirically determined. When administered to a subject, a dosage will generally be used that will achieve target tissue/cell concentrations. In some examples, an "effective amount" is one that treats one or more symptoms and/or underlying causes of any of a disorder or disease. In some examples, an "effective amount" is a therapeutically effective amount in which the agent alone with an additional therapeutic agent(s) (for example anti-pathogenic agents), induces the desired response such as treatment of a muscular dystrophy, such as FSHD. In various embodiments of the present disclosure, an "effective amount" is a "muscle regeneration promoting-amount," an amount sufficient to achieve a statistically significant promotion of tissue or cell regeneration, such as muscle cell regeneration, compared to a control. In particular, indicators of muscular health, such as muscle cell regeneration, maintenance, or repair, can be assessed through various means, including monitoring markers of muscle regeneration, such as transcription factors such as Pax7, Pax3, MyoD, MRF4, and myogenin, MRI, walk test scores, muscle biopsies. For example, increased expression of such markers can indicate that muscle regeneration is occurring or has recently occurred. Markers of muscle regeneration, such as expression of embryonic myosin heavy chain (eMyHC), can also be used to gauge the extent of muscle regeneration, maintenance, or repair. For example, the presence of eMyHC can indicate that muscle regeneration has recently occurred in a subject. In some examples, the clinical tool disclosed in Ricci et al. (J. Neurol. 2016 June; 263(6): 1204-14; which is hereby incorporated by reference) is utilized. In some examples, methods and compositions disclosed in EP3119909 A1 and International Application No. WO2105143062A1 are utilized, each of which is hereby incorporated by reference it its entirety.

Muscle cell regeneration, maintenance, or repair can also be monitored by determining the girth, or mean cross sectional area, of muscle cells or density of muscle fibers. Additional indicators of muscle condition include muscle weight and muscle protein content. Mitotic index (such as by measuring BrdU incorporation) and myogenesis can also be used to evaluate the extent of muscle regeneration. In particular examples, the improvement in muscle condition, such as regeneration, compared with a control is at least about 10%, such as at least about 30%, or at least about 50% or more.

In particular examples, it is an amount of an agent capable of modulating one or more of the disclosed genes, gene products or modulators thereof associated with a muscular dystrophy by least 20%, at least 50%, at least 60%, at least 70%, at least 80%, at least 90%, at least 95%, at least 98%, or even at least 100% (elimination of the disease to a point beyond detection) by the agent.

In some examples, an effective amount is an amount of a pharmaceutical preparation that alone, or together with a pharmaceutically acceptable carrier or one or more additional therapeutic agents, induces the desired response.

In one example, a desired response is to increase the subject's survival time by slowing the progression of the disease. The disease does not need to be completely inhibited for the pharmaceutical preparation to be effective. For example, a pharmaceutical preparation can decrease the progression of the disease by a desired amount, for example by at least 20%, at least 50%, at least 60%, at least 70%, at least 80%, at least 90%, at least 95%, at least 98%, or even at least 100%, as compared to the progression typical in the absence of the pharmaceutical preparation.

In another or additional example, it is an amount sufficient to partially or completely alleviate symptoms of the muscular dystrophy within the subject. Treatment can involve only slowing the progression of the disease temporarily, but can also include halting or reversing the progression of the disease permanently.

Effective amounts of the agents described herein can be determined in many different ways, such as assaying for a reduction in of one or more signs or symptoms associated with the muscular dystrophy in the subject or measuring the expression level of one or more molecules known to be associated with the muscular dystrophy. Effective amounts also can be determined through various in vitro, in vivo or in situ assays, including the assays described herein.

The disclosed therapeutic agents can be administered in a single dose, or in several doses, for example daily, during a course of treatment. However, the effective amount can be dependent on the source applied (for example a nucleic acid molecule isolated from a cellular extract versus a chemically synthesized and purified nucleic acid), the subject being treated, the severity and type of the condition being treated, and the manner of administration.

Expression: The process by which the coded information of a gene is converted into an operational, non-operational, or structural part of a cell, such as the synthesis of a protein. Gene expression can be influenced by external signals. For instance, exposure of a cell to a hormone may stimulate expression of a hormone-induced gene. Different types of cells can respond differently to an identical signal. Expression of a gene also can be regulated anywhere in the pathway from DNA to RNA to protein. Regulation can include controls on transcription, translation, RNA transport and processing, degradation of intermediary molecules such as mRNA, or through activation, inactivation, compartmentalization or degradation of specific protein molecules after they are produced.

The expression of a nucleic acid molecule can be altered relative to a normal (wild type) nucleic acid molecule. Alterations in gene expression, such as differential expression, include but are not limited to: (1) overexpression; (2) underexpression; or (3) suppression of expression. Alternations in the expression of a nucleic acid molecule can be associated with, and in fact cause, a change in expression of the corresponding protein.

Protein expression can also be altered in some manner to be different from the expression of the protein in a normal (wild type) situation. This includes but is not necessarily limited to: (1) a mutation in the protein such that one or more of the amino acid residues is different; (2) a short deletion or addition of one or a few (such as no more than 10-20) amino acid residues to the sequence of the protein; (3) a longer deletion or addition of amino acid residues (such as at least 20 residues), such that an entire protein domain or subdomain is removed or added; (4) expression of an increased amount of the protein compared to a control or standard amount; (5) expression of a decreased amount of the protein compared to a control or standard amount; (6) alteration of the subcellular localization or targeting of the protein; (7) alteration of the temporally regulated expression of the protein (such that the protein is expressed when it normally would not be, or alternatively is not expressed when it normally would be); (8) alteration in stability of a protein through increased longevity in the time that the protein remains localized in a cell; and (9) alteration of the localized (such as organ or tissue specific or subcellular localization) expression of the protein (such that the protein is not expressed where it would normally be expressed or is expressed where it normally would not be expressed), each compared to a control or standard. Controls or standards for comparison to a sample, for the determination of differential expression, include samples believed to be normal (in that they are not altered for the desired characteristic, for example a sample from a subject who does not have muscular dystrophy, such as FSHD) as well as laboratory values (e.g., range of values), even though possibly arbitrarily set, keeping in mind that such values can vary from laboratory to laboratory.

Laboratory standards and values can be set based on a known or determined population value and can be supplied in the format of a graph or table that permits comparison of measured, experimentally determined values.

Improving muscular health: An improvement in muscular health compared with a preexisting state or compared with a state which would occur in the absence of treatment. For example, improving muscular health may include enhancing muscle regeneration, maintenance, or repair. Improving muscular health may also include prospectively treating a subject to prevent or reduce muscular damage or injury.

Inhibiting a disease or condition: A phrase referring to inhibiting the development of a disease or condition, such as reducing, decreasing or delaying a sign or symptom associated with the disease or condition, for example, in a subject who is at risk of acquiring the disease/condition or has the particular disease/condition. Particular methods of the present disclosure provide methods for inhibiting muscular dystrophy, such as FSHD.

Maintenance of cells or tissue: A phrase refers to maintaining cells or tissue, such as muscle cells or muscle tissue, in at least substantially the same physiological condition, such as maintaining such condition even in the presence of stimulus which would normally cause damage, injury, or disease.

MicroRNA (miRNA): Single-stranded RNA molecules that regulate gene expression. miRNAs are generally 21-23 nucleotides in length. miRNAs are processed from primary transcripts known as pri-miRNA to short stem-loop structures called pre-miRNA and finally to functional miRNA. Mature miRNA molecules are partially complementary to one or more messenger RNA molecules, and their primary function is to down-regulate gene expression. MicroRNAs regulate gene expression through the RNAi pathway.

Muscle: Any myoblast, myocyte, myofiber, myotube or other structure composed of muscle cells. Muscles or myocytes can be skeletal, smooth, or cardiac. Muscle may also refer to, in particular implementations of the present disclosure, cells or other materials capable of forming myocytes, such as stem cells and satellite cells.

Muscular dystrophy: A term used to refer to a group of genetic disorders that lead to progressive muscle weakness. Muscular dystrophy can result in skeletal muscle weakness and defects in skeletal muscle proteins, leading to a variety of impaired physiological functions. No satisfactory treatment of muscular dystrophy exists. Existing treatments typically focus on ameliorating the effects of the disease and improving the patient's quality of life, such as through physical therapy or through the provision of orthopedic devices.

Facioscapulohumeral muscular dystrophy (FSHD) is a form of muscular dystrophy associated with progressive muscle weakness and loss of muscle tissue. Unlike DMD and BMD which mainly affect the lower body, FSHD affects the upper body mainly the face, shoulder and upper arm muscles. However, it can affect muscles around the pelvis, hips, and lower leg. Symptoms for FSHD often do not appear until age 10-26, but it is not uncommon for symptoms to appear much later. In some cases, symptoms never develop. Symptoms are usually mild and very slowly become worse. Facial muscle weakness is common, and may include eyelid drooping, inability to whistle, decreased facial expression, depressed or angry facial expression, difficulty pronouncing words, shoulder muscle weakness (leading to deformities such as pronounced shoulder blades (scapular winging) and sloping shoulders), weakness of the lower, hearing loss and possible heart conditions.

Muscular dystrophy-associated molecule: A molecule whose expression or biological activity is altered in subject with muscular dystrophy. Such molecules include, for instance, nucleic acid sequences (such as DNA, cDNA, or mRNAs) and proteins. Specific genes include those disclosed herein, including the Examples, as well as fragments of the full-length genes, cDNAs, or mRNAs (and proteins encoded thereby) whose expression is altered (such as upregulated or downregulated) in response to muscular dystrophy, including FSHD. Thus, the presence or absence of the respective muscular dystrophy-associated molecules can be used to diagnose and/or determine the prognosis of a muscular dystrophy, and in particular FSHD in a subject as well as to treat a subject with a muscular dystrophy, such as FSHD. In some examples, it is a molecule associated with one or more signs or symptoms of a muscular dystrophy-associated condition or disease. In some examples, a muscular dystrophy-associated molecule is one or more molecules associated with FSHD, such as DUX4.

Pharmaceutically acceptable carriers: The pharmaceutically acceptable carriers (vehicles) useful in this disclosure are conventional. Remington's Pharmaceutical Sciences, by E. W. Martin, Mack Publishing Co., Easton, PA, 19th Edition (1995), describes compositions and formulations suitable for pharmaceutical delivery of one or more therapeutic agents, such as one or more compositions that include a binding agent that specifically binds to at least one of the disclosed muscular dystrophy-associated molecules.

In general, the nature of the carrier will depend on the particular mode of administration being employed. For instance, parenteral formulations can include injectable fluids that include pharmaceutically and physiologically acceptable fluids such as water, physiological saline, balanced salt solutions, aqueous dextrose, glycerol or the like as a vehicle. In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate, sodium lactate, potassium chloride, calcium chloride, and triethanolamine oleate.

Polymerase Chain Reaction (PCR): An in vitro amplification technique that increases the number of copies of a nucleic acid molecule (for example, a nucleic acid molecule in a sample or specimen). In an example, a biological sample collected from a subject is contacted with a pair of oligonucleotide primers, under conditions that allow for the hybridization of the primers to nucleic acid template in the sample. The primers are extended under suitable conditions, dissociated from the template, and then re-annealed, extended, and dissociated to amplify the number of copies of the nucleic acid. The product of a PCR can be characterized by electrophoresis, restriction endonuclease cleavage patterns, oligonucleotide hybridization or ligation, and/or nucleic acid sequencing, using standard techniques or other standard techniques known in the art.

Prognosis: A prediction of the course of a disease, such as muscular dystrophy. The prediction can include determining the likelihood of a subject to develop aggressive, recurrent disease, to survive a particular amount of time (e.g. determine the likelihood that a subject will survive 1, 2, 3 or 5 years), to respond to a particular therapy or combinations thereof.

Regeneration: The repair of cells or tissue, such as muscle cells or tissue (or organs) which includes muscle cells, following injury or damage to at least partially restore the muscle or tissue to a condition similar to which the cells or tissue existed before the injury or damage occurred. Regeneration also refers to facilitating repair of cells or tissue in a subject having a disease affecting such cells or tissue to eliminate or ameliorate the effects of the disease. In more specific examples, regeneration places the cells or tissue in the same condition or an improved physiological condition as before the injury or damage occurred or the condition which would exist in the absence of disease.

Repair of cells or tissue: A phrase which refers to the physiological process of healing damage to the cells or tissue such as muscle cells or tissue (or organs) following damage or other trauma.

RNA interference (RNAi): Refers to a cellular process that inhibits expression of genes, including cellular and viral genes. RNAi is a form of antisense-mediated gene silencing involving the introduction of double stranded RNA-like oligonucleotides leading to the sequence-specific reduction of RNA transcripts. Double-stranded RNA molecules that inhibit gene expression through the RNAi pathway include siRNAs, miRNAs, and shRNAs.

Sample (or biological sample): A biological specimen containing genomic DNA, RNA (including mRNA), protein, or combinations thereof, obtained from a subject. Examples include, but are not limited to, peripheral blood, urine, saliva, tissue biopsy, surgical specimen, and autopsy material. In one example, a sample includes muscle biopsy, such as from a subject with FSHD.

Short hairpin RNA (shRNA): A sequence of RNA that makes a tight hairpin turn and can be used to silence gene expression via the RNAi pathway. The shRNA hairpin structure is cleaved by the cellular machinery into siRNA.

Signs or symptoms: Any subjective evidence of disease or of a subject's condition, e.g., such evidence as perceived by the subject; a noticeable change in a subject's condition indicative of some bodily or mental state. A "sign" is any abnormality indicative of disease, discoverable on examination or assessment of a subject. A sign is generally an objective indication of disease. Signs include, but are not limited to any measurable parameters such as tests for detecting muscular dystrophy, including measuring creatine kinase levels, electromyography (to determine if weakness is caused by destruction of muscle tissue rather than by damage to nerves) or immunohistochemistry/immunoblotting/immunoassay (e.g., ELISA) to measure muscular dystrophy-associated molecules. In one example, reducing or inhibiting one or more symptoms or signs associated with muscular dystrophy, includes reducing or inhibiting the activity or expression of one or more disclosed muscular dystrophy-associated molecules by a desired amount, for example by at least 20%, at least 50%, at least 60%, at least 70%, at least 80%, at least 90%, at least 95%, at least 98%, or even at least 100%, as compared to the activity and/or expression in the absence of the treatment. Symptoms of muscular dystrophy include, but are not limited to, muscle weakness and loss, difficulty running, difficulty hopping, difficulty jumping, difficulty walking, difficulty breathing, fatigue, skeletal deformities, muscle deformities (contractions of heels; pseudohypertrophy of calf muscles), heart disease (such as dilated cardiomyopathy), elevated creatine phosphokinase (CK) levels in blood or combinations thereof.

Small interfering RNA (siRNA): A double-stranded nucleic acid molecule that modulates gene expression through the RNAi pathway (see, for example, Bass, Nature 411:428-9, 2001; Elbashir et al., Nature 411:494-8, 2001; and PCT Publication Nos. WO 00/44895; WO 01/36646; WO 99/32619; WO 00/01846; WO 01/29058; WO 99/07409; and WO 00/44914). siRNA molecules are generally 20-25 nucleotides in length with 2-nucleotide overhangs on each 3' end. However, siRNAs can also be blunt ended. Generally, one strand of a siRNA molecule is at least partially complementary to a target nucleic acid. siRNAs are also referred to as "small inhibitory RNAs," "small interfering RNAs" or "short inhibitory RNAs." As used herein, siRNA molecules need not be limited to those molecules containing only RNA, but further encompasses chemically modified nucleotides and non-nucleotides having RNAi capacity or activity. In an example, a siRNA molecule is one that reduces or inhibits the biological activity or expression of a disclosed gene product.

Subject: Living multi-cellular vertebrate organisms, a category that includes Tissue: An aggregate of cells, usually of a particular kind, together with their intercellular substance that form one of the structural materials of an animal and that in animals include connective tissue, epithelium, muscle tissue, and nerve tissue.

Treating a disease: A therapeutic intervention that ameliorates a sign or symptom of a disease or pathological condition related to a muscular dystrophy, such as a sign or symptom of FSHD. Treatment can induce remission or cure of a condition or slow progression, for example, in some instances can include inhibiting the full development of a disease, for example preventing development of a muscular dystrophy. Prevention of a disease does not require a total absence of disease. For example, a decrease of at least 10%, such as at least 20%, at least 25%, at least 30%, at least 40%, at least 50%, decrease in a sign or symptom associated with the condition or disease, such as FSHD, can be sufficient. As used herein, the term "ameliorating," with reference to a disease or condition, refers to any observable beneficial effect of the treatment. The beneficial effect can be evidenced, for example, by a delayed onset of clinical symptoms of the disease or condition in a susceptible subject, a reduction in severity of some or all clinical symptoms of the disease or condition, a slower progression of the disease or condition, a reduction in the number of relapses of the disease or condition, an improvement in the overall health or well-being of the subject, by other parameters well known in the art that are specific to the particular disease or condition, and combinations of such factors.

II. Methods of Treating Muscular Dystrophy

Disclosed herein are methods of treating FSHD. The disclosed methods include modulating one or more of the disclosed FSHD-associated molecules. For example, it is shown herein that inhibition of various NuRD/MBD2 complex members (for example, HDAC1/2, CHD4, MBD2) via siRNA leads to enhanced expression of DUX4, ZSCAN4 and TRIM43 target genes to varying levels. Further, the MBD1/CAF-1 complex was found to be targeted via siRNA. In particular, inhibition of CHAF1A/B, MBD1 and CHAF1A/CHD4 increases DUX4 target genes DUX4, ZSCAN4, and TRIM43.

Based on these observations, methods of treatment to reduce, inhibit or eliminate one or more signs or symptoms associated with FSHD are disclosed. In some examples, methods of treatment comprise administering one or more agents that increase NuRD and/or CAF-1 repression of DUX4, such as DUX4 activity and/or expression. Methods are also disclosed for treatment of FSHD by inhibition of MBD3L2 protein with small molecules or antisense compounds, such as siRNAs. As disclosed herein, MBD3L2 regulated by doxycycline leads to increased expression of DUX4 target genes in both FSHD1 and FSHD2 myoblasts. Further, a 30-50% reduction in DUX4 expression was observed upon MBD3L family short hairpin RNA inhibition in FSHD myotubes.

Additional methods of treatment of FSHD disclosed herein include myoblast transplantation with cells containing larger D4Z4 repeat sizes of non-permissive alleles of DUX4 to serve as "decoy" nuclei to MBD3L2 and autologous transplant following deletion of the D4Z4 array and/or the MBD3L2-5 cluster to serve as "decoy" nuclei. In a particular example, the subject is a human.

In one example, the method includes administering an effective amount of an agent to a subject with muscular dystrophy in which the agent decreases the biological activity or expression of one or more of the disclosed muscular dystrophy-associated molecules, such as DUX4. Such agents can alter the expression of nucleic acid sequences (such as DNA, cDNA, or mRNAs) and proteins. A decrease in the expression does not need to be 100% for the composition to be effective. For example, an agent can decrease the expression or biological activity by a desired amount, for example by at least 20%, at least 50%, at least 60%, at least 70%, at least 80%, at least 90%, at least 95%, at least 98%, or even at least 100% as compared to activity or expression in a control.

In particular examples, the agent is a specific binding agent that binds to and decreases the expression of one or more of the disclosed muscular dystrophy-associated molecules. Specific molecules include inhibitors of one or more of DUX4 expression as well as fragments of the full-length molecules, cDNAs, or mRNAs (and proteins encoded thereby) whose expression is increased in response to muscular dystrophy, such as FSHD. The agents can alter the activity or expression of the one or more disclosed muscular dystrophy-associated molecules well as other molecules involved in muscular dystrophy progression.

In particular examples, the agent is an inhibitor such as a siRNA to one of the disclosed muscular dystrophy-associated molecules that is upregulated in muscular dystrophy patients. For example, the agent can be a siRNA that interferes with mRNA expression of one of the disclosed muscular dystrophy-associated molecules. For example, the agent is a siRNA that reduces expression of DUX4, such as a siRNA that inhibits MBD3L2 protein that in turn decreases DUX4 expression. In additional examples, a composition includes at least two agents such as two specific siRNAs that each bind to their respective muscular dystrophy-associated nucleotide sequences and inhibit one or more signs or symptoms associated with muscular dystrophy in the subject.

In particular examples, the agent is a specific binding agent that binds to and increases the expression of one or more of the disclosed muscular dystrophy-associated molecules. Specific molecules include compositions that increase NuRD and/or CAF-1 complex repression of DUX4. In some embodiments, the composition increases the activity and/or expression of NuRD/MBD2 and/or MBD1/CAF-1 complex members, such as one or more of HDAC1, HDAC2, CHD4, and MBD2. For example, MBD1/CAF-1 complex members can comprise one or more of CHAF1A, CHAF1B, RBBP4, and MBD1. In some examples, a transgene is administered to increase one or more of the disclosed muscular dystrophy-associated molecules. In some examples, any of the aforementioned proteins are exogenously administered to increase levels of said disclosed muscular dystrophy-associated molecules.

Therapeutic Agents

Therapeutic agents are agents that when administered in therapeutically effective amounts induce the desired response (e.g., treatment of muscular dystrophy). In one example, therapeutic agents are specific binding agents that bind with higher affinity to a molecule of interest, than to other molecules. For example, a specific binding agent can be one that binds with high affinity to one of the genes or gene products of a disclosed muscular dystrophy-associated molecules, but does not substantially bind to another gene or gene product. In some examples, a specific binding agent binds to one muscular dystrophy molecules that are upregulated in muscular dystrophy subjects, such as DUX4 in FSHD subjects, thereby reducing or inhibiting expression of the gene, but does not bind to the other genes (or gene product). For example, the agent can interfere with gene expression (transcription, processing, translation, post-translational modification), such as, by interfering with the gene's mRNA and blocking translation of the gene product or by post-translational modification of a gene product, or by causing changes in intracellular localization. In another example, a specific binding agent binds to a protein encoded by of one of the genes disclosed herein to be associated with muscular dystrophy with a binding affinity in the range of 0.1 to 20 nM and reduces or inhibits the activity of such protein.

Examples of specific binding agents include siRNAs, antibodies, ligands, recombinant proteins, peptide mimetics, and soluble receptor fragments. One example of a specific binding agent is a siRNA. Methods of making siRNAs that can be used clinically are known in the art. Particular siRNAs and methods that can be used to produce and administer them are described in detail below. In a specific example, a specific binding agent includes a MBD3L2 siRNA molecule, such as a 8 to 25 nucleotide sequence of human MBD3L2 (Gene ID 125997 as provided on Nov. 5, 2017 on the World Wide Web ncbi.nlm.nih.gov address which is hereby incorporated by reference in its entirety). Another specific example of a specific binding agent is an antibody, such as a monoclonal or polyclonal antibody. Methods of making antibodies that can be used clinically are known in the art. Particular antibodies and methods that can be used to produce them are known to those of ordinary skill in the art. In a further example, small molecular weight inhibitors or antagonists of the receptor protein can be used to regulate activity such as the expression or production of muscular dystrophy-associated molecules. In a particular example, small molecular weight inhibitors or antagonists of the proteins encoded by the genes involved in DUX4 enhanced expression.

Specific binding agents can be therapeutic, for example by reducing or inhibiting the biological activity of a nucleic acid or protein that is associated muscular dystrophy progression. For example, a specific binding agent that binds with high affinity to one or more genes disclosed herein to be upregulated in subjects with muscular dystrophy, may substantially reduce the biological function of the gene or gene product. In other examples, a specific binding agent that binds with high affinity to one of the proteins disclosed herein to be upregulated in subjects with muscular dystrophy, may substantially reduce the biological function of the protein. Such agents can be administered in effective amounts to subjects in need thereof, such as a subject having muscular dystrophy, such as FSHD.

Further implementations of the disclosed method include diagnosing the subject as having a condition treatable by administering a DUX4 regulator. In a specific embodiment, the present disclosure also provides a method for increasing muscle regeneration in a subject. In further embodiments, the method of the present disclosure includes administering a disclosed composition, with one or more additional pharmacological substances, such as a therapeutic agent. In some aspects, the additional therapeutic agent enhances the therapeutic effect of the disclosed composition. In further aspects, the therapeutic agent provides independent therapeutic benefit for the condition being treated.

In some examples, a disclosed composition is applied to a particular area of the subject to be treated. For example, the composition may be injected into a particular area to be treated, such as skeletal muscle. In further examples, the composition is administered such that it is distributed to multiple areas of the subject, such as systemic administration or regional administration.

It is contemplated that any of the compositions disclosed herein can be administered by any suitable method, such as topically, parenterally (such as intravenously or intraperitoneally), or orally. In a specific example, the composition is administered systemically, such as through parenteral administration, such as stomach injection or peritoneal injection.

Although the disclosed methods generally have been described with respect to muscle regeneration, the disclosed methods also may be used to enhance repair or maintenance, or prevent damage to, other tissues and organs.

Pre-Screening Therapeutic Agents
Specific Binding Agents—Antisense Compounds

Generally, the principle behind antisense technology is that an antisense compound hybridizes to a target nucleic acid and effects the modulation of gene expression activity, or function, such as transcription, translation or splicing. The modulation of gene expression can be achieved by, for example, target RNA degradation or occupancy-based inhibition. An example of modulation of target RNA function by degradation is RNase H-based degradation of the target RNA upon hybridization with a DNA-like antisense compound, such as an antisense oligonucleotide. Antisense oligonucleotides can also be used to modulate gene expression, such as splicing, by occupancy-based inhibition, such as by blocking access to splice sites.

Another example of modulation of gene expression by target degradation is RNA interference (RNAi) using small interfering RNAs (siRNAs). RNAi is a form of antisense-mediated gene silencing involving the introduction of double stranded (ds)RNA-like oligonucleotides leading to the sequence-specific reduction of targeted endogenous mRNA levels. Another type of antisense compound that utilizes the RNAi pathway is a microRNA. MicroRNAs are naturally occurring RNAs involved in the regulation of gene expression. However, these compounds can be synthesized to regulate gene expression via the RNAi pathway. Similarly, shRNAs are RNA molecules that form a tight hairpin turn and can be used to silence gene expression via the RNAi pathway. The shRNA hairpin structure is cleaved by the cellular machinery into siRNA.

Other compounds that are often classified as antisense compounds are ribozymes. Ribozymes are catalytic RNA molecules that can bind to specific sites on other RNA molecules and catalyze the hydrolysis of phosphodiester bonds in the RNA molecules. Ribozymes modulate gene expression by direct cleavage of a target nucleic acid, such as a messenger RNA.

In one non-limiting embodiment, double-stranded antisense compounds encompass siRNAs. siRNAs are double-stranded compounds having a first and second strand (referred to as the "sense strand" and "antisense strand"). In some embodiments, each strand has a central portion and two independent terminal portions. The central portion of the first strand is complementary to the central portion of the second strand, allowing hybridization of the strands. The terminal portions are independently, optionally complementary to the corresponding terminal portion of the complementary strand. The ends of the strands may be modified by the addition of one or more natural or modified nucleotides to form an overhang. In one non-limiting example, the first strand of the siRNA is antisense to the target nucleic acid (the antisense strand), while the second strand is complementary to the first strand (the sense strand).

Once the antisense strand is designed to target a particular nucleic acid target, the sense strand of the siRNA can then be designed and synthesized as the complement of the antisense strand and either strand may contain modifications or additions to either terminus. For example, in one embodiment, both strands of the siRNA duplex are complementary over the central nucleotides, each having overhangs at one or both termini. It is possible for one end of a duplex to be blunt and the other to have overhanging nucleotides. In one embodiment, the number of overhanging nucleotides is from 1 to 6 on the 3' end of each strand of the duplex. In another embodiment, the number of overhanging nucleotides is from 1 to 6 on the 3' end of only one strand of the duplex. In a further embodiment, the number of overhanging nucleotides is from 1 to 6 on one or both of the 5' ends of the duplexed strands. In another embodiment, the number of overhanging nucleotides is zero. In one embodiment, each of the strands is 19 nucleotides in length, fully hybridizable with the complementary strand, and includes no overhangs. In other embodiments, each of the strands is 21 nucleotides in length, and 19 nucleotides are fully hybridizable with the complementary strand and each strand has a 2-nucleotide overhang at the 3' end.

Generally, each strand of the siRNA duplex is from about 12 to about 35 nucleotides. In some embodiments, each strand of the siRNA duplex is about 17 to about 25 nucleotides. In some embodiments, each strand of the siRNA duplex is about 19 to about 21 nucleotides in length. The central complementary portion may be from about 12 to about 35 nucleotides in length. In one embodiment, the central complimentary portion is about 17 to about 25 nucleotides in length, or about 19 to about 21 nucleotides in length. It is understood that each the strand of the siRNA duplex and the central complementary portion may be about 12, 13, 14, 15, 16, 17, 18, 19, 20, 21, 22, 23, 24, 25, 26, 27, 28, 29, 30, 31, 32, 33, 34, or 35 nucleotides in length. The terminal portions can be from 1 to 6 nucleotides. It is understood that the terminal portions can be about 1, 2, 3, 4, 5, or 6 nucleotides in length. The siRNAs may also have no terminal portions. The two strands of a siRNA can be linked internally leaving free 3' or 5' termini, or can be linked to form a continuous hairpin structure or loop. The hairpin structure may contain an overhang on either the 5' or 3' terminus producing an extension of single-stranded character.

Each of the above-described antisense compounds provides sequence-specific target gene regulation. This sequence-specificity makes antisense compounds effective tools for the selective modulation of a target nucleic acid of interest. In some embodiments, the target nucleic acid is MBD3L2.

A. Target Gene-Specific Antisense Compounds

As taught herein, inhibition of MBD3L family gene expression results in decreased DUX4 expression. In one embodiment, expression of a target gene (such as MBD3L2) is inhibited by at least 10%, such as by at least 25%, at least 50%, at least 75%, at least 90%, or at least 95% relative to a control, such as untreated control cells.

Thus, provided are methods of using antisense compounds that target one or more molecules that regulate DUX4 expression to selectively treat a subject with muscular dystrophy, such as FSHD. Any type of antisense compound that specifically targets and regulates expression of one of the disclosed target genes is contemplated for use with the disclosed methods. Such antisense compounds include single-stranded compounds, such as antisense oligonucleotides, and double-stranded compounds, including compounds with at least partial double-stranded structure, including siRNAs, miRNAs, shRNAs and ribozymes. Methods of designing, preparing and using antisense compounds that specifically target a selected gene are within the abilities of one of skill in the art. Furthermore, sequences for MBD3L2 are publicly available, such as Gene ID 125997 as provided on Nov. 5, 2017 on the World Wide Web ncbi.nlm-.nih.gov address which is hereby incorporated by reference in its entirety.

Antisense compounds targeting the desired gene need not be 100% complementary to the gene to specifically hybridize and regulate expression the target gene. For example, the antisense compound, or antisense strand of the compound if a double-stranded compound, can be at least 75%, at least 80%, at least 85%, at least 90%, at least 95%, at least 99% or 100% complementary to the selected target nucleic acid sequence. Methods of screening antisense compounds for specificity are well known in the art (see, for example, U.S. Application Publication No. 2003-0228689).

B. Generation of shRNA Constructs

Typically, shRNA is transcribed in cells from a DNA template as a single-stranded RNA molecule of approximately 50 to 100 bases in length. Complementary regions spaced by a small loop region cause the transcript to fold back on itself forming a short hairpin in a manner analogous to natural microRNA. Recognition and processing by the RNAi machinery converts the shRNA into the corresponding siRNA.

There are several methods for generating shRNA constructs (see, for example, McIntyre and Fanning, *BMC Biotechnol.* 6:1, 2006, PCT Publication No. WO 2007/010840, and U.S. Application Publication Nos. 2007-0231807 and 2007-014594). One strategy is a PCR-based approach in which a promoter sequence serves as the template. The hairpin sequence is contained in the reverse primer and PCR results in a cloning cassette comprising both promoter and hairpin. Correct amplicon production is dependent upon the sequence of the reverse primer.

Another method encompasses several techniques relating to primer extension. Each is based on the principle of a polymerase extending the 3' end of overlapping oligonucleotides. In one example, the shRNA template is formed from two long partially complementary oligonucleotides of approximately equal length, overlapping at their 3' ends (Unwalla et al., *Nat. Biotechnol.* 22(12):1573-1578, 2004; Zeng et al., *Methods Enzymol.* 392:371-380, 2005). Each oligonucleotide serves as both template (for extending the opposite oligonucleotide) and primer (to copy the opposite oligonucleotide). Extension and repeated cycling generates a double-stranded product, similar to that generated in the annealed oligonucleotide method. In a variation of this method, one long oligonucleotide is used as the template and a second short oligonucleotide (generic) is used as the primer for extension. The product can be further amplified by PCR with addition of another short primer binding the extended strand (Paddison et al., *Nat Methods*. 1:163-167, 2004).

The most common method for generating shRNA constructs involves the synthesis, annealing and ligation of two complementary oligonucleotides into an expression vector. A number of shRNA expression vectors systems are known in the art and are commercially available. For example, the BLOCK-iT™ adenoviral vector system (Invitrogen) allows for efficient delivery of shRNA sequences into a variety of cell types via transfection, transduction or infection with recombinant virus. The Knockout Inducible RNAi System (Clontech) allows for inducible of expression of a shRNA. Also available are the pDsiPHER™ vectors (MoleculA), which are designed to express shRNAs of approximately 59-61 nucleotides in length. Regardless of the expression vector used, the shRNA, once inside a cell, is processed into a siRNA of approximately 19 nucleotides in length, which modulates gene expression via the RNAi pathway.

The shRNA expression vectors can be virus-based vectors or plasmid vectors. In one embodiment, the vector is an adenovirus based vector. The vectors can express the shRNA constitutively or inducibly, depending on the promoter used to drive expression of the shRNA. In addition, shRNA vectors can be used for transient or stable transfection. The vectors can optionally include features such as reporter genes or selection markers (for example, antibiotic resistance). The expression vectors can be targeted to specific tissues via conjugation to a tissue-specific ligand. Alternatively, tissue-specific expression can be achieved using a tissue-specific promoter.

In some cases, the shRNA is encoded by a recombinant virus. The recombinant virus can be delivered to cells in vitro or to a subject in vivo. Targeted delivery of the recombinant virus to a particular tissue type can be achieved using any means known in the art. For example, the recombinant virus can be conjugated with a tissue-specific or cell-specific ligand. The ligand targets the recombinant virus to the cell or tissue expressing the receptor for the ligand. Alternatively, the recombinant virus can be selected based on the tissue types the virus normally infects (referred to as viral tropism). Also, the expression of the shRNA encoded by the recombinant virus can be driven by a tissue-specific promoter. In this case, additional tissue types may be infected with the virus, but the shRNA would only be expressed in the tissues in which the promoter is active.

C. Antisense Compound Modifications

In some examples, the antisense compounds described herein contain one or more modifications to enhance nuclease resistance and/or increase activity of the compound. Modified antisense compounds include those comprising modified backbones or non-natural internucleoside linkages. As defined herein, antisense compounds having modified backbones include those that retain a phosphorus atom in the backbone and those that do not have a phosphorus atom in the backbone.

Examples of modified oligonucleotide backbones include, but are not limited to, phosphorothioates, chiral phosphorothioates, phosphorodithioates, phosphotriesters, aminoalkylphosphotriesters, methyl and other alkyl phosphonates including 3'-alkylene phosphonates and chiral phosphonates, phosphinates, phosphoramidates including 3'-amino phosphoramidate and aminoalkylphosphoramidates, thionophosphoramidates, thionoalkyl-phosphonates, thionoalkylphosphotriesters, and boranophosphates having normal 3'-5' linkages, 2'-5' linked analogs of these, and those having inverted polarity wherein the adjacent pairs of the nucleoside units are linked 3'-5' to 5'-3' or 2'-5' to 5'-2'. Representative U.S. patents that teach the preparation of the above phosphorus-containing linkages include, but are not limited to, U.S. Pat. Nos. 3,687,808; 4,469,863; 4,476,301; 5,023,243; 5,177,196; 5,188,897; 5,264,423; 5,276,019; 5,278,302; 5,286,717; 5,321,131; 5,399,676; 5,405,939; 5,453,496; 5,455,233; 5,466,677; 5,476,925; 5,519,126; 5,536,821; 5,541,306; 5,550,111; 5,563,253; 5,571,799; 5,587,361; and 5,625,050.

Examples of modified oligonucleotide backbones that do not include a phosphorus atom therein have backbones that are formed by short chain alkyl or cycloalkyl internucleoside linkages, mixed heteroatom and alkyl or cycloalkyl internucleoside linkages, or one or more short chain heteroatomic or heterocyclic internucleoside linkages. These include those having morpholino linkages (formed in part from the sugar portion of a nucleoside); siloxane backbones; sulfide, sulfoxide and sulfone backbones; formacetyl and thioformacetyl backbones; methylene formacetyl and thioformacetyl backbones; alkene containing backbones; sulfamate backbones; methyleneimino and methylenehydrazino backbones; sulfonate and sulfonamide backbones; amide backbones; and others having mixed N, O, S and $CH_2$ component parts. Representative U.S. patents that teach the preparation of the above oligonucleosides include, but are not limited to, U.S. Pat. Nos. 5,034,506; 5,166,315; 5,185,444; 5,214,134; 5,216,141; 5,235,033; 5,264,562; 5,264,564; 5,405,938; 5,434,257; 5,466,677; 5,470,967; 5,489,677; 5,541,307; 5,561,225; 5,596,086; 5,602,240; 5,610,289; 5,602,240; 5,608,046; 5,610,289; 5,618,704; 5,623,070; 5,663,312; 5,633,360; 5,677,437; and 5,677,439.

In some embodiments, both the sugar and the internucleoside linkage of the nucleotide units of the antisense compound are replaced with novel groups. One such modified compound is an oligonucleotide mimetic referred to as a peptide nucleic acid (PNA). In PNA compounds, the sugar-backbone of an oligonucleotide is replaced with an amide containing backbone, in particular an aminoethylglycine backbone. The bases are retained and are bound directly or indirectly to aza nitrogen atoms of the amide portion of the backbone. Representative U.S. patents that teach the preparation of PNA compounds include, but are not limited to, U.S. Pat. Nos. 5,539,082; 5,714,331; and 5,719,262. Further teaching of PNA compounds can be found in Nielsen et al. (*Science* 254, 1497-1500, 1991).

Modified antisense compound can also contain one or more substituted sugar moieties. In some examples, the antisense compounds can comprise one of the following at the 2' position: OH; F; O-, S-, or N-alkyl; O-, S-, or N-alkenyl; O-, S- or N-alkynyl; or O-alkyl-O-alkyl, wherein the alkyl, alkenyl and alkynyl may be substituted or unsubstituted $C_1$ to $C_{10}$ alkyl or $C_2$ to $C_{10}$ alkenyl and alkynyl. In other embodiments, the antisense compounds comprise one of the following at the 2' position: $C_1$ to $C_{10}$ lower alkyl, substituted lower alkyl, alkaryl, aralkyl, O-alkaryl or O-aralkyl, SH, $SCH_3$, OCN, Cl, Br, CN, $CF_3$, $OCF_3$, $SOCH_3$, $SO_2CH_3$, $ONO_2$, $NO_2$, $N_3$, $NH_2$, heterocycloalkyl, heterocycloalkaryl, aminoalkylamino, polyalkylamino, substituted silyl, an RNA cleaving group, a reporter group, an intercalator, a group for improving the pharmacokinetic properties of an oligonucleotide, or a group for improving the pharmacodynamic properties of an oligonucleotide, and other substituents having similar properties. In one example, the modification includes 2'-methoxyethoxy (also known as 2'-O-(2-methoxyethyl) or 2'-MOE) (Martin et al., *Helv. Chin. Acta.*, 78, 486-504, 1995). In other examples, the modification includes 2'-dimethylaminooxyethoxy (also known as 2'-DMAOE) or 2'-dimethylaminoethoxyethoxy (also known in the art as 2'-O-dimethylaminoethoxyethyl or 2'-DMAEOE).

Similar modifications can also be made at other positions of the compound. Antisense compounds can also have sugar mimetics such as cyclobutyl moieties in place of the pentofuranosyl sugar. Representative United States patents that teach the preparation of modified sugar structures include, but are not limited to, U.S. Pat. Nos. 4,981,957; 5,118,800; 5,319,080; 5,359,044; 5,393,878; 5,446,137; 5,466,786; 5,514,785; 5,519,134; 5,567,811; 5,576,427; 5,591,722; 5,597,909; 5,610,300; 5,627,053; 5,639,873; 5,646,265; 5,658,873; 5,670,633; and 5,700,920.

Antisense compounds can also include base modifications or substitutions. As used herein, "unmodified" or "natural" bases include the purine bases adenine (A) and guanine (G), and the pyrimidine bases thymine (T), cytosine (C) and uracil (U). Modified bases include other synthetic and natural bases, such as 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 8-azaguanine and 8-azaadenine, 7-deazaguanine and 7-deazaadenine and 3-deazaguanine and 3-deazaadenine. Further modified bases have been described (see, for example, U.S. Pat. No. 3,687,808; and Sanghvi, Y. S., Chapter 15, Antisense Research and Applications, pages 289-302, Crooke, S. T. and Lebleu, B., ed., CRC Press, 1993). Certain of these modified bases are useful for increasing the binding affinity of antisense compounds. These include 5-substituted pyrimidines, 6-azapyrimidines and N-2, N-6 and O-6 substituted purines, including 2-aminopropyladenine, 5-propynyluracil and 5-propynylcytosine. 5-methylcytosine substitutions have been shown to increase nucleic acid duplex stability by 0.6-1.2° C. Representative U.S. patents that teach the preparation of modified bases include, but are not limited to, U.S. Pat. Nos. 4,845,205; 5,130,302; 5,134,066; 5,175,273; 5,367,066; 5,432,272; 5,457,187; 5,459,255; 5,484,908; 5,502,177; 5,525,711; 5,552,540; 5,587,469; 5,594,121; 5,596,091; 5,614,617; 5,681,941; and 5,750,692.

D. Delivery of Antisense Compounds

Antisense compounds can be delivered to a cell, tissue or organ using any of a number of methods well known in the art. Such methods include, but are not limited to, liposomal-mediated transfection, electroporation and conjugation of the antisense compound to a cell-penetrating peptide (CPP). Transfection of antisense compounds generally involves the use of liposomal-mediated transfection reagents, a number of which are commercially available. Methods for transfection and electroporation of nucleic acids, including antisense compounds, are well known in the art (see, for example, U.S. Pat. Nos. 7,307,069 and 7,288,530; Pretchtel et al., J. Immunol. Methods 311(1-2):139-52, 2006; Ghartey-Tagoe et al., Int. J. Pharm. 315(1-2):122-133, 2006).

CPPs are a family of polypeptides that facilitate transduction of proteins, nucleic acids or other compounds across membranes in a receptor-independent manner (Wadia and Dowdy, Curr. Protein Pept. Sci. 4(2):97-104, 2003). Typically, CPPs are short polycationic sequences that can facilitate cellular uptake of compounds to which they are linked into endosomes of cells. For example, delivery of antisense compounds by covalently-linked cationic cell penetrating peptides has been previously described (Abes et al., J. Control Release 116(3):304-13, 2006).

The capacity of certain peptides to deliver proteins or nucleic acids into cells was originally described for the HIV-encoded Tat protein, which was shown to cross membranes and initiate transcription. It was then discovered that the portion of the Tat protein that was required for the transduction of the protein was only an 11 amino acid polypeptide, referred to as the Tat peptide. When fused with other proteins, the Tat peptide has been demonstrated to deliver these proteins, varying in size from 15 to 120 kDa, into cells in tissue culture (Frankel and Pabo, Cell 55(6): 1189-93, 1988; Green and Loewenstein, J. Gen. Microbiol. 134(3):849-55, 1988; Vives et al., J. Biol. Chem. 272(25): 16010-7, 1997; Yoon et al., J. Microbiol. 42(4):328-35, 2004; Cal et al., Eur. J. Pharm. Sci. 27(4):311-9, 2006).

Other known CPPs include PENETRATIN™, a 16 amino acid peptide derived from the third helix of the *Drosophila* Antennapedia homeobox gene (U.S. Pat. No. 5,888,762; Derossi et al., J. Biol. Chem. 269:10444-10450, 1994; Schwarze et al., Trends Pharmacol. Sci. 21:45-48, 2000); transportan, a 27 amino acid chimeric peptide comprised of 12 amino acids from the N-terminus of the neuropeptide galanin and the 14-amino acid protein mastoparan, connected via a lysine (U.S. Pat. No. 6,821,948; Pooga, FASEB J. 12:67-77, 1998; Hawiger, Curr. Opin. Chem. Biol. 3:89-94, 1999); peptides from the VP22 protein of herpes simplex virus (HSV) type 1 (Elliott et al., Cell 88:223-233, 1997); the UL-56 protein of HSV-2 (U.S. Application Publication No. 2006/0099677); and the Vpr protein of HIV-1 (U.S. Application Publication No. 2005/0287648). In addition, a number of artificial peptides also are known to function as CPPs, such as poly-arginine, poly-lysine and others (see, for example, U.S. Application Publication Nos. 2006/0106197; 2006/0024331; 2005/0287648; and 2003/0125242; Zhibao et al., Mol. Ther. 2:339-347, 2000; and Laus et al. Nature Biotechnol. 18:1269-1272, 2000).

In some cases, the antisense compound to be delivered is a shRNA, which is encoded in an expression vector, such as a viral vector of a plasmid vector. For in vitro use, the expression vector can be introduced into cells by any of a number of means well known in the art, such as, for example, by transfection or electroporation as described above. For in vivo delivery, the viral vectors can be administered to a subject using any suitable means known in the art. Methods of administration include, but are not limited to, intradermal, intramuscular, intraperitoneal, parenteral, intravenous, subcutaneous, vaginal, rectal, intranasal, inhalation, oral or by gene gun. Intranasal administration refers to delivery of the compositions into the nose and nasal passages through one or both of the nares and can comprise delivery by a spraying mechanism or droplet mechanism, or through aerosolization of the nucleic acid or virus.

Administration of the compositions by inhalant can be through the nose or mouth via delivery by spraying or droplet mechanisms. Delivery can be directly to any area of the respiratory system via intubation. Parenteral administration is generally achieved by injection. Injectables can be prepared in conventional forms, either as liquid solutions or suspensions, solid forms suitable for solution of suspension in liquid prior to injection, or as emulsions. Injection solutions and suspensions can be prepared from sterile powders, granules, and tablets. Administration can be systemic or local. For example, local administration includes administration to a specific organ, such as the liver.

Antisense compounds and expression vectors encoding antisense compounds are administered in any suitable manner, preferably with pharmaceutically acceptable carriers. Pharmaceutically acceptable carriers are determined in part by the particular composition being administered, as well as by the particular method used to administer the composition. Accordingly, there is a wide variety of suitable formulations of pharmaceutical compositions of the present disclosure.

Preparations for parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

Formulations for topical administration may include ointments, lotions, creams, gels, drops, suppositories, sprays, liquids and powders. Conventional pharmaceutical carriers, aqueous, powder or oily bases, thickeners and the like may be necessary or desirable.

Compositions for oral administration include powders or granules, suspensions or solutions in water or non-aqueous media, capsules, sachets, or tablets. Thickeners, flavorings, diluents, emulsifiers, dispersing aids or binders may be desirable.

Administration can be accomplished by single or multiple doses. The dose required will vary from subject to subject depending on the species, age, weight and general condition of the subject, the particular nucleic acid or recombinant virus being used and its mode of administration. An appropriate dose can be determined by one of ordinary skill in the art using only routine experimentation. If administered in multiple doses, the time between delivery of each dose can vary between days, weeks, months and years.

Administration

Methods of administration of the disclosed compositions are routine, and can be determined by a skilled clinician. For example, the disclosed therapies can be administered via injection, orally, topically, transdermally, parenterally, or via inhalation or spray. In a particular example, a composition is administered intravenously to a mammalian subject, such as a human. In another example, the composition is administered orally. In some examples, the composition is applied to a particular are of the subject to be treated. For example, the composition is injected into a muscle.

The therapeutically effective amount of the agents administered can vary depending upon the desired effects and the subject to be treated. In one example, the method includes daily administration of at least 1 µg of a therapeutic agent to the subject (such as a human subject). For example, a human can be administered at least 1 µg or at least 1 mg of the agent daily, such as 10 µg to 100 µg daily, 100 µg to 1000 µg daily, for example 10 µg daily, 100 µg daily, or 1000 µg daily. In one example, the subject is administered at least 1 µg (such as 1-100 µg) intravenously of the agent (such as a composition that includes a binding agent that specifically binds to one of the disclosed muscular dystrophy-associated molecules. In one example, the subject is administered at least 1 mg intramuscularly (for example in an extremity) of such composition. The dosage can be administered in divided doses (such as 2, 3, or 4 divided doses per day), or in a single dosage daily.

In particular examples, the subject is administered the therapeutic composition that includes a binding agent specific for one of the disclosed muscular dystrophy-associated molecules on a multiple daily dosing schedule, such as at least two consecutive days, 10 consecutive days, and so forth, for example for a period of weeks, months, or years. In one example, the subject is administered the therapeutic composition that includes a binding agent specific for one of the disclosed muscular dystrophy-associated molecules daily for a period of at least 30 days, such as at least 2 months, at least 4 months, at least 6 months, at least 12 months, at least 24 months, or at least 36 months.

The compositions, such as those that include a binding agent specific for one of the muscular dystrophy-associated molecules can further include one or more biologically active or inactive compounds (or both), such as other agents known in the art for reducing or treating one or more signs or symptoms associated with muscular dystrophy and conventional non-toxic pharmaceutically acceptable carriers, respectively. For example, additional therapeutic agent which enhance the therapeutic effect of the disclosed compositions are included In some examples, growth stimulants such as cytokines, polypeptides, and growth factors such as brain-derived neurotrophic factor (BDNF), CNF (ciliary neurotrophic factor), EGF (epidermal growth factor), FGF (fibroblast growth factor), glial growth factor (GGF), glial maturation factor (GMF) glial-derived neurotrophic factor (GDNF), hepatocyte growth factor (HGF), insulin, insulin-like growth factors, kerotinocyte growth factor (KGF), nerve growth factor (NGF), neurotropin-3 and -4, PDGF (platelet-derived growth factor), vascular endothelial growth factor (VEGF), and combinations thereof may be administered with one of the disclosed therapies.

In a particular example, a therapeutic composition that includes a therapeutically effective amount of a therapeutic agent further includes one or more biologically inactive compounds. Examples of such biologically inactive compounds include, but are not limited to: carriers, thickeners, diluents, buffers, preservatives, and carriers. The pharmaceutically acceptable carriers useful for these formulations are conventional (see Remington's Pharmaceutical Sciences, by E. W. Martin, Mack Publishing Co., Easton, PA, 19th Edition (1995)). In general, the nature of the carrier will depend on the particular mode of administration being employed. For instance, parenteral formulations can include injectable fluids that include pharmaceutically and physiologically acceptable fluids such as water, physiological saline, balanced salt solutions, aqueous dextrose, glycerol or the like as a vehicle. For solid compositions (for example, powder, pill, tablet, or capsule forms), conventional non-toxic solid carriers can include, for example, pharmaceutical grades of mannitol, lactose, starch, or magnesium stearate. In addition to biologically-neutral carriers, pharmaceutical compositions to be administered can include minor amounts of non-toxic auxiliary substances, such as wetting or emulsifying agents, preservatives, and pH buffering agents and the like, for example sodium acetate or sorbitan monolaurate.

Additional Treatments

In particular examples, prior to, during, or following administration of an effective amount of an agent that reduces or inhibits one or more signs or symptoms associated with muscular dystrophy, the subject can receive one or more other therapies. In one example, the subject receives one or more treatments prior to administration of a disclosed agent specific for one of the disclosed muscular dystrophy-associated molecules. Examples of such therapies include, but are not limited to, Apabetalone (Resverlogix Corp., such as by oral administration), ATYR-1940 (aTyr Pharma Inc.; such as by IV administration), Drug Id. No. 340259 (Fulcrum Therapeutics Inc.), Drug Id. 346084 (Ultragenyx Pharmaceutical Inc.), Drug Id. 326106 (Facio Therapies BV), Drug. Id. 266984 (FAL-1205, Valerion Therapeutics LLC) and/or Drug Id. 357095 (Fred Hutchinson Cancer Research Center). In some examples, a source of muscle cells can be added to aid in muscle regeneration and repair. In further aspects, stem cells, such as adipose-derived stem cells, are administered to the subject. Suitable methods of preparing and administering adipose-derived stem cells are disclosed in U.S. Patent Publication 2007/0025972, incorporated by reference herein to the extent not inconsistent with the present disclosure. Additional cellular materials, such as fibroblasts, can also be administered, in some examples.

The disclosure is further illustrated by the following non-limiting Examples.

EXAMPLES

Example 1A

Materials and Methods

Resources Table

| Reagent type (species) or resource | Designation | Source or reference | Identifiers | Additional information |
|---|---|---|---|---|
| cell line (*H. sapiens*) | 1881 myoblasts | Fields Center for FSHD and Neuromuscular Research at the University of Rochester Medical Center (www.urmc.rochester.edu/neurology/fields-center.aspx) | | Example 4 |
| cell line (*H. sapiens*) | 2305 myoblasts | Fields Center for FSHD and Neuromuscular Research at the University of Rochester Medical Center (www.urmc.rochester.edu/neurology/fields-center.aspx) | | Example 4 |
| cell line (*H. sapiens*) | 2338 myoblasts | Fields Center for FSHD and Neuromuscular Research at the University of Rochester Medical Center (www.urmc.rochester.edu/neurology/fields-center.aspx) | | Example 4 |
| cell line (*H. sapiens*) | 2453 myoblasts | Fields Center for FSHD and Neuromuscular Research at the University of Rochester Medical Center (www.urmc.rochester.edu/neurology/fields-center.aspx) | | Example 4 |
| cell line (*H. sapiens*) | 54-2 myoblasts | (Krom et al., 2012) (DOI:10.1016/j.ajpath.2012.07.007) | | Example 4 |
| cell line (*H. sapiens*) | eMHF2 iPS cells | University of Washington Institute for Stem | | |

-continued

Resources Table

| Reagent type (species) or resource | Designation | Source or reference | Identifiers | Additional information |
|---|---|---|---|---|
| | | Cell and Regenerative Medicine Tom and Sue Ellison Stem Cell Core (depts.washington.edu/iscrm/ellison) | | |
| cell line (*H. sapiens*) | HFF-3 fibroblasts | ATCC | ATCC: SCRC-1043; RRID: CVCL_DB29 | |
| cell line (*H. sapiens*) | MB073 myoblasts | Fields Center for FSHD and Neuromuscular Research at the University of Rochester Medical Center (www.urmc.rochester.edu/neurology/fields-center.aspx) | | Example 4 |
| cell line (*Homo sapiens*) | MB135 myoblasts | Fields Center for FSHD and Neuromuscular Research at the University of Rochester Medical Center (www.urmc.rochester.edu/neurology/fields-center.aspx) | | Example 4 |
| cell line (*H. sapiens*) | MB200 myoblasts | Fields Center for FSHD and Neuromuscular Research at the University of Rochester Medical Center (www.urmc.rochester.edu/neurology/fields-center.aspx) | | Example 4 |
| cell line (*H. sapiens*) | MB2401 myoblasts | Fields Center for FSHD and Neuromuscular Research at the University of Rochester Medical Center (at www.urmc.rochester.edu/neurology/fields-center.aspx) | | Example 4 |
| antibody | alpha-Tubulin | Sigma-Aldrich | Sigma-Aldrich: T9026; RRID: AB_477593 | |
| antibody | Acetyl-Histone H4 | EMD Millipore | EMD Millipore: 06866; RRID: AB_310270 | |
| antibody | CHD4 | Bethyl Laboratories | Bethyl Laboratories: A301 081A; RRID: AB_873001 | |
| antibody | DUX4 (14-3) | (Geng et al., 2011) | | |
| antibody | DUX4 (E5-5) | (Geng et al., 2011) | | |
| antibody | FITC anti-mouse | Jackson ImmunoResearch | Jackson ImmunoResearch: 715095150; RRID: AB_2340792 | |
| antibody | FLAG M2 | Sigma-Aldrich | Sigma-Aldrich: F1804 or F3165; | |

-continued

Resources Table

| Reagent type (species) or resource | Designation | Source or reference | Identifiers | Additional information |
|---|---|---|---|---|
| | | | RRID: AB_262044 or RRID: AB_259529 | |
| antibody | HDAC2 | Abcam | Abcam: ab7029; RRID: AB_305706 | |
| antibody | HRP anti-mouse | Jackson ImmunoResearch | Jackson ImmunoResearch: 115035146; RRID: AB_2307392 | |
| antibody | MBD2 | Bethyl Laboratories | Bethyl Laboratories: A301 632A; RRID: AB_1211478 | |
| antibody | MTA2 | Abcam | Abcam: ab8106; RRID: AB_306276 | |
| antibody | TRITC anti-rabbit | Jackson ImmunoResearch | Jackson ImmunoResearch: 711025152; RRID: AB_2340588 | |
| recombinant DNA reagent | pCW57.1-MBD3L2 | | | Lentiviral vector expressing doxycycline-inducible MBD3L2 (generated using pCW57.1 [Addgene plasmid #41393]) |
| recombinant DNA reagent | pGIPZ-shControl | Fred Hutchinson Cancer Research Center Genomics Shared Resource (at//monod.fhcrc.org/rnai/) | | |
| recombinant DNA reagent | pGIPZ-shMBD3L2 | Fred Hutchinson Cancer Research Center Genomics Shared Resource (at//monod.fhcrc.org/rnai/) | | |
| recombinant DNA reagent | pZLCv2-3xFLAG-dCas9-HA-2xNLS | | | Lentiviral vector expressing FLAG-tagged, nuclease-deficient Cas9 (generated using lentiCRISPRv2 [Addgene plasmid #52961] and pHR-SFFV-KRAB-dCas9-P2A-mCherry [Addgene plasmid #60954]) |
| recombinant DNA reagent | pZLCv2-gD4Z4-1-3xFLAG-dCas9-HA-2xNLS | | | Lentiviral vector expressing FLAG-dCas9 and a guide RNA targeting the D4Z4 unit |
| recombinant DNA reagent | pZLCv2-gD4Z4-2-3xFLAG-dCas9-HA-2xNLS | | | Lentiviral vector expressing FLAG-dCas9 and a gRNA targeting the D4Z4 unit |
| recombinant DNA reagent | pZLCv2-gD4Z4-3-3xFLAG-dCas9-HA-2xNLS | | | Lentiviral vector expressing FLAG-dCas9 and a gRNA targeting the D4Z4 unit |
| recombinant DNA reagent | pZLCv2-gMYOD1-3xFLAG-dCas9-HA-2xNLS | | | Lentiviral vector expressing FLAG-dCas9 and a gRNA targeting the MYOD1 distal regulatory region |

-continued

Resources Table

| Reagent type (species) or resource | Designation | Source or reference | Identifiers | Additional information |
|---|---|---|---|---|
| sequenced-based reagent | enChIP-/ChIP-qPCR primers | | | Example 5 |
| sequenced-based reagent | gRNAs | | | Example 5 |
| sequenced-based reagent | RT-qPCR primers | | | Example 5 |
| sequenced-based reagent | siRNAs | | | Example 5 |
| peptide, recombinant protein | 3X FLAG peptide | Sigma-Aldrich | Sigma-Aldrich: F4799 | |
| commercial assay or kit | QIAshredder | Qiagen | Qiagen: 79656 | |
| commercial assay or kit | RNeasy Mini Kit | Qiagen | Qiagen: 74106 | |
| commercial assay or kit | SuperScript III First-Strand Synthesis System | Invitrogen/Thermo Fisher | Invitrogen/Thermo Fisher: 18080051 | |
| chemical compound, drug | 2-mercaptoethanol | Sigma-Aldrich | Sigma-Aldrich: M3148 | |
| chemical compound, drug | dexamethasone | Sigma-Aldrich | Sigma-Aldrich: D4902 | |
| chemical compound, drug | DMEM: Nutrient Mixture F-12 | Gibco/Thermo Fisher | Gibco/Thermo Fisher: 11320082 | |
| chemical compound, drug | DNase I | Thermo Fisher | Thermo Fisher: 18068015 | |
| chemical compound, drug | doxycyline hyclate | Sigma-Aldrich | Sigma-Aldrich: D9891 | |
| chemical compound, drug | Dulbecco's Modified Eagle Medium (DMEM) | Gibco/Thermo Fisher | Gibco/Thermo Fisher: 11965092 | |
| chemical compound, drug | Dynabeads-Protein G | Thermo Fisher | Thermo Fisher: 10003D | |
| chemical compound, drug | Ham's F-10 Nutrient Mix | Gibco/Thermo Fisher | Gibco/Thermo Fisher: 11550043 | |
| chemical compound, drug | horse serum | Gibco/Thermo Fisher | Gibco/Thermo Fisher: 26050070 | |
| chemical compound, drug | HyClone Fetal Bovine Serum | GE Healthcare Life Sciences | GE Healthcare Life Sciences: SH30071.03 | |
| chemical compound, drug | insulin | Sigma-Aldrich | Sigma-Aldrich: I1882 | |
| chemical compound, drug | KnockOut Serum Replacement | Gibco/Thermo Fisher | Gibco/Thermo Fisher: 10828028 | |
| chemical compound, drug | Lipofectamine RNAiMAX | Invitrogen/Thermo Fisher | Invitrogen/Thermo Fisher: 13778150 | |
| chemical compound, drug | Matrigel | Corning Life Science | Corning Life Science: 354277 | |
| chemical compound, drug | MEM Non-Essential Amino Acids | Gibco/Thermo Fisher | Gibco/Thermo Fisher: 11140050 | |
| chemical compound, drug | mTeSR1 medium | STEMCELL Technologies | STEMCELL Technologies: 85850 | |
| chemical compound, | Opti-MEM Reduced | Thermo Fisher | Thermo Fisher: 31985070 | |

Resources Table

| Reagent type (species) or resource | Designation | Source or reference | Identifiers | Additional information |
|---|---|---|---|---|
| drug | Serum Medium | | | |
| chemical compound, drug | penicillin/ streptomycin | Gibco/Thermo Fisher | Gibco/Thermo Fisher: 15140122 | |
| chemical compound, drug | polybrene | Sigma-Aldrich | Sigma-Aldrich: 107689 | |
| chemical compound, drug | puromycin | Sigma-Aldrich | Sigma-Aldrich: P8833 | |
| chemical compound, drug | recominant human basic fibroblast growth factor | Promega Corporation | Promega Corporation: G5071 | |
| chemical compound, drug | sodium pyruvate | Gibco/Thermo Fisher | Gibco/Thermo Fisher: 11360070 | |
| chemical compound, drug | transferrin | Sigma-Aldrich | Sigma-Aldrich: T0665 | |
| chemical compound, drug | Y-27632 ROCK inhibitor | Miltenyi Biotec | Miltenyi Biotec: 130106538 | |
| software, algorithm | Code used for proteomics data analysis | This paper | | The R code used for the proteomics data analysis can be accessed via github at https://github.com/sjaganna/2017-campbell_et_al |
| software, algorithm | GraphPad Prism | GraphPad Prism (https://graphpad.com) | RRID: SCR_015807 | Version 6 |
| software, algorithm | ImageJ | ImageJ (http://imagej.nih.gov/ij/) | RRID: SCR_003070 | |
| software, algorithm | Proteome Discoverer | Thermo Fisher | RRID: SCR_014477 | Version 1.4 |

Cell Culture and Reagents

All reagents were obtained from Sigma-Aldrich (St. Louis, MO, USA) unless otherwise specified. Human primary myoblast cell lines originated from the Fields Center for FSHD and Neuromuscular Research at the University of Rochester Medical Center (https://www.urmc.rochester.edu/neurology/fields-center.aspx) and were immortalized by retroviral transduction of CDK4 and hTERT (Stadler et al., 2011). Myoblasts were maintained in Ham's F-10 Nutrient Mix (Gibco, Waltham, MA, USA) supplemented with 20% HyClone Fetal Bovine Serum (GE Healthcare Life Sciences, Pittsburgh, PA, USA), 100 U/100 µg penicillin/streptomycin (Gibco), 10 ng/ml recombinant human basic fibroblast growth factor (Promega Corporation, Madison, WI, USA) and 1 µM dexamethasone. Differentiation of myoblasts into myotubes was achieved by switching the fully confluent myoblast monolayer into Dulbecco's Modified Eagle Medium (DMEM, Gibco) containing 1% horse serum (Gibco), 100 U/100 µg penicillin/streptomycin, 10 µg/ml insulin and 10 µg/ml transferrin for 48-72 hours. Myoblasts harboring a transgene were additionally cultured in 2 µg/ml puromycin and transgene expression induced with 1 µg/ml doxycycline hyclate when required. Myoblast cell line identity was authenticated by monitoring fusion into myotubes, DUX4 expression, and the presence of a 4qA161 allele. Detailed characteristics of the myoblast lines used in this study are provided in Supplementary file 3. Human control (non-FSHD) iPS cells were obtained from the University of Washington Institute for Stem Cell and Regenerative Medicine Tom and Sue Ellison Stem Cell Core (eMHF2) (Hendrickson et al., 2017) or derived in-house from normal HFF3 foreskin fibroblasts reprogrammed via lentiviral transduction of Oct4, Sox2, Nanog and Lin28 (Yu et al., 2007), and grown in DMEM:Nutrient Mixture F-12 (1:1, Gibco) with 100 U/100 µg penicillin/streptomycin, 10 mM MEM Non-Essential Amino Acids (Gibco), 100 mM sodium pyruvate (Thermo Fisher Scientific, Waltham, MA, USA), 20% KnockOut Serum Replacement (Gibco), 1 mM 2-mercaptoethanol and 4 ng/ml recombinant human basic fibroblast growth factor under hypoxic (5% $O_2$) conditions on 0.1% gelatin-coated plates pre-seeded with $1.3 \times 10^4$ cells/cm2 of irradiated mouse embryonic fibroblasts. While the full haplotypes are unknown, eMHF2 cells utilize DUX4 exon 3, suggesting a 4qA161S allele, while HFF3 cells use DUX4 exon 3b, suggesting a 4qA161L allele (Lemmers et al., 2017). HFF3 fibroblasts and 293T cells were maintained in DMEM supplemented with 10% HyClone Fetal Bovine Serum and 100 U/100 µg penicillin/streptomycin. Cell lines are tested periodically for *mycoplasma* contamination by the Fred Hutchinson Cancer Research Center Specimen Processing/Research Cell Bank and have not shown evidence of *mycoplasma*.

Cloning, Virus Production and Transgenic Cell Line Generation

To construct FLAG-dCas9-gRNA plasmids, the lentiCRISPRv2 vector (a gift from Feng Zhang, Addgene plasmid #52961) (Sanjana et al., 2014) was digested with AgeI and BamHI, PCR was used to amplify AgeI-3×FLAG-EcoRI from a synthesized template and EcoRI-dCas9-BamHI from pHR-SFFV-KRAB-dCas9-P2A-mCherry (a gift from Jonathan Weissman, Addgene plasmid #60954) (Gilbert et al., 2014), the three fragments were ligated together to create a 3×FLAG-dCas9-HA-2×NLS vector, and then D4Z4 or MYOD1 gRNA were inserted by digesting 3×FLAG-dCas9-HA-2×NLS with BsmBI and ligating it to annealed gRNA oligos. To construct the doxycycline-inducible MBD3L2 plasmid, the MBD3L2 coding region was subcloned into the NheI and SalI sites of the pCW57.1 vector (a gift from David Root, Addgene plasmid #41393). The pGIPZ-shControl and -shMBD3L vectors were obtained from the Fred Hutchinson Cancer Research Center Genomics Shared Resource. Lentiviral particles were produced in 293T cells by co-transfecting the appropriate lentiviral vector with pMD2.G (a gift from Didier Trono, Addgene plasmid #12259) and psPAX2 (a gift from Didier Trono, Addgene plasmid #12260) using Lipofectamine 2000 (Invitrogen, Carlsbad, CA, USA) following the manufacturer's instructions. To generate polyclonal transgenic cell lines, myoblasts were transduced with lentivirus in the presence of 8 µg/ml polybrene and selected using 2 µg/ml puromycin. Monoclonal transgenic lines were generated by transducing at a low cell density using a low multiplicity of infection (MOI<1) and allowing cells that survived selection to form colonies before individual clones were isolated using cloning cylinders.

Protein Extraction and Immunoblotting

Total protein extracts were generated by lysing cells in SDS sample buffer (500 mM Tris-HCl pH 6.8, 8% SDS, 20% 2-mercaptoethanol, 0.004% bromophenol blue, 30% glycerol) followed by sonication and boiling with 50 mM DTT. Samples were run on NuPage 4-12% precast polyacrylamide gels (Invitrogen) and transferred to nitrocellulose membrane (Invitrogen). Membranes were blocked in PBS containing 0.1% Tween-20 and 5% non-fat dry milk for 1 hour at room temperature before overnight incubation at 4° C. with primary antibodies in block solution. Membranes were then incubated for 1 hour at room temperature with horseradish peroxidase-conjugated secondary antibodies in block solution and chemiluminescent substrate (Thermo Fisher Scientific) used for detection on film.

Immunofluorescence

Cells were fixed in PBS containing 2% paraformaldehyde (Electron Microscopy Sciences, Hatfield, PA, USA) for 7 minutes at room temperature and permeabilized for 10 minutes in PBS with 0.5% Triton X-100. Samples were then incubated overnight at 4° C. with primary antibodies, followed by incubation with appropriate FITC- or TRITC-conjugated secondary antibodies for 1 hour at room temperature prior to DAPI counterstaining and imaging with a Zeiss Axiophot fluorescent microscope, AxioCam MRc digital camera and AxioVision 4.6 software (Carl Zeiss Microscopy, Thornwood, NY, USA). Image J software (Schneider et al., 2012) was used for image analysis and quantification.

enChIP-qPCR

FLAG-dCas9 chromatin occupancy was analyzed as previously described (Fujita and Fujii, 2013) using chromatin extraction and fragmentation methods from (Forsberg et al., 2000) and the following minor modifications. Five million trypsinized myoblasts were crosslinked with 1% formaldehyde (Thermo Fisher Scientific) for 10 minutes at room temperature. Chromatin was diluted to 0.5% SDS with IP Dilution Buffer (20 mM Tris pH 8.0, 2 mM EDTA, 150 mM NaCl, 1% Triton X-100, 0.01% SDS, cOmplete EDTA-free Protease Inhibitor Cocktail, 100 mM PMSF) and fragmented to an average length of 500 bp using a Fisher Scientific Model 500 Sonic Dismembrator probe tip sonicator. Soluble chromatin was diluted to 0.2% SDS with IP Dilution Buffer before pre-clearing with 5 µg of mouse IgG conjugated to 20 µl of Dynabeads-Protein G (Thermo Fisher Scientific) followed by immunoprecipitation with 5 µg of anti-FLAG M2 antibody conjugated to 50 µl of Dynabeads-Protein G. Quantitative PCR was carried out on a QuantStudio 7 Flex (Applied Biosystems, Waltham, MA, USA) using locus-specific primers and iTaq SYBR Green Supermix (Bio-Rad Laboratories, Hercules, CA, USA). Primer sequences are listed in Example 5 and sequence listing.

enChIP-MS

The enChIP-MS procedure was performed as described previously (Fujita and Fujii, 2013) using chromatin extraction and fragmentation methods from (Forsberg et al., 2000) and the following minor modifications. Forty million myoblasts were harvested by trypsinization and lysed in Cell Lysis Buffer (10 mM Tris pH 8.0, 10 mM NaCl, 0.2% IGEPAL-CA630, cOmplete EDTA-free Protease Inhibitor Cocktail, 100 mM PMSF). The isolated nuclei were cross-linked with 1-2% formaldehyde at room temperature for 10-20 minutes and then lysed in Nuclei Lysis Buffer (50 mM Tris pH 8.0, 10 mM EDTA, 1% SDS, cOmplete EDTA-free Protease Inhibitor Cocktail, 100 mM PMSF). Chromatin was diluted to 0.5% SDS with IP Dilution Buffer and fragmented using a Fisher Scientific Model 500 Sonic Dismembrator probe tip sonicator to an average length of 3 kb. Sonicated chromatin was diluted to 0.2% SDS with IP Dilution Buffer, pre-cleared with 25 µg of mouse IgG conjugated to 100 µl of Dynabeads-Protein G and immunoprecipitated with 70 µg of anti-FLAG M2 antibody conjugated to 180 µl of Dynabeads-Protein G. An additional two Dynabead washes in Low Salt Wash Buffer replaced the high salt washes. Eluted and precipitated samples were resuspended in SDS sample buffer, boiled and subjected to SDS-PAGE. Entire gel lanes were excised and proteins analyzed using an OrbiTrap Elite mass spectrometer (Thermo Fisher Scientific) coupled to an Easy-nLC II (Thermo Fisher Scientific) at the Fred Hutchinson Cancer Research Center Proteomics Shared Resource. The raw spectra were searched against a UniProt human protein database that also included common contaminants as defined in (Mellacheruvu et al., 2013) using Proteome Discoverer 1.4 software (Thermo Fisher Scientific) to generate peptide-spectrum matches. The number of peptides that mapped to each protein was summarized to generate a 'pseudoquant' metric. Proteins with at least one peptide-spectrum match in two experimental replicates were carried forward for further analysis, after filtering out common contaminants. Finally, the UniProt annotations for Function and Subcellular location were used to restrict the analysis to only the nuclear proteins to enrich for biologically relevant, nuclear interactions. The R code used for the proteomics data analysis can be accessed via github (//github.com/sjaganna/2017-campbell_et_al). The gRNA sequences are listed in Example 5 and sequence listing.

GO Category Analysis

GO analysis was carried out with the PANTHER classification system (Mi et al., 2016) using the statistical over-representation test against all human genes and the complete GO Biological process annotation. P-values were corrected for multiple hypothesis testing using the Bonferroni correction.

ChIP-qPCR

The occupancy of NuRD complex components and acetyl-Histone H4 was determined using crosslinked ChIP coupled with micrococcal nuclease digestion as described previously (Skene and Henikoff, 2015). For acetyl-Histone H4 samples, the Lysis Buffer and IP Dilution Buffer were supplemented with 10 mM sodium butyrate. Quantitative PCR was carried out on a QuantStudio 7 Flex using locus-specific primers and iTaq SYBR Green Supermix. Primer sequences are listed in Example 5 and sequencing listing.

siRNA Transfections

Flexitube and ON-TARGETplus duplex siRNAs were obtained from Qiagen (Hilden, Germany) or GE Dharmacon (Lafayette, CO, USA), respectively. Transfections of siRNAs into myoblasts and iPS cells were carried out using Lipofectamine RNAiMAX (Invitrogen) according to the manufacturer's instructions. A double transfection protocol was followed in myoblasts to ensure efficient depletion of pre-existing proteins. Briefly, cells were seeded at ~30% confluence in 6-well plates and transfected ~20 hours later with 6 µl Lipofectamine RNAiMAX and 25 pmol of either gene-specific siRNA(s) or a scrambled non-silencing control siRNA diluted in 125 µl Opti-MEM Reduced Serum Medium (Thermo Fisher Scientific). Forty-eight hours following this, myoblasts were transfected a second time and harvested for RNA analysis 48-72 hours later. In iPS cells, the same procedure was followed except cells were treated with 10 µM Y-27632 ROCK inhibitor (Miltenyi Biotec, Auburn, CA, USA) for 24 hours before being trypsinized and seeded in mTeSR1 medium (STEMCELL Technologies, Vancouver, BC) at 1×105 cells/well on Matrigel (Corning Life Science, Tewksbury, MA, USA)-coated 6-well plates, and were harvested 48 hours after a single transfection. The sequences of siRNAs are listed in Example 5 and sequencing listing.

RNA Isolation and RT-qPCR

Total RNA was extracted from whole cells using the RNeasy Mini Kit (Qiagen) according to the manufacturer's instructions. The isolated RNA was treated with DNase I (Thermo Fisher Scientific), heat inactivated, and reverse transcribed into cDNA using Superscript III (Thermo Fisher Scientific) and oligo(dT) primers (Invitrogen) following the manufacturer's protocol. Quantitative PCR was carried out on a QuantStudio 7 Flex using primers specific for each mRNA and iTaq SYBR Green Supermix. The relative expression levels of target genes were normalized to that of the reference genes RPL27, RPL13A or GAPDH by using the delta-delta-Ct method (Livak and Schmittgen, 2001) after confirming equivalent amplification efficiencies of reference and target molecules. Primer sequences are listed in Example 5 and sequencing listing.

Antibodies

The following antibodies were used: a-Tubulin (T9026); Acetyl-Histone H4 (06-866 lot #2554112, EMD Millipore (Billerica, MA, USA)); CHD4 (A301-081A, Bethyl Laboratories (Montgomery, TX, USA)); FITC anti-mouse (715-095-150 lot #115855, Jackson ImmunoResearch (West Grove, PA, USA)); FLAG M2 (F1804 lot #SLBG5673V and lot #124K6106); FLAG M2 (F3165 lot #SLBL1237V); HDAC2 (ab7029, lot #GR88809-7, Abcam (Cambridge, UK)); HRP anti-mouse (115-035-146, Jackson ImmunoResearch); MBD2 (A301-632A, Bethyl); mouse IgG (315-005-003 lot #120058, Jackson ImmunoResearch); MTA2 (ab8106 lot #GR185489-3, Abcam); TRITC anti-rabbit (711-025-152 lot #114768, Jackson ImmunoResearch); rabbit monoclonal antibodies against DUX4 (E5-5 and E14-3) were produced in collaboration with Epitomics and are described elsewhere (Geng et al., 2011).

Statistical Analysis

All collected data were included in the analyses. Statistical significance was determined using Mann-Whitney U or Wilcoxon signed-rank tests, as indicated in the corresponding figure legends. As is convention, at least three biological replicates per condition were used for ChIP-qPCR and RT-qPCR, as indicated. Here a biological replicate is defined as an independent culture of cells that was separately manipulated and subsequently analyzed. The enChIP-MS studies were multiple singleton experiments performed using several different gRNA that targeted the same genomic locus, as described. No statistical methods were used to predetermine sample size. Masking was not used during group allocation, data collection or data analysis.

Accession Codes

The mass spectrometry proteomics data have been deposited to the ProteomeXchange Consortium (http://proteome-central.proteomexchange.org) via the PRIDE partner repository (Vizcaino et al., 2016) with the dataset identifier PXD006839.

Example 1B

NuRD and CAF-1 Mediated Silencing of the D4Z4 Array is Modulated by DUX4-Induced MBD3L Proteins The DUX4 transcription factor is encoded by a retrogene embedded in each unit of the D4Z4 macrosatellite repeat. DUX4 is normally expressed in the cleavage-stage embryo, whereas chromatin repression prevents DUX4 expression in most somatic tissues. Failure of this repression causes facioscapulohumeral muscular dystrophy (FSHD) due to mis-expression of DUX4 in skeletal muscle. In this study, we used CRISPR/Cas9 engineered chromatin immunoprecipitation (enChIP) locus-specific proteomics to characterize D4Z4-associated proteins. These and other approaches identified the Nucleosome Remodeling Deacetylase (NuRD) and Chromatin Assembly Factor 1 (CAF-1) complexes as necessary for DUX4 repression in human skeletal muscle cells and induced pluripotent stem (iPS) cells. Furthermore, DUX4-induced expression of MBD3L proteins partly relieved this repression in FSHD muscle cells. Together, these findings identify NuRD and CAF-1 as mediators of DUX4 chromatin repression and suggest a mechanism for the amplification of DUX4 expression in FSHD muscle cells.

Introduction

Repetitive DNA sequences make up the majority of the human genome (Consortium, 2007; de Koning et al., 2011), and these ubiquitous but understudied elements play a role in biological processes such as embryogenesis and cellular reprogramming (Chuong et al., 2017; Elbarbary et al., 2016; Gerdes et al., 2016). For example, each unit of the D4Z4 macrosatellite repeat array contains a copy of the double homeobox 4 (DUX4) retrogene that is expressed in the germline and in 4-cell human embryos where DUX4 activates a cleavage-specific transcriptional program (De Iaco et al., 2017; Hendrickson et al., 2017; Snider et al., 2010; Whiddon et al., 2017). This is in contrast to somatic tissues where DUX4 is silenced via repeat-mediated epigenetic repression of the D4Z4 arrays (Das and Chadwick, 2016; Daxinger et al., 2015; Snider et al., 2010; van Overveld et al., 2003; Zeng et al., 2009). To date, little is understood about how the epigenetic repression of DUX4 is relieved at specific times during germline and early embryo development, or what the mechanisms of establishing and maintaining epigenetic repression during later development and in somatic tissues are.

Facioscapulohumeral muscular dystrophy (FSHD) is caused by the mis-expression of DUX4 in skeletal muscle (Tawil et al., 2014) and provides an experimentally tractable context in which to identify mechanisms that normally repress DUX4 in somatic cells as well as mechanisms that might regulate this repression during development. In individuals with FSHD, the epigenetic repression of DUX4 is incomplete as a consequence of having fewer than 11 D4Z4 repeats (FSHD type 1, FSHD1) or mutations in trans-acting chromatin repressors of D4Z4 (FSHD type 2, FSHD2), either of which results in ectopic expression of DUX4 in skeletal muscle when combined with a permissive chromosome 4qA haplotype that provides a polyadenylation site for the DUX4 mRNA (Lemmers et al., 2012; Lemmers et al., 2010; van den Boogaard et al., 2016). The mis-expression of DUX4 in skeletal muscle has many consequences that include induction of a cleavage-stage transcriptional program, suppression of the innate immune response and nonsense-mediated RNA decay (NMD) pathways, inhibition of myogenesis, and induction of cell death through mechanisms that involve the accumulation of aberrant and double-stranded RNAs (Bosnakovski et al., 2008; Feng et al., 2015; Geng et al., 2012; Kowaljow et al., 2007; Rickard et al., 2015; Shadle et al., 2017; Snider et al., 2009; Wallace et al., 2011; Winokur et al., 2003; Young et al., 2013). These cellular insults lead to progressive muscle weakness initiating in the face and upper body, but eventually involving nearly all skeletal muscle groups (Tawil et al., 2014).

Previous studies investigating D4Z4 repeat-mediated epigenetic repression have shown the D4Z4 arrays to be silenced through multiple mechanisms, including DNA methylation and the repressive histone modifications di/trimethylation of histone H3 at lysine 9 (H3K9me2/3) and trimethylation of histone H3 at lysine 27 (H3K27me3) along with their binding proteins CBX3/HP1γ and EZH2 (Cabianca et al., 2012; Huichalaf et al., 2014; van den Boogaard et al., 2016; van Overveld et al., 2003; Zeng et al., 2009). Other repressor proteins have been shown to be associated with the D4Z4 repeat, including DNMT3B, SMCHD1, cohesin, CTCF, HDAC3 and a YY1/HMGB2/NCL complex (Gabellini et al., 2002; Huichalaf et al., 2014; Lemmers et al., 2012; Ottaviani et al., 2009; van den Boogaard et al., 2016; Zeng et al., 2009). In addition, DICER/AGO-dependent siRNA-directed silencing has also been demonstrated to play a role in repressing the D4Z4 array (Lim et al., 2015; Snider et al., 2009). The genetic lesions that cause FSHD disrupt these regulatory pathways resulting in D4Z4 DNA hypomethylation; reduced H3K9me2/3 and H3K27me3 levels; and loss of HP1γ, EZH2, SMCHD1 and cohesin binding; which together culminate in ectopic DUX4 expression (Cabianca et al., 2012; Daxinger et al., 2015; Jones et al., 2014; Lemmers et al., 2012; van den Boogaard et al., 2016; van Overveld et al., 2003; Zeng et al., 2009). Although each of the above-mentioned studies tested specific factors based on knowledge of their role in chromatin, to date no studies have taken an agnostic approach to identify how these individual components might be integrated into repressive complexes and understand how these complexes might be regulated.

Here we report a locus-specific proteomics-based characterization of proteins that bind the D4Z4 array in human myoblasts and identify the NuRD and CAF-1 complexes as individually necessary to maintain DUX4 repression in skeletal muscle and induced pluripotent stem (iPS) cells. Further, we show that DUX4-mediated induction of the MBD3L family of factors relieves this repression and amplifies DUX4 expression. Together, these findings identify multiprotein complexes that regulate DUX4 expression and reveal a process for DUX4 amplification in FSHD muscle cells that provides a new candidate target for therapeutics.

Results enChIP-MS Identifies NuRD Complex Components as D4Z4 Repeat-Associated Proteins To identify regulators of the D4Z4 macrosatellite repeat, we carried out engineered DNA-binding molecule-mediated chromatin immunoprecipitation (enChIP) followed by mass spectrometry (MS) (enChIP-MS) (Fujita and Fujii, 2013) (FIG. 1A). We transduced human MB135 control (non-FSHD) myoblasts with a lentiviral vector co-expressing FLAG-tagged, nuclease-deficient Cas9 (FLAG-dCas9) and guide RNA (gRNA) targeting the 3' end (gD4Z4-1), middle (gD4Z4-2) or 5' end (gD4Z4-3) of the D4Z4 unit, or the MYOD1 distal regulatory region (DRR) (gMYOD1) for comparison. After confirming the expression, subcellular localization, and specific chromatin occupancy of FLAG-dCas9 in each cell line (FIGS. 1F-1I), complexes containing FLAG-dCas9 were immunoprecipitated and subjected to liquid chromatography-tandem mass spectrometry for protein identification.

A total of 261 proteins were identified, including known D4Z4-associated factors SMCHD1, CBX3/HP1γ and the cohesin complex components SMC1A, SMC3, RAD21 and PDSSB (Lemmers et al., 2012; Zeng et al., 2009) (Table 1). BRD3 and BRD4 were also identified (Example 2) and BET inhibitor compounds have recently been shown to regulate D4Z4 repression (Campbell et al., 2017). D4Z4-bound proteins were enriched in gene ontology categories that included telomere maintenance and chromatin silencing, consistent with the subtelomeric localization and transcriptionally repressed state of the D4Z4 array. Strikingly, CHD4, HDAC2, MTA2 and RBBP4, which comprise many of the components of the nucleosome remodeling and deacetylase (NuRD) complex (Basta and Rauchman, 2015), were among the isolated proteins (Table below). While each of these factors was identified as associated with the D4Z4 repeat in more than one gD4Z4 sample, they were either absent or present in only a single replicate from the gMYOD1 pull-downs.

Examples of Proteins Identified by enChIP-MS.

| | Sample | | | | |
|---|---|---|---|---|---|
| | gD4Z4 | | gMYOD1 | | |
| Gene Name | # peptides* | % coverage# | # peptides* | % coverage# | Category |
| CBX3/HP1γ | 4.7 | 15.7 | 0.0 | 0.0 | Known D4Z4-associated proteins |
| NCL | 47.4 | 22.3 | 34.0 | 14.2 | |
| PDS5B | 2.0 | 11.2 | 0.0 | 0.0 | |
| RAD21 | 1.8 | 2.9 | 0.0 | 0.0 | |
| SMC1A | 7.0 | 5.8 | 2.0 | 1.8 | |
| SMC3 | 17.0 | 6.7 | 1.0 | 1.0 | |
| SMCHD1 | 1.6 | 2.4 | 0.0 | 0.0 | |
| CHD4 | 8.3 | 3.1 | 0.0 | 0.0 | NuRD |

-continued

| | Sample | | | | |
|---|---|---|---|---|---|
| | gD4Z4 | | gMYOD1 | | |
| Gene Name | # peptides* | % coverage# | # peptides* | % coverage# | Category |
| HDAC2 | 2.5 | 5.6 | 3.0 | 6.8 | complex components |
| MTA2 | 1.2 | 2.2 | 1.0 | 1.5 | |
| RBBP4 | 4.5 | 7.5 | 4.0 | 6.9 | |

*Average number of peptides recovered from each sample type, combining like (gD4Z4 or gMYOD1) immunoprecipitations.
Average percentage of each protein covered by the identified peptides from each sample type, combining like (gD4Z4 or gMYOD1) immunoprecipitations.

Occupancy of CHD4, HDAC2 and MTA2 at the D4Z4 array was confirmed by chromatin immunoprecipitation (ChIP) in MB2401 myoblasts, an independent control muscle cell line (FIGS. 1B-1D). The NuRD complex can be recruited to methylated DNA by the MBD2 subunit (Le Guezennec et al., 2006; Zhang et al., 1999), and indeed, ChIP showed MBD2 enrichment at the D4Z4 region in MB2401 control myoblasts (FIG. 1E). Together, these data demonstrate that the D4Z4 macrosatellite repeat is bound by the MBD2/NuRD complex in control human muscle cells.

Figure 2A:
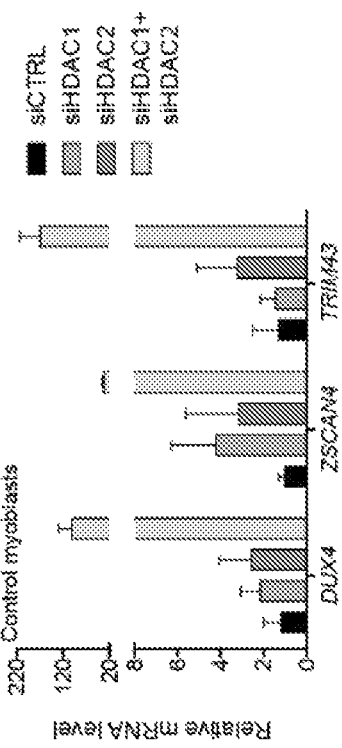
Figure 2B:
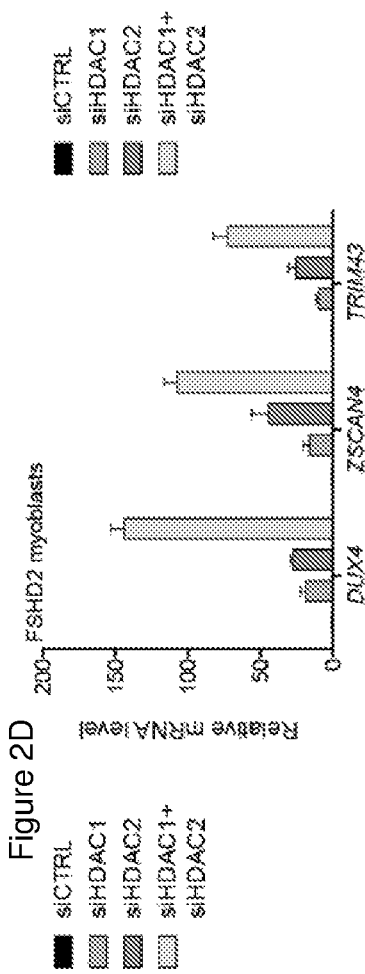
Figure 2C:
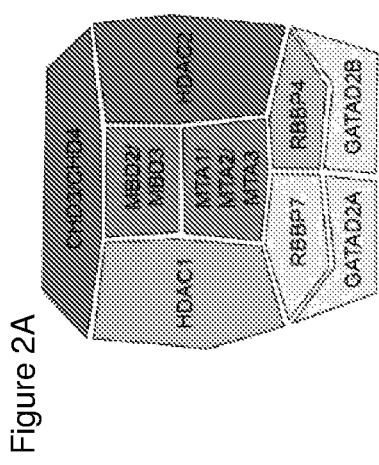
Figure 2D:
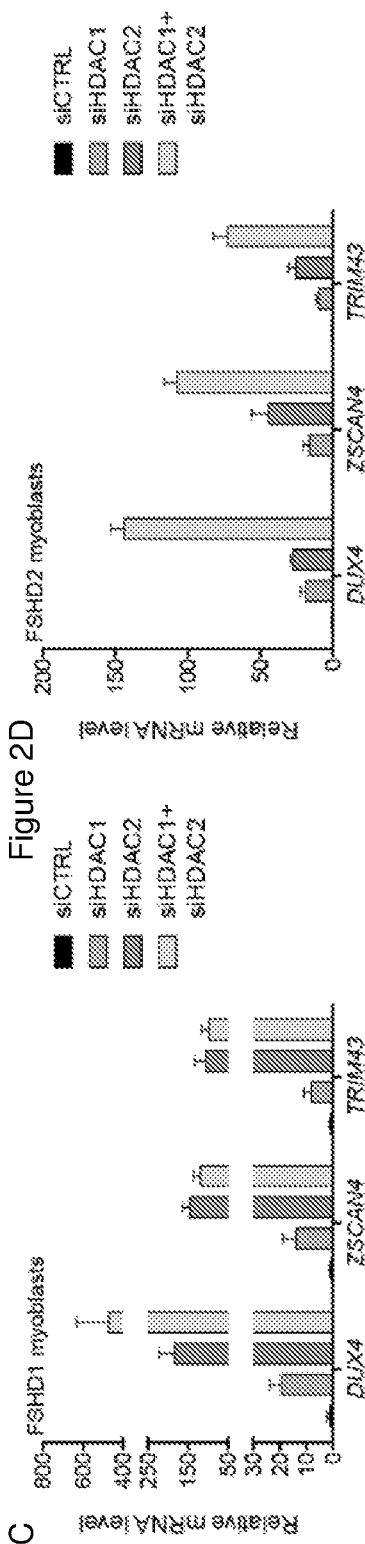
Figure 2N:
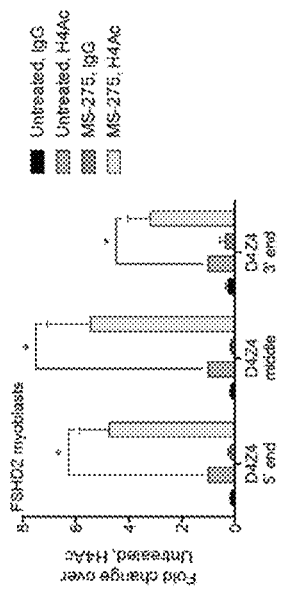
FIGS. 2N-2O. Pharmacological inhibition of HDAC1/HDAC2.
Figure 2O:
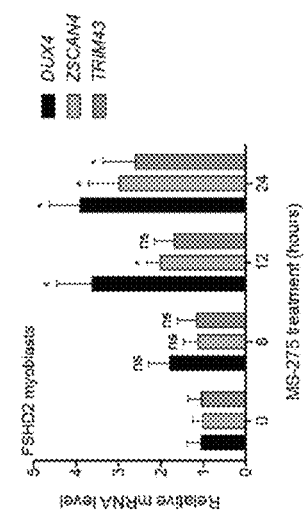
Figure 2R:
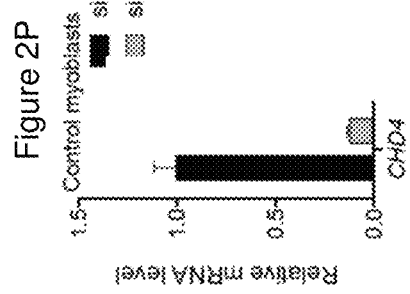
FIGS. 2P-2R. Validation of CHD4 knockdown. CHD4 gene expression as determined by RT-qPCR following control (CTRL) or CHD4 siRNA knockdown in MB2401 control (FIG. 2P), MB073 FSHD1 (FIG. 2Q) or MB200 FSHD2 (FIG. 2R) myoblasts. Error bars denote the standard deviation from the mean of three biological replicates.
Figure 2Q:
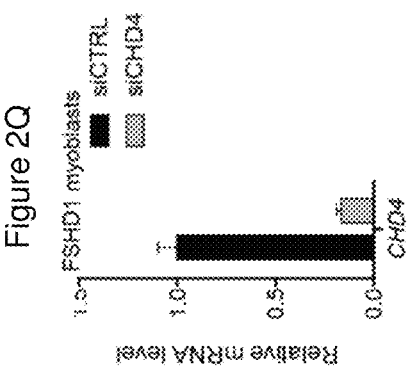

MBD2/NuRD Complex Components Mediate Transcriptional Repression of the D4Z4 Array The NuRD complex represses gene transcription via the concerted effort of the core subunits HDAC1 and HDAC2; CHD3 or CHD4; MBD2 or MBD3; MTA1, MTA2 or MTA3; RBBP4 and RBBP7; and GATAD2A and GATAD2B (Basta and Rauchman, 2015) (FIG. 2A). In MB2401 control myoblasts, small interfering RNA (siRNA) depletion of the lysine deacetylases HDAC1 or HDAC2 had no significant effect on DUX4 mRNA levels, whereas concurrent HDAC1/HDAC2 knockdown increased DUX4 mRNA 100-fold resulting in the activation of DUX4 target genes ZSCAN4 and TRIM43 (FIG. 2B and FIG. 2K). In contrast, in MB073 FSHD1 and MB200 FSHD2 myoblasts, singular HDAC1 or HDAC2 depletion led to a ≥20-fold activation of DUX4 mRNA while dual HDAC1/HDAC2 knockdown increased DUX4 levels more than 140-fold, with comparable changes to DUX4 targets (FIGS. 2C-2D and FIGS. 2L-2M). Pharmacological inhibition of HDAC1/HDAC2 activity by MS-275 (Nebbioso et al., 2009) also increased DUX4 and DUX4 target gene expression, and enhanced histone H4 acetylation at the D4Z4 array (FIGS. 2N-2O). Collectively, these results indicate that HDAC1 and HDAC2 are associated with, and function to transcriptionally repress, the D4Z4 array. These data also show that the D4Z4 repeat in control myoblasts is more resistant to de-repression than the D4Z4 repeat in FSHD cells, which are sensitized because of a shortened array (FSHD1) or SMCHD1 mutation (FSHD2).

Figure 2P:
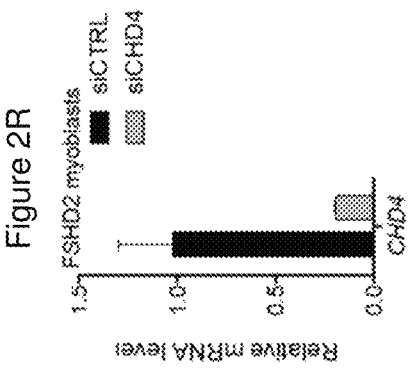
Figure 2U:
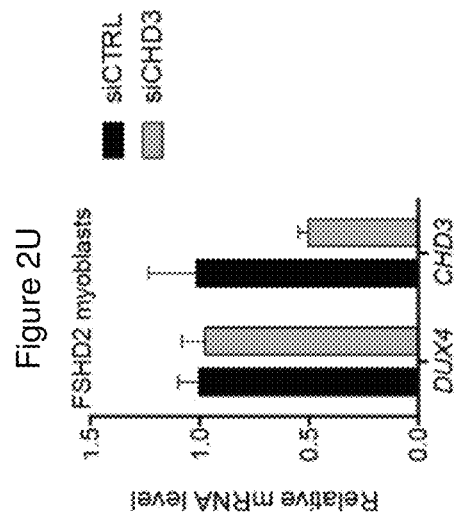
FIGS. 2S-2U. CHD3 depletion in control and FSHD myoblasts. DUX4 and CHD3 gene expression as determined by RT-qPCR following control (CTRL) or CHD3 siRNA knockdown in MB2401 control (FIG. 2S), MB073 FSHD1 (FIG. 2T) or MB200 FSHD2 (FIG. 2U) myoblasts. Error bars denote the standard deviation from the mean of three biological replicates.
Figure 2T:
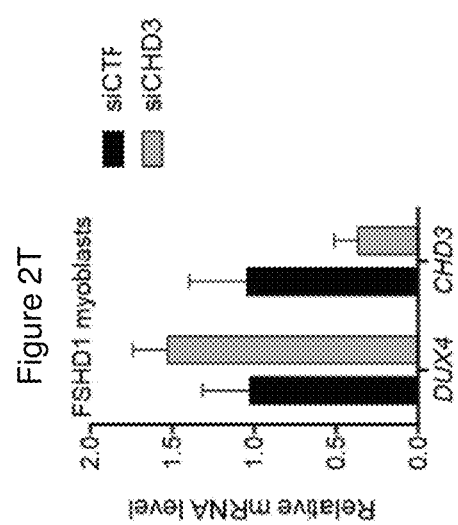
Figure 2S:
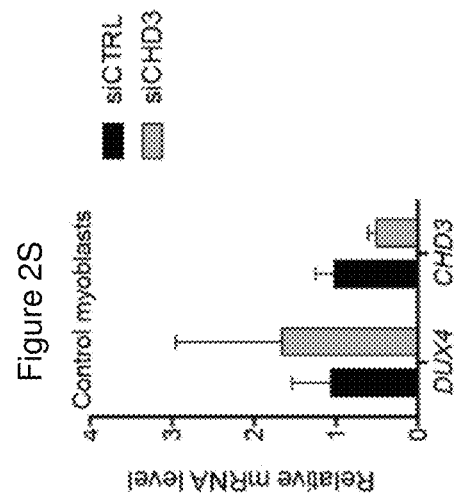

We next evaluated the necessity of the ATP-dependent chromatin remodelers CHD3 and CHD4 for D4Z4 repeat repression. Depleting CHD4 from MB2401 control myoblasts had no effect on DUX4 expression (FIG. 2E and FIG. 2P). However, CHD4 knockdown in MB073 FSHD1 or MB200 FSHD2 myoblasts increased DUX4 mRNA 20-fold and concomitantly activated DUX4 targets (FIGS. 2F-2G and FIGS. 2Q-2R). In contrast, CHD3 depletion did not lead to DUX4 de-repression in either control or FSHD cells (FIGS. 2S-2U), consistent with its absence from the gD4Z4 enChIP purifications and the mutually exclusive nature of CHD3 and CHD4 within the NuRD complex. Together, these results reveal that CHD4 binds the D4Z4 repeat and is necessary to silence DUX4 expression in FSHD cells, whereas control myoblasts have a more stably repressed D4Z4 array.

Figure 2V:
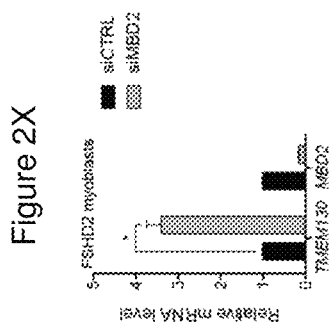
FIGS. 2V-2X. Validation of MBD2 knockdown. TMEM130 and MBD2 gene expression as determined by RT-qPCR following control (CTRL) or MBD2 siRNA knockdown in MB2401 control (FIG. 2V), MB073 FSHD1 (FIG. 2W) or MB200 FSHD2 (FIG. 2X) myoblasts. Error bars denote the standard deviation from the mean of three biological replicates. Statistical significance was calculated by comparing the specific knockdown to the control knockdown for each gene using a two-tailed, two-sample Mann-Whitney U test. *, $p \leq 0.05$.
Figure 2W:
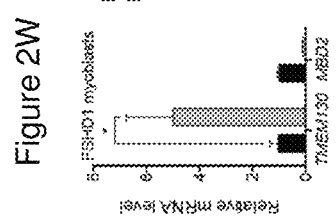
Figure 2X:
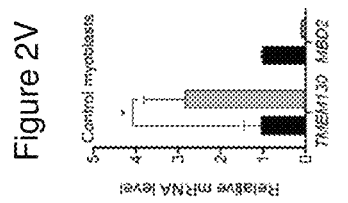
Figure 2Y:
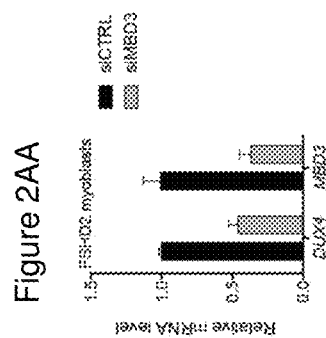
Figure 2Z:
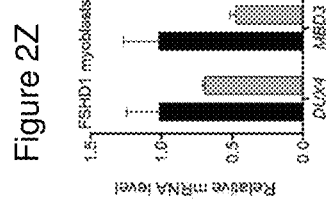
Figure 2A:
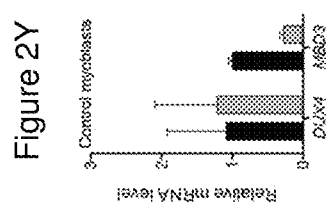

Similar to CHD4, depleting methyl-CpG-binding protein MBD2 from MB2401 control myoblasts had no effect on DUX4 mRNA levels (FIG. 2H and FIG. 2V). However, depleting MBD2 from MB073 FSHD1 myoblasts moderately, but significantly, increased DUX4 expression; whereas, DUX4 was not de-repressed when MBD2 was knocked down in MB200 FSHD2 myoblasts (FIGS. 2I-2J and FIGS. 2W-2X). This difference suggests a possible D4Z4 context-dependent effect that was not observed for the single-copy NuRD complex-bound gene TMEM130 following MBD2 knockdown. We further observed that depletion of MBD3, which can recruit the NuRD complex to unmethylated DNA (Baubec et al., 2013; Le Guezennec et al., 2006; Saito and Ishikawa, 2002), did not de-repress DUX4 in MB2401 control, MB073 FSHD1 or MB200 FSHD2 myoblasts (FIGS. 2Y-2AA). Together, these data show that MBD2 occupies the D4Z4 array and is necessary for DUX4 repression in at least some contexts, and suggest that factors in addition to MBD2 might recruit components shared by the NuRD complex to silence the D4Z4 macrosatellite repeat.

Silencing the D4Z4 Array Requires Components of the MBD1/CAF-1 Complex

Figure 3G:
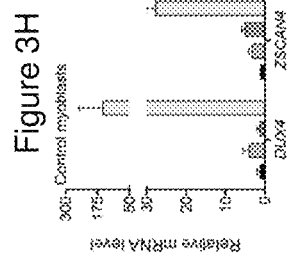

The NuRD complex is known to cooperate with other complexes to carry out its cellular functions. For example, NuRD and the CAF-1 chromatin assembly complex work together in several molecular processes (Helbling Chadwick et al., 2009; Yang et al., 2015) and share a core subunit, RBBP4, which was identified as associated with the D4Z4 repeat by gD4Z4 enChIP purification (Table 1). CHAF1A and CHAF1B comprise the other core members of the CAF-1 complex (Volk and Crispino, 2015) (FIG. 3A). Depleting CHAF1A or CHAF1B resulted in the activation of DUX4 and DUX4 target genes in FSHD myoblasts (FIGS. 3B-D and FIGS. 3K-3M), confirming a role for this complex in D4Z4 regulation. CAF-1 interacts with CpG-binding protein MBD1, which binds both methylated and unmethylated DNA to inhibit transcription (Jorgensen et al., 2004; Reese et al., 2003). Knockdown of MBD1 led to DUX4 and DUX4 target gene activation in MB200 FSHD2 myoblasts but not in MB2401 control or MB073 FSHD1 myoblasts (FIGS. 3E-3G and FIGS. 3N-3P), indicating a possible context-dependent relative necessity of MBD1 or MBD2 in different FSHD cells.

Figure 3H:
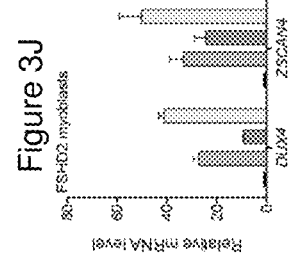
Figure 3I:
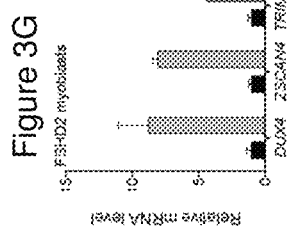
Figure 3J:
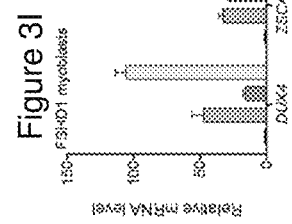
Figure 3Q:
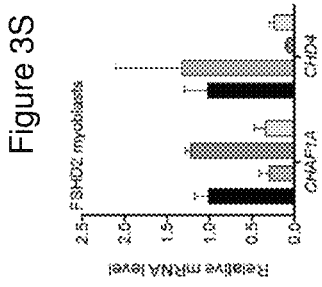
FIGS. 3Q-3S. Validation of CHAF1A and CHD4 knockdown. CHAF1A and CHD4 gene expression as determined by RT-qPCR following control (CTRL), CHAF1A, CHD4 or simultaneous CHAF1A/CHD4 siRNA knockdown in MB2401 control (FIG. 3Q), MB073 FSHD1 (FIG. 3R) or MB200 FSHD2 (FIG. 3S) myoblasts. Error bars denote the standard deviation from the mean of three biological replicates.
Figure 3R:
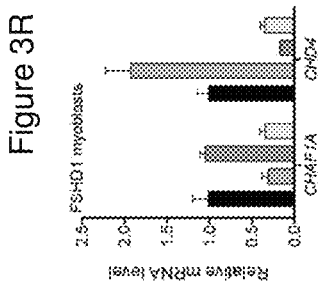
Figure 3S:
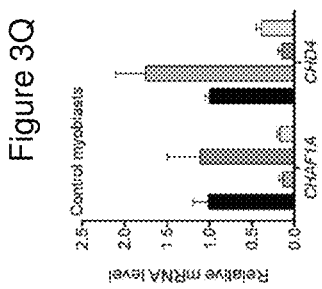
Figure 3D:
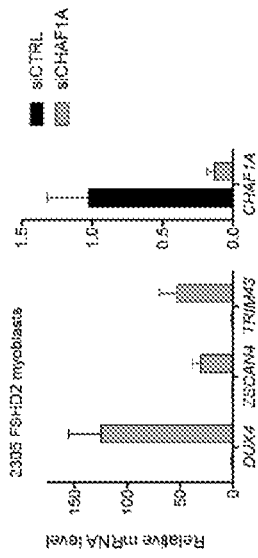
Figure 3E:
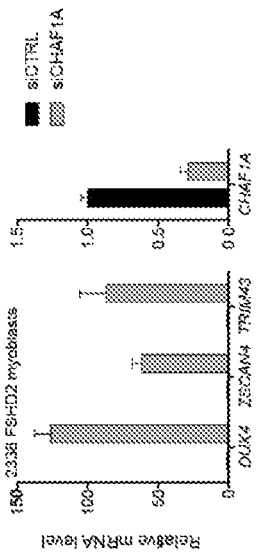
Figure 3F:
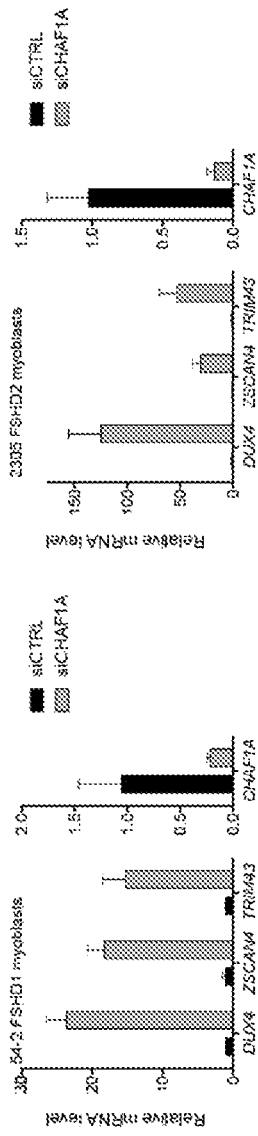
Figure 3G:
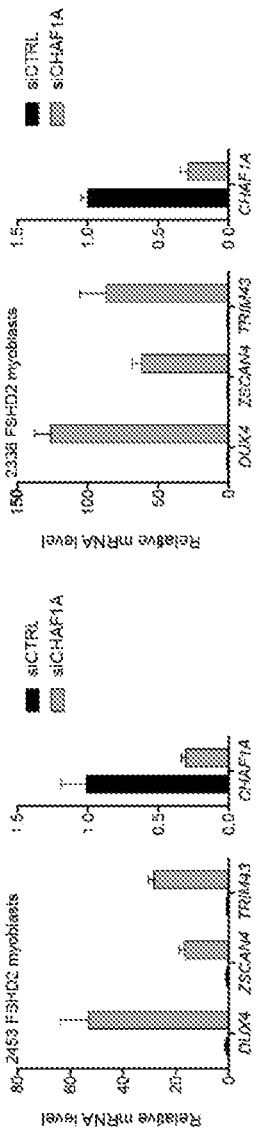
Figure 3H:
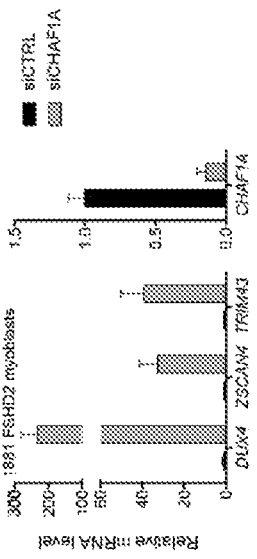

Notably, although knockdown of CHAF1A or CHD4 alone did not induce DUX4 expression in MB2401 control myoblasts (FIG. 2E and FIG. 3B), simultaneous depletion increased DUX4 mRNA levels over 150-fold (FIG. 3H and FIG. 3Q). An additive or greater impact was also observed with dual versus singular CHD4 and CHAF1A knockdown in MB073 FSHD1 and MB200 FSHD2 myoblasts (FIGS. 3I-3J and FIGS. 3R-3S). Together, these results indicate that a combination of MBD1- and MBD2-mediated recruitment of the CAF-1 and NuRD repressive complexes, respectively, work together to silence the D4Z4 repeat in skeletal muscle cells.

To extend these studies, we depleted CHD4, CHAF1A, MBD2, or MBD1 in five additional FSHD cell lines: one FSHD1 cell line (54-2) with three 4qA D4Z4 repeats (compared to the 8 repeats of the MB073 line), and four FSHD2 lines (2305, 2453, 2338, and 1881) with different SMCHD1 mutations and repeat sizes ranging from 11-15 D4Z4 units (Example 4). All five lines showed de-repression of DUX4 upon knockdown of MBD2 or CHAF1A, and all but one (2453, an FSHD2 cell line) showed increased DUX4 expression following CHD4 depletion; whereas, de-repression following MBD1 knockdown was evident in the FSHD1 and two of the FSHD2 cell lines (FIGS. 3T-3MM). Taken together, these data indicate the combined roles of the NuRD and CAF-1 complexes in repressing DUX4, and that the relative necessity of specific components of each pathway might vary depending on the cellular context, or possibly the efficiency of each knockdown.

Components Shared by the NuRD and CAF-1 Complexes Mediate D4Z4 Repeat Repression To repress transcription, core members of the NuRD and CAF-1 complexes utilize a shared set of auxiliary factors, namely the tripartite motif-containing protein TRIM28, the lysine methyltransferase SETDB1, and the lysine demethylase KDM1A (Ivanov et al., 2007; Loyola et al., 2009; Sarraf and Stancheva, 2004; Schultz et al., 2001; Wang et al., 2009; Yang et al., 2015). Knockdown of TRIM28, SETDB1 or KDM1A de-repressed DUX4 in MB073 FSHD1 and MB200 FSHD2 myoblasts to varying degrees ranging from 3- to 130-fold (FIGS. 4A-4R), implicating them in facilitating silencing of the D4Z4 array. Of these factors, only KDM1A knockdown de-repressed DUX4 mRNA in the MB2401 control myoblasts, indicating a necessary role for this demethylase in maintaining repression of both normal and pathological D4Z4 alleles in muscle cells. In support of these expression data, peptides for TRIM28 were present in gD4Z4 enChIP pulldowns though they did not meet our filtering criteria to be included in the list of D4Z4-associated proteins.

Figure 4M:
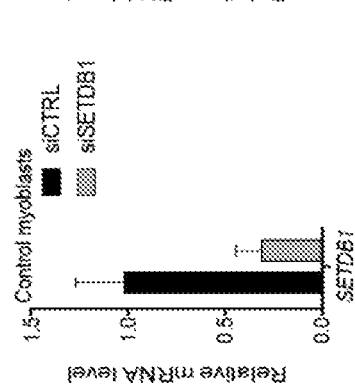
FIGS. 4M-4O. Validation of SETDB1 knockdown. SETDB1 gene expression as determined by RT-qPCR following control (CTRL) or SETDB1 siRNA knockdown in MB2401 control (FIG. 4M), MB073 FSHD1 (FIG. 4N) or MB200 FSHD2 (FIG. 4O) myoblasts. Error bars denote the standard deviation from the mean of three biological replicates.
Figure 4N:
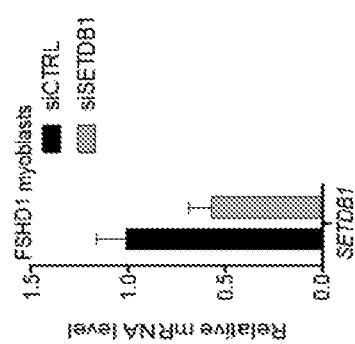
Figure 4O:
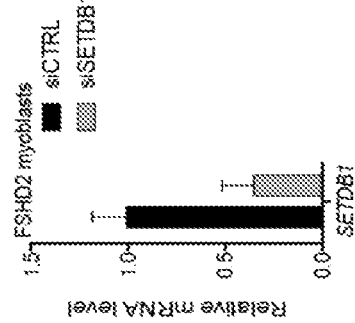
Figure 4P:
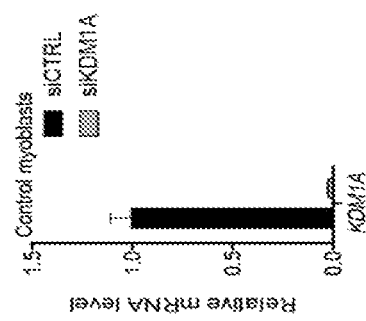
FIGS. 4P-4R. Validation of KDM1A knockdown. KDM1A gene expression as determined by RT-qPCR following control (CTRL) or KDM1A siRNA knockdown in MB2401 control (FIG. 4P), MB073 FSHD1 (FIG. 4Q) or MB200 FSHD2 (FIG. 4R) myoblasts. Error bars denote the standard deviation from the mean of three biological replicates.
Figure 4Q:
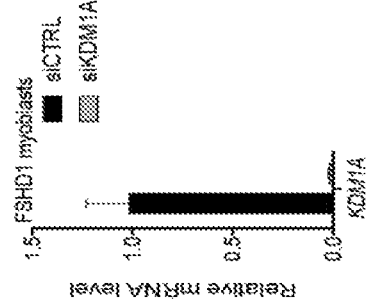
Figure 4R:
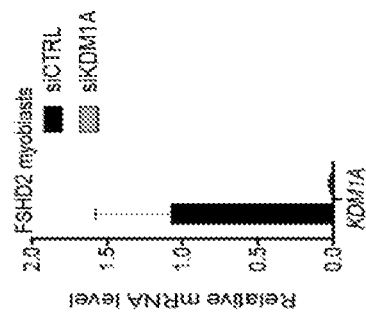

Similarly, SIN3A peptides were found in a gD4Z4 pulldown before our final filtering steps. The transcriptionally repressive SIN3 complex shares core proteins HDAC1, HDAC2, RBBP4, and RBBP7 with the NuRD complex and is also composed of SDS3, SAP18, SAP30 and SIN3A or SIN3B subunits (Grzenda et al., 2009) (FIG. 4S). Therefore we tested its role in D4Z4 repeat repression and found that SIN3A or SIN3B depletion led to the activation of DUX4 and DUX4 target genes in FSHD cells (FIGS. 4T-4Y), supporting a role for the SIN3 complex in D4Z4 regulation. Taken together, these data indicate that D4Z4 array silencing is mediated by multiple chromatin regulatory factors that act together with core components of the NuRD complex and also depend on the CAF-1 chromatin assembly complex to achieve full epigenetic repression.

Proteins that Repress the D4Z4 Array in Myoblasts Also Silence DUX4 in iPS Cells We previously reported that DUX4 is expressed at very low levels in human iPS cell populations (Snider et al., 2010) and, similar to the expression pattern in FSHD myoblasts, this represents the occasional expression in a small number of cells (JWL, unpublished data). We have more recently shown that DUX4 is present in 4-cell human embryos and that when expressed in iPS cells or muscle cells it activates a cleavage-stage transcriptional program similar to the program expressed in a subset of 'naïve' iPS or embryonic stem (ES) cells (Hendrickson et al., 2017; Whiddon et al., 2017). To determine whether factors responsible for silencing the D4Z4 repeat in myoblasts have a similar function in a model of early development, we knocked down components of the NuRD and CAF-1 complexes in human eMHF2 iPS cells, which were derived from an unaffected (non-FSHD) individual, and assessed the impact on DUX4 expression. Similar to our myoblast results, depletion of HDAC1/HDAC2, CHD4, CHAF1A, SETDB1 or SIN3B de-repressed DUX4 in iPS cells; whereas, unlike in myoblasts, knockdown of KDM1A in iPS cells had a more minor effect on the levels of DUX4 mRNA (FIGS. 5A-5L).

Figure 5R:
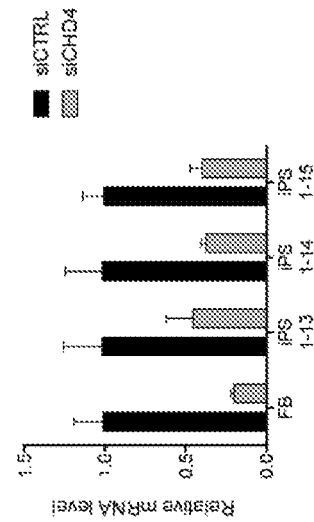
FIGS. 5R-5U. NuRD and CAF-1 knockdown in HFF3 fibroblasts and iPS cells. Gene expression as determined by RT-qPCR following control (CTRL), CHD4 (FIGS. 5R-5S) or CHAF1A (FIGS. 5T-5U) siRNA knockdown in human HFF3 fibroblasts (FB) and three isogenic iPS cell lines generated by reprogramming the fibroblast line. DUX4 data were generated with 4qAL primers (see Materials and Methods). Error bars denote the standard deviation from the mean of three biological replicates.
Figure 5T:
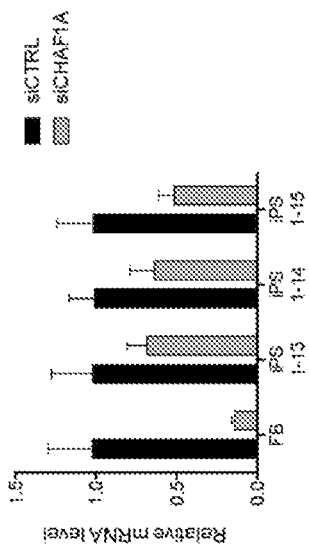
Figure 5S:
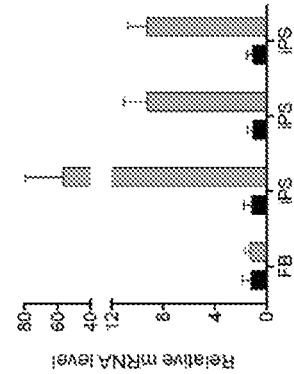
Figure 5U:
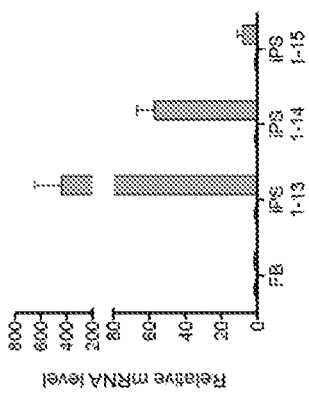
Figure 6E:
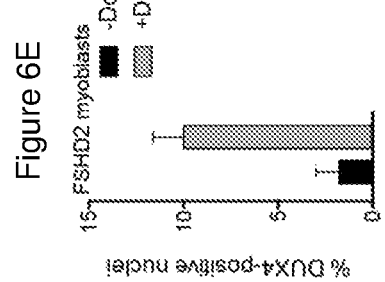
Figure 6F:
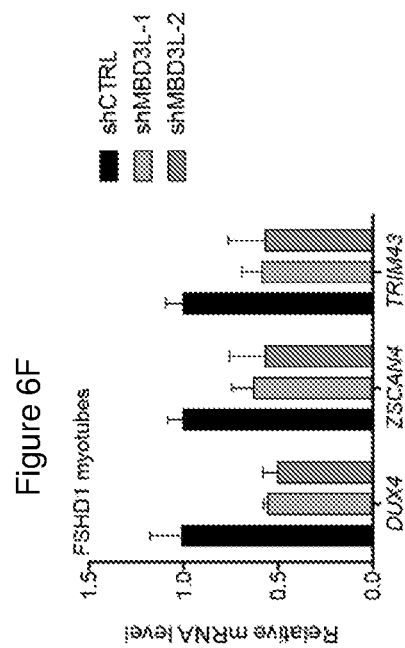
Figure 6G:
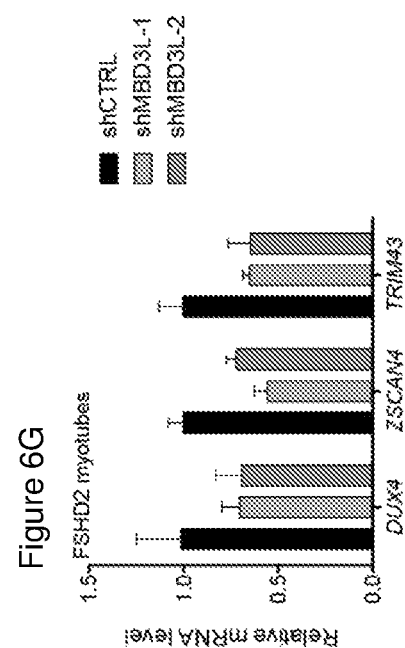
Figure 6M:
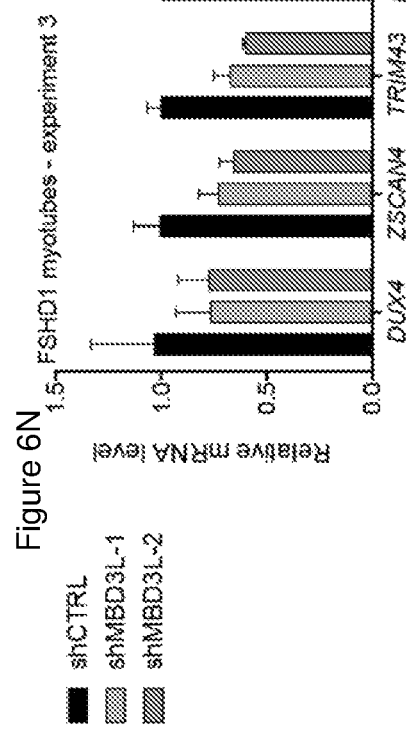
FIGS. 6M-6P. Additional MBD3L knockdown experiments. MBD3L2, DUX4, and DUX4 target gene expression as determined by RT-qPCR in two additional independent experiments with control (CTRL) or MBD3L shRNA-expressing MB073 FSHD1 (FIGS. 6M-6N) or MB200 FSHD2 (FIGS. 6O-6P) muscle cell lines differentiated into myotubes. Error bars denote the standard deviation from the mean of three biological replicates.
Figure 6O:
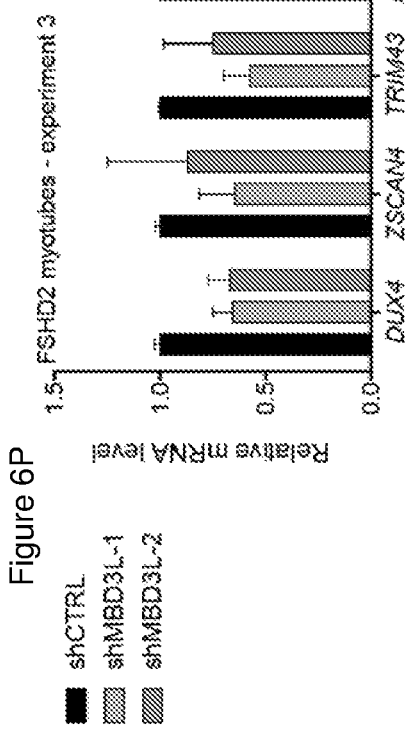
Figure 6N:
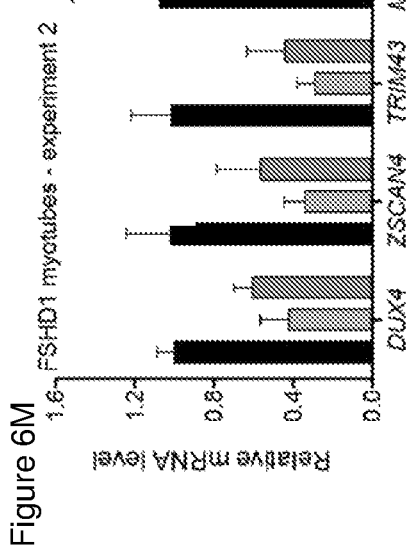
Figure 6P:
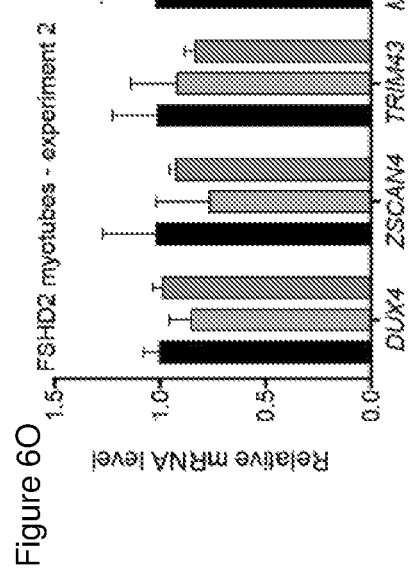

To determine whether iPS cells have a greater necessity for NuRD and CAF-1 components to maintain DUX4 repression compared to somatic cells, we transduced a human foreskin fibroblast cell line (HFF3) with the reprogramming factors Oct4, Sox2, Nanog, and Lin28 to generate isogenic iPS cell clones (FIGS. 5M-5Q). Notably, depletion of NuRD and CAF-1 complex components did not lead to DUX4 de-repression in the parental HFF3 fibroblast line, whereas the HFF3 iPS lines responded similarly to the eMHF2 iPS line (FIGS. 5R-5Q). These results indicate that the NuRD and CAF-1 complexes that silence the D4Z4 macrosatellite array in muscle cells also contribute to the regulation of this locus in human iPS cells, and that iPS cells have decreased D4Z4 repression compared to their somatic counterpart, similar to the decreased repression in FSHD myoblasts compared to control myoblasts.

MBD3L2 De-Represses the D4Z4 Repeat

In prior studies of DUX4-induced gene expression, we identified the MBD3L family (MBD3L2, MBD3L3, MBD3L4, and MBD3L5) as a direct target of DUX4 that was expressed in FSHD, but not control, muscle cells and muscle biopsies, and activated by exogenous DUX4 in cultured human myoblasts (Geng et al., 2012; Yao et al., 2014; Young et al., 2013). MBD3L family proteins can replace MBD2 or MBD3 in the NuRD complex but they lack the CpG-binding domain and antagonize NuRD-mediated transcriptional repression, possibly by preventing the complex from being recruited to its DNA targets (Jiang et al., 2002; Jin et al., 2005). To determine whether MBD3L proteins de-repress the NuRD complex-regulated D4Z4 array, we transduced control and FSHD myoblasts with a lentiviral vector delivering a doxycycline-inducible MBD3L2 transgene and, after selecting for transgene-expressing cells, analyzed DUX4 mRNA and protein after 48 hours of doxycycline treatment. Similar to the knockdown of NuRD complex members, expression of MBD3L2 induced DUX4 5-18-fold in MB073 FSHD1 and MB200 FSHD2 myoblasts and increased by 10-fold the number of myoblast nuclei expressing DUX4 protein, whereas DUX4 was not de-repressed in MB2401 control myoblasts (FIGS. 6A-6E and FIGS. 6H-6J).

When cultured in low mitogen differentiation media, myoblasts fuse to form multinucleated myotubes, and DUX4 expression increases in FSHD myotubes compared to myoblasts (Balog et al., 2015). To determine whether the DUX4-induced MBD3L proteins might contribute to the increased DUX4 expression in myotubes, we expressed short hairpin RNA (shRNA) to inhibit MBD3L RNAs in MB073 FSHD1 and MB200 FSHD2 myotubes and found that these decreased DUX4 and DUX4 target gene expression by ~50% and ~30%, respectively (FIGS. 6F-6G, FIGS. 6K-6L and FIGS. 6M-6P). Together, these data implicate MBD3L2 in the regulation of the D4Z4 array and demonstrate that endogenous DUX4-induced MBD3L proteins contribute to the amplification of DUX4 expression in FSHD myotubes.

Discussion

In this study, enChIP-MS identified factors that co-purified with the D4Z4 macrosatellite array in human myoblasts, and subsequent ChIP and knockdown studies revealed that the NuRD and CAF-1 complexes repress DUX4 expression from the D4Z4 repeat in skeletal muscle and iPS cells. To some extent, each complex appears to have a parallel, or redundant, function in DUX4 repression because knockdown of both pathways was necessary to induce DUX4 expression in MB2401 control myoblasts. The distinctive mutations causing FSHD, or other factors such as the distribution of DNA methylation on the D4Z4, might preferentially weaken different specific components of each pathway, as evidenced by the relative necessity for CHD4, MBD2 or MBD1 in different FSHD cell lines. However, the variable efficiencies of the individual knockdowns in each cell type and experiment might also contribute to these apparent differences. It is also important to note that CAF-1 is a chromatin assembly complex and that the knockdowns were performed in replicating myoblasts; therefore, CAF-1 knockdown might not have the same consequence in post-mitotic myotubes. Overall, despite the relative differences in the necessity of the specific protein knockdown of individual components of the NuRD or CAF-1 complexes in different FSHD cells, the data show that these complexes together are necessary to maintain D4Z4 repression. These two complexes also have shared auxiliary components, e.g., TRIM28, SETDB1, and KDM1A, and knockdown of these factors also induced DUX4 expression in FSHD cells, with KDM1A knockdown being sufficient on its own to induce DUX4 in control myoblasts.

Our en-ChIP pulldowns identified several D4Z4-associated proteins that are involved in epigenetic silencing of variegated gene expression in mice (Blewitt et al., 2005; Daxinger et al., 2013). One of this group of Modifier of murine metastable epiallele Dominant (MommeD) genes, Smchd1, was shown to directly repress DUX4 in human cells and to be a causative gene for FSHD2 (Lemmers et al., 2012). In addition to finding SMCHD1 associated with the D4Z4 in our enChIP, we identified the MommeD genes PBRM1, RIF1, SMARCA4, SMARCA5 and UHRF1 as D4Z4-associated by enChIP-MS, and implicated the MommeD genes HDAC1, SETDB1 and TRIM28 in the regulation of DUX4 through knockdown experiments. The convergence and striking overlap of the results of these two complementary approaches to understanding variegated gene expression suggest that conserved machinery may be responsible for repressing this type of locus across species. The presence of chromatin remodelers and positive transcriptional regulators, such as SMARCA5, BRD3 and BRD4, at the D4Z4 locus in the control cells used for the enChIP also indicates a dynamic balance between activators and repressors, which is consistent with the identification of sense and anti-sense transcripts associated with the D4Z4 repeats in both control and FSHD cells (Snider et al., 2010). Our findings also suggest that PBRM1, RIF1, SMARCA4, SMARCA5 and UHRF1 are candidates for playing a role in DUX4 regulation and deserve additional attention in future studies.

The necessity of the NuRD complex to maintain repression of DUX4 in FSHD cells suggests that the DUX4-mediated induction of the MBD3L family of factors might amplify DUX4 expression within a nucleus or facilitate the internuclear spreading of DUX4 in multinucleated myotubes. MBD3L factors replace MBD2 or MBD3 in the NuRD complex and antagonize its normal repressive function (Jiang et al., 2002; Jin et al., 2005). In this study, we showed that expression of MBD3L2 was sufficient to amplify DUX4 expression in FSHD cells and knockdown using an shRNA that targets the entire family showed that expression of the MBD3L family was necessary for the full induction of DUX4 expression in FSHD myotubes. The fact that DUX4 induces high expression of the clustered MBD3L genes reveals a positive feed-forward mechanism that might facilitate spreading of DUX4 expression between nuclei in myotubes. In FSHD myotubes, DUX4 expression apparently initiates in a single nucleus and the protein then spreads to adjacent nuclei in the syncytium. Similarly, MBD3L proteins are detected as spreading to adjacent nuclei (AEC, unpublished data) where they would facilitate DUX4 expression. In this manner, each DUX4 expressing nucleus would act to progressively amplify DUX4 expression in its neighbors, spreading DUX4 expression along the myofiber. This might be similar to, and additive with, the prior observation that the DUX4-mediated inhibition of NMD can amplify DUX4 expression by stabilizing the DUX4 mRNA, which is itself a target of NMD (Feng et al., 2015). It is interesting to speculate that the internuclear amplification of DUX4 expression might contribute to the susceptibility of skeletal muscle to damage in FSHD.

Together our data provide several complementary approaches to the challenge of creating an FSHD therapeutic. One strategy would be to enhance D4Z4 repression by designing drugs that increase NuRD complex-mediated repression. Although drugs that decrease epigenetic repression are in clinical use, including some that target members of the NuRD complex (SAHA, targeting HDAC1/2; ORY-1001, targeting KDM1A; GSK126, EZH2 inhibitor) drugs that enhance epigenetic repression have received less attention. This is partly due to concerns that they might also suppress important tumor suppressor genes, but the fact that mutations in SMCHD1 and DNMT3B that cause FSHD have limited genome-wide consequences suggests that some factors might be relatively specific for repressing repetitive regions of the genome. A second strategy would be to prevent the amplification of DUX4 after it stochastically 'bursts' on in a myotube nucleus. This might be accomplished by inhibiting the production of MBD3L proteins with small molecules or interfering RNAs. Alternatively, myoblast transplantation with cells containing larger D4Z4 repeat sizes or 4qB alleles might provide 'decoy' nuclei that would absorb MBD3L factors and not activate DUX4, or, in a similar decoy approach, autologous transplants following deletion of the D4Z4 array and/or the MBD3L cluster. Although little is known about the regulation of DUX4 expression in cleavage-stage embryos and the testis luminal cells, it is evident from this study that the expression of DUX4 in a small percentage of iPS cells or ES cells shares mechanisms of molecular regulation with skeletal muscle cells. This also indicates similarities between the regulation of the human DUX4 retrogene and the mouse Dux retrogene that is also in a macrosatellite array, although thought to have arisen from a separate retrotransposition of the DUXC gene (Clapp et al., 2007; Leidenroth et al., 2012; Leidenroth and Hewitt, 2010). It was previously shown that CAF-1 depletion in mouse ES cells resulted in the expression of genes specific to 2-cell embryos (Ishiuchi et al., 2015), and later shown that induction of these genes was blocked by simultaneous knockdown of mouse Dux along with Chafla (Hendrickson et al., 2017). Trim28, Kdm1a, and HDAC inhibitors have been shown to regulate Zscan4 and the early cleavage program in mouse ES cells (Macfarlan et al., 2012), and for Trim28 this activity was shown to be mediated through the induction of mouse Dux (De Iaco et al., 2017). Similarly, the NuRD complex and MBD3 have been shown to inhibit cellular reprogramming in mouse ES cells, and, conversely, reprogramming to a naïve stem cell state was facilitated by inhibition of these complexes (Luo et al., 2013; Rais et al., 2013). The fact that inhibiting NuRD or CAF-1 activity potentiates stem cell reprogramming in mouse ES/iPS cells and, as shown in this report, potentiates human DUX4 expression, suggests that DUX4 itself might facilitate reprogramming to the naïve state and that mouse Dux and human DUX4 might be subject to similar regulation, a finding not entirely obvious given that these retrogenes are thought to have been generated by independent retrotranspositions of the parental DUXC gene, as noted above.

In summary, we identified components of the NuRD and CAF-1 complexes as necessary to maintain repression of DUX4 expression from the D4Z4 repeat. In control myoblasts, either pathway was sufficient to maintain repression of DUX4, whereas in FSHD cells inhibition of either pathway resulted in higher levels of DUX4 expression. These same mechanisms repress DUX4 expression in iPS cells. In addition, the DUX4 induction of the NuRD antagonist MBD3L family further de-repressed DUX4 in FSHD cells. Together, these findings provide the basis for therapies directed at repressing DUX4 in FSHD and reveal a mechanism for the regulation of DUX4 in stem cells.

REFERENCES

Balog J, Thijssen P E, Shadle S, Straasheijm K R, van der Vliet P J, Krom Y D, van den Boogaard M L, de Jong A, R J F L, Tawil R, Tapscott S J, van der Maarel S M. 2015. Increased DUX4 expression during muscle differentiation correlates with decreased SMCHD1 protein levels at D4Z4. *Epigenetics* 10:1133-1142. doi:10.1080/15592294.2015.1113798.

Basta J, Rauchman M. 2015. The nucleosome remodeling and deacetylase complex in development and disease. Transl Res 165:36-47. doi:10.1016/j.trsl.2014.05.003.

Baubec T, Ivanek R, Lienert F, Schubeler D. 2013. Methylation-dependent and -independent genomic targeting principles of the MBD protein family. Cell 153:480-492. doi:10.1016/j.cell.2013.03.011.

Blewitt M E, Vickaryous N K, Hemley S J, Ashe A, Bruxner T J, Preis J I, Arkell R, Whitelaw E. 2005. An N-ethyl-N-nitrosourea screen for genes involved in variegation in the mouse. Proc Natl Acad Sci USA 102:7629-7634. doi:10.1073/pnas.0409375102.

Bosnakovski D, Xu Z, Gang E J, Galindo C L, Liu M, Simsek T, Garner H R, Agha-Mohammadi S, Tassin A, Coppee F, Belayew A, Perlingeiro R R, Kyba M. 2008. An isogenetic myoblast expression screen identifies DUX4-mediated FSHD-associated molecular pathologies. EMBO J 27:2766-2779. doi:10.1038/emboj.2008.201.

Cabianca D S, Casa V, Bodega B, Xynos A, Ginelli E, Tanaka Y, Gabellini D. 2012. A long ncRNA links copy number variation to a polycomb/trithorax epigenetic switch in FSHD muscular dystrophy. Cell 149:819-831. doi:10.1016/j.cell.2012.03.035.

Campbell A E, Oliva J, Yates M P, Zhong J W, Shadle S C, Snider L, Singh N, Tai S, Hiramuki Y, Tawil R, van der Maarel S M, Tapscott S J, Sverdrup F M. 2017. BET bromodomain inhibitors and agonists of the beta-2 adrenergic receptor identified in screens for compounds that inhibit DUX4 expression in FSHD muscle cells. *Skelet Muscle* 7:16. doi:10.1186/s13395-017-0134-x.

Chuong E B, Elde N C, Feschotte C. 2017. Regulatory activities of transposable elements: from conflicts to benefits. Nat Rev Genet 18:71-86. doi:10.1038/nrg.2016.139.

Clapp J, Mitchell L M, Bolland D J, Fantes J, Corcoran A E, Scotting P J, Armour J A, Hewitt J E. 2007. Evolutionary conservation of a coding function for D4Z4, the tandem DNA repeat mutated in facioscapulohumeral muscular dystrophy. Am J Hum Genet 81:264-279. doi:10.1086/519311.

Consortium E P. 2007. Identification and analysis of functional elements in 1% of the human genome by the ENCODE pilot project. Nature 447:799-816. doi:10.1038/nature05874.

Consortium E P. 2012. An integrated encyclopedia of DNA elements in the human genome. Nature 489:57-74. doi:10.1038/nature11247.

Das S, Chadwick B P. 2016. Influence of repressive histone and DNA methylation upon D4Z4 transcription in non-myogenic cells. PLoS One 11:e0160022. doi:10.1371/journal.pone.0160022.

Daxinger L, Harten S K, Oey H, Epp T, Isbel L, Huang E, Whitelaw N, Apedaile A, Sorolla A, Yong J, Bharti V, Sutton J, Ashe A, Pang Z, Wallace N, Gerhardt D J, Blewitt M E, Jeddeloh J A, Whitelaw E. 2013. An ENU mutagenesis screen identifies novel and known genes involved in epigenetic processes in the mouse. Genome Biol 14:R96. doi:10.1186/gb-2013-14-9-r96.

Daxinger L, Tapscott S J, van der Maarel S M. 2015. Genetic and epigenetic contributors to FSHD. Curr Opin Genet Dev 33:56-61. doi:10.1016/j.gde.2015.08.007.

De Taco A, Planet E, Coluccio A, Verp S, Duc J, Trono D. 2017. DUX-family transcription factors regulate zygotic genome activation in placental mammals. Nat Genet 49:941-945. doi:10.1038/ng.3858.

de Koning A P, Gu W, Castoe T A, Batzer M A, Pollock D D. 2011. Repetitive elements may comprise over two-thirds of the human genome. PLoS Genet 7:e1002384. doi:10.1371/journal.pgen.1002384.

Elbarbary R A, Lucas B A, Maquat L E. 2016. Retrotransposons as regulators of gene expression. Science 351: aac7247. doi:10.1126/science.aac7247.

Feng Q, Snider L, Jagannathan S, Tawil R, van der Maarel S M, Tapscott S J, Bradley R K. 2015. A feedback loop between nonsense-mediated decay and the retrogene DUX4 in facioscapulohumeral muscular dystrophy. Elife 4. doi:10.7554/eLife.04996.

Forsberg E C, Downs K M, Christensen H M, Im H, Nuzzi P A, Bresnick E H. 2000. Developmentally dynamic histone acetylation pattern of a tissue-specific chromatin domain. Proc Natl Acad Sci USA 97:14494-14499. doi:10.1073/pnas.97.26.14494.

Fujita T, Fujii H. 2013. Efficient isolation of specific genomic regions and identification of associated proteins by engineered DNA-binding molecule-mediated chromatin immunoprecipitation (enChIP) using CRISPR. Biochem Biophys Res Commun 439:132-136. doi:10.1016/j.bbrc.2013.08.013.

Fujita T, Yuno M, Fujii H. 2016. Efficient sequence-specific isolation of DNA fragments and chromatin by in vitro enChIP technology using recombinant CRISPR ribonucleoproteins. Genes Cells 21:370-377. doi:10.1111/gtc.12341.

Gabellini D, Green M R, Tupler R. 2002. Inappropriate gene activation in FSHD: a repressor complex binds a chromosomal repeat deleted in dystrophic muscle. Cell 110: 339-348.

Geng L N, Tyler A E, Tapscott S J. 2011. Immunodetection of human double homeobox 4. Hybridoma (Larchmt) 30:125-130. doi:10.1089/hyb.2010.0094.

Geng L N, Yao Z, Snider L, Fong A P, Cech J N, Young J M, van der Maarel S M, Ruzzo W L, Gentleman R C, Tawil R, Tapscott S J. 2012. DUX4 activates germline genes, retroelements, and immune mediators: implications for facioscapulohumeral dystrophy. Dev Cell 22:38-51. doi: 10.1016/j.devcel.2011.11.013.

Gerdes P, Richardson S R, Mager D L, Faulkner G J. 2016. Transposable elements in the mammalian embryo: pioneers surviving through stealth and service. Genome Biol 17:100. doi:10.1186/s13059-016-0965-5.

Gilbert L A, Horlbeck M A, Adamson B, Villalta J E, Chen Y, Whitehead E H, Guimaraes C, Panning B, Ploegh H L, Bassik M C, Qi L S, Kampmann M, Weissman J S. 2014. Genome-Scale CRISPR-Mediated Control of Gene Repression and Activation. Cell 159:647-661. doi: 10.1016/j.cell.2014.09.029.

Grzenda A, Lomberk G, Zhang J S, Urrutia R. 2009. Sin3: master scaffold and transcriptional corepressor. Biochim Biophys Acta 1789:443-450. doi:10.1016/j.bbagrm.2009.05.007.

Helbling Chadwick L, Chadwick B P, Jaye D L, Wade P A. 2009. The Mi-2/NuRD complex associates with pericentromeric heterochromatin during S phase in rapidly proliferating lymphoid cells. Chromosoma 118:445-457. doi: 10.1007/s00412-009-0207-7.

Hendrickson P G, Dorais J A, Grow E J, Whiddon J L, Lim J W, Wike C L, Weaver B D, Pflueger C, Emery B R, Wilcox A L, Nix D A, Peterson C M, Tapscott S J, Carrell D T, Cairns B R. 2017. Conserved roles of mouse DUX and human DUX4 in activating cleavage-stage genes and MERVL/HERVL retrotransposons. Nat Genet 49:925-934. doi:10.1038/ng.3844.

Hota S K, Bruneau B G. 2016. ATP-dependent chromatin remodeling during mammalian development. Development 143:2882-2897. doi:10.1242/dev.128892. Huichalaf C, Micheloni S, Ferri G, Caccia R, Gabellini D. 2014. DNA methylation analysis of the macrosatellite repeat associated with FSHD muscular dystrophy at single nucleotide level. PLoS One 9:e115278. doi:10.1371/journal.pone.0115278.

Ishiuchi T, Enriquez-Gasca R, Mizutani E, Boskovic A, Ziegler-Birling C, Rodriguez-Terrones D, Wakayama T, Vaquerizas J M, Torres-Padilla M E. 2015. Early embryonic-like cells are induced by downregulating replication-dependent chromatin assembly. Nat Struct Mol Biol 22:662-671. doi:10.1038/nsmb.3066.

Ivanov A V, Peng H, Yurchenko V, Yap K L, Negorev D G, Schultz D C, Psulkowski E, Fredericks W J, White D E, Maul G G, Sadofsky M J, Zhou M M, Rauscher F J. 2007. PHD domain-mediated E3 ligase activity directs intramolecular sumoylation of an adjacent bromodomain required for gene silencing. Mol Cell 28:823-837. doi:10.1016/j.molcel.2007.11.012.

Jiang C L, Jin S G, Lee D H, Lan Z J, Xu X, O'Connor T R, Szabo P E, Mann J R, Cooney A J, Pfeifer G P. 2002. MBD3L1 and MBD3L2, two new proteins homologous to the methyl-CpG-binding proteins MBD2 and MBD3: characterization of MBD3L1 as a testis-specific transcriptional repressor. Genomics 80:621-629.

Jin S G, Jiang C L, Rauch T, Li H, Pfeifer G P. 2005. MBD3L2 interacts with MBD3 and components of the NuRD complex and can oppose MBD2-MeCP1-mediated methylation silencing. J Biol Chem 280:12700-12709. doi:10.1074/jbc.M413492200.

Jones T I, Yan C, Sapp P C, McKenna-Yasek D, Kang P B, Quinn C, Salameh J S, King O D, Jones P L. 2014. Identifying diagnostic DNA methylation profiles for facioscapulohumeral muscular dystrophy in blood and saliva using bisulfite sequencing. Clin Epigenetics 6:23. doi:10.1186/1868-7083-6-23.

Jorgensen H F, Ben-Porath I, Bird A P. 2004. Mbd1 is recruited to both methylated and nonmethylated CpGs via distinct DNA binding domains. Mol Cell Biol 24:3387-3395.

Kowaljow V, Marcowycz A, Ansseau E, Conde C B, Sauvage S, Matteotti C, Arias C, Corona E D, Nunez N G, Leo O, Wattiez R, Figlewicz D, Laoudj-Chenivesse D, Belayew A, Coppee F, Rosa A L. 2007. The DUX4 gene at the FSHD1A locus encodes a pro-apoptotic protein. Neuromuscul Disord 17:611-623. doi:10.1016/j.nmd.2007.04.002.

Krom Y D, Dumonceaux J, Mamchaoui K, den Hamer B, Mariot V, Negroni E, Geng L N, Martin N, Tawil R, Tapscott S J, van Engelen B G, Mouly V, Butler-Browne G S, van der Maarel S M. 2012. Generation of isogenic D4Z4 contracted and noncontracted immortal muscle cell clones from a mosaic patient: a cellular model for FSHD. Am J Pathol 181:1387-1401. doi:10.1016/j.ajpath.2012.07.007.

Le Guezennec X, Vermeulen M, Brinkman A B, Hoeijmakers W A, Cohen A, Lasonder E, Stunnenberg H G. 2006. MBD2/NuRD and MBD3/NuRD, two distinct complexes with different biochemical and functional properties. Mol Cell Biol 26:843-851. doi:10.1128/MCB.26.3.843-851.2006.

Leidenroth A, Clapp J, Mitchell L M, Coneyworth D, Dearden F L, Iannuzzi L, Hewitt J E. 2012. Evolution of DUX gene macrosatellites in placental mammals. Chromosoma 121:489-497. doi:10.1007/s00412-012-0380-y.

Leidenroth A, Hewitt J E. 2010. A family history of DUX4: phylogenetic analysis of DUXA, B, C and Duxbl reveals the ancestral DUX gene. BMC Evol Biol 10:364. doi: 10.1186/1471-2148-10-364.

Lemmers R J, Tawil R, Petek L M, Balog J, Block G J, Santen G W, Amell A M, van der Vliet P J, Almomani R, Straasheijm K R, Krom Y D, Klooster R, Sun Y, den Dunnen J T, Helmer Q, Donlin-Smith C M, Padberg G W, van Engelen B G, de Greef J C, Aartsma-Rus A M, et al. 2012. Digenic inheritance of an SMCHD1 mutation and an FSHD-permissive D4Z4 allele causes facioscapulohumeral muscular dystrophy type 2. Nat Genet 44:1370-1374. doi:10.1038/ng.2454.

Lemmers R J, van der Vliet P J, Balog J, Goeman J J, Arindrarto W, Krom Y D, Straasheijm K R, Debipersad R D, Ozel G, Sowden J, Snider L, Mul K, Sacconi S, van Engelen B, Tapscott S J, Tawil R, van der Maarel S M. 2017. Deep characterization of a common D4Z4 variant identifies biallelic DUX4 expression as a modifier for disease penetrance in FSHD2. Eur J Hum Genet. doi: 10.1038/s41431-017-0015-0.

Lemmers R J, van der Vliet P J, Klooster R, Sacconi S, Camano P, Dauwerse J G, Snider L, Straasheijm K R, van Ommen G J, Padberg G W, Miller D G, Tapscott S J, Tawil R, Frants R R, van der Maarel S M. 2010. A unifying genetic model for facioscapulohumeral muscular dystrophy. Science 329:1650-1653. doi:10.1126/science.1189044.

Lim J W, Snider L, Yao Z, Tawil R, Van Der Maarel S M, Rigo F, Bennett C F, Filippova G N, Tapscott S J. 2015. DICER/AGO-dependent epigenetic silencing of D4Z4 repeats enhanced by exogenous siRNA suggests mechanisms and therapies for FSHD. Hum Mol Genet 24:4817-4828. doi:10.1093/hmg/ddv206.

Livak K J, Schmittgen T D. 2001. Analysis of relative gene expression data using real-time quantitative PCR and the 2(-Delta Delta C(T)) method. Methods 25:402-408. doi: 10.1006/meth.2001.1262.

Loyola A, Tagami H, Bonaldi T, Roche D, Quivy J P, Imhof A, Nakatani Y, Dent S Y, Almouzni G. 2009. The HPlalpha-CAF1-SetDB1-containing complex provides H3K9me1 for Suv39-mediated K9me3 in pericentric heterochromatin. EMBO Rep 10:769-775. doi:10.1038/embor.2009.90.

Luo M, Ling T, Xie W, Sun H, Zhou Y, Zhu Q, Shen M, Zong L, Lyu G, Zhao Y, Ye T, Gu J, Tao W, Lu Z, Grummt I. 2013. NuRD blocks reprogramming of mouse somatic cells into pluripotent stem cells. Stem Cells 31:1278-1286. doi:10.1002/stem.1374.

Macfarlan T S, Gifford W D, Driscoll S, Lettieri K, Rowe H M, Bonanomi D, Firth A, Singer O, Trono D, Pfaff S L. 2012. Embryonic stem cell potency fluctuates with endogenous retrovirus activity. Nature 487:57-63. doi:10.1038/nature11244.

Mellacheruvu D, Wright Z, Couzens A L, Lambert J P, St-Denis N A, Li T, Miteva Y V, Hauri S, Sardiu M E, Low T Y, Halim V A, Bagshaw R D, Hubner N C, Al-Hakim A, Bouchard A, Faubert D, Fermin D, Dunham W H, Goudreault M, Lin Z Y, et al. 2013. The CRAPome: a contaminant repository for affinity purification-mass spectrometry data. Nat Methods 10:730-736. doi:10.1038/nmeth.2557.

Mi H, Poudel S, Muruganujan A, Casagrande J T, Thomas P D. 2016. PANTHER version 10: expanded protein families and functions, and analysis tools. Nucleic Acids Res 44:D336-342. doi:10.1093/nar/gkv1194.

Nebbioso A, Manzo F, Miceli M, Conte M, Manente L, Baldi A, De Luca A, Rotili D, Valente S, Mai A, Usiello A, Gronemeyer H, Altucci L. 2009. Selective class II HDAC inhibitors impair myogenesis by modulating the stability and activity of HDAC-MEF2 complexes. EMBO Rep 10:776-782. doi:10.1038/embor.2009.88.

Ottaviani A, Rival-Gervier S, Boussouar A, Foerster A M, Rondier D, Sacconi S, Desnuelle C, Gilson E, Magdinier F. 2009. The D4Z4 macrosatellite repeat acts as a CTCF and A-type lamins-dependent insulator in facio-scapulohumeral dystrophy. PLoS Genet 5:e1000394. doi:10.1371/journal.pgen.1000394.

Rais Y, Zviran A, Geula S, Gafni O, Chomsky E, Viukov S, Mansour A A, Caspi I, Krupalnik V, Zerbib M, Maza I, Mor N, Baran D, Weinberger L, Jaitin D A, Lara-Astiaso D, Blecher-Gonen R, Shipony Z, Mukamel Z, Hagai T, et al. 2013. Deterministic direct reprogramming of somatic cells to pluripotency. Nature 502:65-70. doi:10.1038/nature12587.

Reese B E, Bachman K E, Baylin S B, Rountree M R. 2003. The methyl-CpG binding protein MBD1 interacts with the p150 subunit of chromatin assembly factor 1. Mol Cell Biol 23:3226-3236.

Rickard A M, Petek L M, Miller D G. 2015. Endogenous DUX4 expression in FSHD myotubes is sufficient to cause cell death and disrupts RNA splicing and cell migration pathways. Hum Mol Genet 24:5901-5914. doi:10.1093/hmg/ddv315.

Saito M, Ishikawa F. 2002. The mCpG-binding domain of human MBD3 does not bind to mCpG but interacts with NuRD/Mi2 components HDAC1 and MTA2. J Biol Chem 277:35434-35439. doi:10.1074/jbc.M203455200.

Sanjana N E, Shalem O, Zhang F. 2014. Improved vectors and genome-wide libraries for CRISPR screening. Nat Methods 11:783-784. doi:10.1038/nmeth.3047.

Sarraf S A, Stancheva I. 2004. Methyl-CpG binding protein MBD1 couples histone H3 methylation at lysine 9 by SETDB1 to DNA replication and chromatin assembly. Mol Cell 15:595-605. doi:10.1016/j.molcel.2004.06.043.

Schneider C A, Rasband W S, Eliceiri K W. 2012. NIH Image to ImageJ: 25 years of image analysis. Nat Methods 9:671-675.

Schultz D C, Friedman J R, Rauscher F J, 3rd. 2001. Targeting histone deacetylase complexes via KRAB-zinc finger proteins: the PHD and bromodomains of KAP-1 form a cooperative unit that recruits a novel isoform of the Mi-2alpha subunit of NuRD. Genes Dev 15:428-443. doi:10.1101/gad.869501.

Shadle S C, Zhong J W, Campbell A E, Conerly M L, Jagannathan S, Wong C J, Morello T D, van der Maarel S M, Tapscott S J. 2017. DUX4-induced dsRNA and MYC mRNA stabilization activate apoptotic pathways in human cell models of facioscapulohumeral dystrophy. PLoS Genet 13:e1006658. doi:10.1371/journal.pgen.1006658.

Skene P J, Henikoff S. 2015. A simple method for generating high-resolution maps of genome-wide protein binding. Elife 4:e09225. doi:10.7554/eLife.09225.

Snider L, Asawachaicharn A, Tyler A E, Geng L N, Petek L M, Maves L, Miller D G, Lemmers R J, Winokur S T, Tawil R, van der Maarel S M, Filippova G N, Tapscott S J. 2009. RNA transcripts, miRNA-sized fragments and proteins produced from D4Z4 units: new candidates for the pathophysiology of facioscapulohumeral dystrophy. Hum Mol Genet 18:2414-2430. doi:10.1093/hmg/ddp180.

Snider L, Geng L N, Lemmers R J, Kyba M, Ware C B, Nelson A M, Tawil R, Filippova G N, van der Maarel S M, Tapscott S J, Miller D G. 2010. Facioscapulohumeral dystrophy: incomplete suppression of a retrotransposed gene. PLoS Genet 6:e1001181. doi:10.1371/journal.pgen.1001181.

Stadler G, Chen J C, Wagner K, Robin J D, Shay J W, Emerson C P, Jr., Wright W E. 2011. Establishment of clonal myogenic cell lines from severely affected dystrophic muscles—CDK4 maintains the myogenic population. Skelet Muscle 1:12. doi:10.1186/2044-5040-1-12.

Tawil R, van der Maarel S M, Tapscott S J. 2014. Facioscapulohumeral dystrophy: the path to consensus on pathophysiology. Skelet Muscle 4:12. doi:10.1186/2044-5040-4-12.

van den Boogaard M L, Lemmers R J, Balog J, Wohlgemuth M, Auranen M, Mitsuhashi S, van der Vliet P J, Straasheijm K R, van den Akker R F, Kriek M, Laurense-Bik M E, Raz V, van Ostaijen-Ten Dam M M, Hansson K B, van der Kooi E L, Kiuru-Enari S, Udd B, van Tol M J, Nishino I, Tawil R, et al. 2016. Mutations in DNMT3B modify epigenetic repression of the D4Z4 repeat and the penetrance of facioscapulohumeral dystrophy. Am J Hum Genet 98:1020-1029. doi:10.1016/j.ajhg.2016.03.013.

van Overveld P G, Lemmers R J, Sandkuijl L A, Enthoven L, Winokur S T, Bakels F, Padberg G W, van Ommen G J, Frants R R, van der Maarel S M. 2003. Hypomethylation of D4Z4 in 4q-linked and non-4q-linked facioscapulohumeral muscular dystrophy. Nat Genet 35:315-317. doi:10.1038/ng1262.

Vizcaino J A, Csordas A, del-Toro N, Dianes J A, Griss J, Lavidas I, Mayer G, Perez-Riverol Y, Reisinger F, Ternent T, Xu Q W, Wang R, Hermjakob H. 2016. 2016 update of the PRIDE database and its related tools. Nucleic Acids Res 44:D447-456. doi:10.1093/nar/gkv1145.

Volk A, Crispino J D. 2015. The role of the chromatin assembly complex (CAF-1) and its p60 subunit (CHAF1b) in homeostasis and disease. Biochim Biophys Acta 1849:979-986. doi:10.1016/j.bbagrm.2015.05.009.

Wallace L M, Garwick S E, Mei W, Belayew A, Coppee F, Ladner K J, Guttridge D, Yang J, Harper S Q. 2011. DUX4, a candidate gene for facioscapulohumeral muscular dystrophy, causes p53-dependent myopathy in vivo. Ann Neurol 69:540-552. doi:10.1002/ana.22275.

Wang Y, Zhang H, Chen Y, Sun Y, Yang F, Yu W, Liang J, Sun L, Yang X, Shi L, Li R, Li Y, Zhang Y, Li Q, Yi X, Shang Y. 2009. LSD1 is a subunit of the NuRD complex and targets the metastasis programs in breast cancer. Cell 138:660-672. doi:10.1016/j.cell.2009.05.050.

Whiddon J L, Langford A T, Wong C J, Zhong J W, Tapscott S J. 2017. Conservation and innovation in the DUX4-family gene network. Nat Genet 49:935-940. doi:10.1038/ng.3846.

Winokur S T, Chen Y W, Masny P S, Martin J H, Ehmsen J T, Tapscott S J, van der Maarel S M, Hayashi Y, Flanigan K M. 2003. Expression profiling of FSHD muscle supports a defect in specific stages of myogenic differentiation. Hum Mol Genet 12:2895-2907. doi:10.1093/hmg/ddg327.

Yang B X, El Farran C A, Guo H C, Yu T, Fang H T, Wang H F, Schlesinger S, Seah Y F, Goh G Y, Neo S P, Li Y, Lorincz M C, Tergaonkar V, Lim™, Chen L, Gunaratne J, Collins J J, Goff S P, Daley G Q, Li H, et al. 2015. Systematic identification of factors for provirus silencing in embryonic stem cells. Cell 163:230-245. doi:10.1016/j.cell.2015.08.037.

Yao Z, Snider L, Balog J, Lemmers R J, Van Der Maarel S M, Tawil R, Tapscott S J. 2014. DUX4-induced gene expression is the major molecular signature in FSHD skeletal muscle. Hum Mol Genet 23:5342-5352. doi:10.1093/hmg/ddu251.

Young J M, Whiddon J L, Yao Z, Kasinathan B, Snider L, Geng L N, Balog J, Tawil R, van der Maarel S M, Tapscott S J. 2013. DUX4 binding to retroelements creates promoters that are active in FSHD muscle and testis. PLoS Genet 9:e1003947. doi:10.1371/journal.pgen.1003947.

Yu J, Vodyanik M A, Smuga-Otto K, Antosiewicz-Bourget J, Frane J L, Tian S, Nie J, Jonsdottir G A, Ruotti V, Stewart R, Slukvin, I I, Thomson J A. 2007. Induced pluripotent stem cell lines derived from human somatic cells. Science 318:1917-1920. doi:10.1126/science.1151526.

Zeng W, de Greef J C, Chen Y Y, Chien R, Kong X, Gregson H C, Winokur S T, Pyle A, Robertson K D, Schmiesing J A, Kimonis V E, Balog J, Frants R R, Ball A R, Jr., Lock L F, Donovan P J, van der Maarel S M, Yokomori K. 2009. Specific loss of histone H3 lysine 9 trimethylation and HP1gamma/cohesin binding at D4Z4 repeats is associated with facioscapulohumeral dystrophy (FSHD). PLoS Genet 5:e1000559. doi:10.1371/journal.pgen.1000559.

Zhang Y, Ng H H, Erdjument-Bromage H, Tempst P, Bird A, Reinberg D. 1999. Analysis of the NuRD subunits reveals a histone deacetylase core complex and a connection with DNA methylation. Genes Dev 13:1924-1935.

Example 2

Proteins identified by enChIP-MS. The table lists the gene name, corresponding number of peptides recovered (pseudoquant), and percent coverage for each protein identified by enChIP-MS of nine independent FLAG-dCas9 immunoprecipitations from various gD4Z4- or gMYOD1-expressing myoblast cell lines.

Proteins Identified by enChIP-MS.

| | SAMPLE [a] | | | | | | | | | |
|---|---|---|---|---|---|---|---|---|---|---|
| | gD4Z4-2 | | gD4Z4-1 + gD4Z4-3 [b] | | | | gD4Z4-1[+] | | gD4Z4-3[+] | |
| | | | 1% formaldehyde | | 2% formaldehyde | | | | | |
| GENE NAME | Pseudoquant | Percent coverage | Pseudoquant | Percent coverage | Pseudoquant | Percent coverage | Pseudoquant | Percent coverage | Pseudoquant | Percent coverage |
| AATF | NA | NA | NA | NA | 1 | 2.3 | NA | NA | NA | NA |
| ACTN4 | NA | NA | 14 | 16.9 | 18 | 17.7 | NA | NA | NA | NA |
| ADAR | NA | NA | 1 | 1.9 | 2 | 3.8 | NA | NA | NA | NA |
| AFF4 | 2 | 3.1 | NA | NA | NA | NA | 2 | 3.1 | NA | NA |
| AHNAK | 63 | 8.4 | 29 | 6.1 | 33 | 5.2 | 63 | 8.4 | 79 | 11.1 |
| ALYREF | 6 | 21.4 | 4 | 11.3 | 3 | 7 | 6 | 21.4 | 2 | 11.3 |
| ANXA1 | 1 | 4.6 | NA | NA | NA | NA | 1 | 4.6 | 2 | 7.8 |
| API5 | 1 | 3 | 1 | 3 | 2 | 3 | 1 | 3 | NA | NA |
| ARGLU1 | 2 | 5.5 | NA | NA | NA | NA | 2 | 5.5 | 2 | 5.5 |
| BCLAF1 | 18 | 12.7 | NA | NA | NA | NA | 18 | 12.7 | 10 | 8.6 |
| BMS1 | 1 | 0.7 | 1 | 1.1 | NA | NA | 1 | 0.7 | NA | NA |
| BOP1 | NA | NA | 7 | 11 | 1 | 2.2 | NA | NA | NA | NA |
| BRD3 | 2 | 3.4 | NA | NA | NA | NA | 2 | 3.4 | NA | NA |
| BRD4 | 2 | 2.6 | NA | NA | NA | NA | 2 | 2.6 | NA | NA |
| BRIX1 | 1 | 2 | 3 | 7.1 | NA | NA | 1 | 2 | NA | NA |
| CACTIN | 1 | 2 | NA | NA | NA | NA | 1 | 2 | NA | NA |
| CASP14 | 8 | 17.4 | 2 | 4.1 | NA | NA | 8 | 17.4 | 10 | 18.2 |
| CBX3 | 6 | 16.4 | 2 | 14.2 | NA | NA | 6 | 16.4 | NA | NA |
| CBX5 | 2 | 9.9 | NA | NA | NA | NA | 2 | 9.9 | 1 | 5.8 |
| CCAR2 | NA | NA | 7 | 13 | 3 | 3.7 | NA | NA | NA | NA |
| CD3EAP | 6 | 10.4 | 2 | 5.7 | NA | NA | 6 | 10.4 | NA | NA |
| CDC5L | 6 | 10.8 | 6 | 8.5 | 6 | 10.5 | 6 | 10.8 | NA | NA |
| CDC73 | 1 | 1.9 | NA | NA | NA | NA | 1 | 1.9 | NA | NA |
| CDK11A | NA | NA | NA | NA | NA | NA | NA | NA | NA | NA |
| CDK11B | 2 | 4.3 | NA | NA | NA | NA | 2 | 4.3 | NA | NA |
| CEBPZ | NA | NA | 1 | 1.1 | 1 | 1.1 | NA | NA | NA | NA |
| CENPB | 2 | 4 | 1 | 2 | NA | NA | 2 | 4 | NA | NA |
| CHAMP1 | 1 | 1.6 | NA | NA | NA | NA | 1 | 1.6 | NA | NA |
| CHD2 | 2 | 1.3 | NA | NA | NA | NA | 2 | 1.3 | NA | NA |
| CHD4 | 10 | 3.7 | NA | NA | NA | NA | 10 | 3.7 | NA | NA |

-continued

| | | | | | | | | | |
|---|---|---|---|---|---|---|---|---|---|
| CHERP | 1 | 1.5 | NA | NA | NA | NA | 1 | 1.5 | NA | NA |
| CKAP4 | 21 | 24.1 | 31 | 31.4 | 28 | 29.4 | 21 | 24.1 | 50 | 33.4 |
| COIL | 4 | 9.4 | NA | NA | NA | NA | 4 | 9.4 | NA | NA |
| CPSF1 | 2 | 1.8 | 2 | 2.4 | 1 | 1.2 | 2 | 1.8 | NA | NA |
| dCas9 | 1677 | 0 | 166 | 0 | 145 | 0 | 1677 | 0 | 1217 | 0 |
| DDX1 | 2 | 4.1 | NA | NA | NA | NA | 2 | 4.1 | 1 | 1.5 |
| DDX18 | 4 | 6 | NA | NA | NA | NA | 4 | 6 | NA | NA |
| DDX23 | 6 | 5.4 | 3 | 3.8 | 2 | 2.3 | 6 | 5.4 | 2 | 1.5 |
| DDX27 | 12 | 10.8 | 5 | 7 | 6 | 8.5 | 12 | 10.8 | 2 | 2.9 |
| DDX39B | 13 | 18 | 12 | 18.9 | 13 | 23.8 | 13 | 18 | NA | NA |
| DDX3X | 1 | 1.9 | 2 | 3.4 | NA | NA | 1 | 1.9 | 5 | 6 |
| DDX42 | 2 | 2.8 | NA | NA | NA | NA | 2 | 2.8 | NA | NA |
| DDX46 | 7 | 6.9 | NA | NA | NA | NA | 7 | 6.9 | NA | NA |
| DDX47 | 1 | 4.4 | 1 | 3 | 1 | 3 | 1 | 4.4 | NA | NA |
| DDX5 | 12 | 14.4 | 6 | 9.7 | 6 | 12.5 | 12 | 14.4 | 11 | 9 |
| DDX50 | 3 | 4.9 | 4 | 6 | 4 | 3 | 3 | 4.9 | NA | NA |
| DDX54 | 4 | 5.6 | NA | NA | NA | NA | 4 | 5.6 | NA | NA |
| DHX15 | 17 | 15.1 | 4 | 5.4 | 6 | 5.4 | 17 | 15.1 | 3 | 2.5 |
| DHX9 | 18 | 11.4 | 29 | 20.3 | 21 | 13.9 | 18 | 11.4 | 8 | 6.1 |
| DIDO1 | 3 | 1 | NA | NA | NA | NA | 3 | 1 | NA | NA |
| DKC1 | 6 | 9.1 | NA | NA | NA | NA | 6 | 9.1 | 1 | 1.9 |
| DNAJC2 | 1 | 1.4 | NA | NA | NA | NA | 1 | 1.4 | NA | NA |
| DNTTIP2 | 3 | 5.3 | 1 | 1.7 | NA | NA | 3 | 5.3 | NA | NA |
| EBNA1BP2 | 5 | 10.5 | 2 | 5.6 | 1 | 2.3 | 5 | 10.5 | 2 | 5.6 |
| EEF1A1 | 19 | 15.8 | 4 | 6.7 | 3 | 6.7 | 19 | 15.8 | 3 | 2.4 |
| EFTUD2 | 5 | 5.8 | 9 | 12.9 | 8 | 11 | 5 | 5.8 | NA | NA |
| EIF4A3 | 13 | 21.2 | 4 | 9.2 | 2 | 6.1 | 13 | 21.2 | 2 | 3.9 |
| EIF6 | NA | NA | 2 | 10.6 | NA | NA | NA | NA | NA | NA |
| ELAVL1 | 2 | 6.1 | 4 | 12.9 | 6 | 12.9 | 2 | 6.1 | 1 | 3.4 |
| FKBP5 | 2 | 7.5 | NA | NA | NA | NA | 2 | 7.5 | NA | NA |
| FTSJ3 | 8 | 11.9 | 3 | 4 | 4 | 3.8 | 8 | 11.9 | 6 | 9.3 |
| FUBP1 | 1 | 2 | NA | NA | NA | NA | 1 | 2 | NA | NA |
| FUS | NA | NA | 1 | 3 | NA | NA | NA | NA | NA | NA |
| G3BP1 | NA | NA | NA | NA | NA | NA | NA | NA | 7 | 7.9 |
| GAR1 | NA | NA | 2 | 13.6 | NA | NA | NA | NA | NA | NA |
| GNL3 | 6 | 6.9 | 5 | 9.1 | NA | NA | 6 | 6.9 | 1 | 2 |
| GSDMA | 4 | 12.6 | NA | NA | NA | NA | 4 | 12.6 | NA | NA |
| H1F0 | 1 | 5.6 | NA | NA | NA | NA | 1 | 5.6 | NA | NA |
| H1FX | 5 | 10.3 | 2 | 4.7 | 1 | 4.7 | 5 | 10.3 | NA | NA |
| H2AFV | NA | NA | 2 | 8.8 | 2 | 8.8 | NA | NA | 3 | 8.8 |
| H2AFY | 4 | 18 | 16 | 32.5 | 12 | 27.9 | 4 | 18 | 3 | 11.4 |
| H2AFY2 | 1 | 3.2 | NA | NA | NA | NA | 1 | 3.2 | NA | NA |
| H2AFZ | 3 | 18.8 | NA | NA | NA | NA | 3 | 18.8 | NA | NA |
| H3F3B | 5 | 7.6 | 6 | 12 | 6 | 19.6 | 5 | 7.6 | 7 | 29.3 |
| HDAC2 | 3 | 6.8 | 1 | 2 | NA | NA | 3 | 6.8 | 1 | 4.1 |
| HIST1H1B | 22 | 15 | 13 | 15 | 12 | 15 | 22 | 15 | 22 | 15 |
| HIST1H1C | 22 | 16 | 14 | 16 | 12 | 16 | 22 | 16 | 27 | 17.8 |
| HIST1H2AA | 7 | 17.6 | NA | NA | NA | NA | 7 | 17.6 | NA | NA |
| HIST1H2AB | NA | NA | 2 | 8.5 | 3 | 8.5 | NA | NA | 1 | 8.5 |
| HIST1H2AH | 19 | 14.8 | 4 | 8.6 | 4 | 8.6 | 19 | 14.8 | 4 | 8.6 |
| HIST1H2BJ | 4 | 7.9 | 5 | 7.9 | 6 | 7.9 | 4 | 7.9 | 5 | 7.9 |
| HIST1H2BK | 3 | 7.9 | 2 | 7.9 | 2 | 7.9 | 3 | 7.9 | 3 | 7.9 |
| HIST1H4A | 32 | 51.5 | 32 | 53.4 | 37 | 53.4 | 32 | 51.5 | 54 | 51.5 |
| HMGA2 | 2 | 26.7 | NA | NA | NA | NA | 2 | 26.7 | NA | NA |
| HNRNPA0 | 2 | 5.2 | 4 | 11.8 | 4 | 17.4 | 2 | 5.2 | 1 | 5.2 |
| HNRNPA1 | 20 | 30.3 | 18 | 40.4 | 19 | 35.6 | 20 | 30.3 | 17 | 29.2 |
| HNRNPDL | 2 | 6.6 | 2 | 9.8 | 3 | 9.8 | 2 | 6.6 | 1 | 3.3 |
| HNRNPF | 4 | 4.1 | 4 | 8 | 2 | 8 | 4 | 4.1 | NA | NA |
| HNRNPL | 6 | 13.6 | 8 | 14.7 | 14 | 23 | 6 | 13.6 | NA | NA |
| HNRNPM | 13 | 14.8 | 12 | 13.2 | 10 | 12.7 | 13 | 14.8 | 9 | 11.9 |
| HNRNPUL2 | NA | NA | 19 | 14.9 | 17 | 15.5 | NA | NA | NA | NA |
| HP1BP3 | NA | NA | 7 | 20.6 | 10 | 20.6 | NA | NA | 4 | 11.9 |
| HSPB1 | 2 | 9.8 | NA | NA | NA | NA | 2 | 9.8 | NA | NA |
| IFI16 | 15 | 20.5 | NA | NA | NA | NA | 15 | 20.5 | 8 | 10.4 |
| IK | 3 | 3.2 | NA | NA | NA | NA | 3 | 3.2 | NA | NA |
| ILF2 | 8 | 24.1 | 19 | 30.8 | 19 | 21 | 8 | 24.1 | 1 | 2.6 |
| ILF3 | 12 | 12.2 | 21 | 17.8 | 20 | 17.1 | 12 | 12.2 | 6 | 5.5 |
| IMP3 | NA | NA | 1 | 8.2 | 1 | 8.2 | NA | NA | NA | NA |
| ISY1 | 1 | 4.9 | NA | NA | NA | NA | 1 | 4.9 | NA | NA |
| IWS1 | 6 | 5.5 | NA | NA | NA | NA | 6 | 5.5 | NA | NA |
| KHSRP | 4 | 5.3 | 2 | 3.2 | 2 | 3 | 4 | 5.3 | NA | NA |
| KRR1 | NA | NA | 1 | 2.8 | NA | NA | NA | NA | NA | NA |
| KRT14 | 44 | 26.1 | 12 | 21.8 | 11 | 17.8 | 44 | 26.1 | 66 | 28.4 |
| LARP7 | 3 | 7.2 | NA | NA | NA | NA | 3 | 7.2 | NA | NA |
| LGALS7 | 3 | 18.4 | NA | NA | NA | NA | 3 | 18.4 | 3 | 8.1 |
| LMNA | 113 | 49.5 | 89 | 52.1 | 96 | 55 | 113 | 49.5 | 69 | 43.7 |
| LMNB1 | 16 | 25.1 | 26 | 33.6 | 24 | 33.8 | 16 | 25.1 | NA | NA |
| LMNB2 | 8 | 11.5 | 17 | 25.8 | 26 | 34 | 8 | 11.5 | 3 | 6.2 |
| LRRC59 | 5 | 7.2 | 10 | 30.6 | 4 | 10.4 | 5 | 7.2 | 3 | 10.7 |

| | | | | | | | | | | |
|---|---|---|---|---|---|---|---|---|---|---|
| LYAR | 2 | 3.7 | NA | NA | NA | NA | 2 | 3.7 | NA | NA |
| MATR3 | 12 | 9.4 | 19 | 14.3 | 20 | 15.3 | 12 | 9.4 | 4 | 5.2 |
| MCM3 | 1 | 1.1 | NA | NA | NA | NA | 1 | 1.1 | NA | NA |
| MCM5 | 1 | 2.2 | NA | NA | NA | NA | 1 | 2.2 | NA | NA |
| MCM7 | 1 | 1.7 | NA | NA | NA | NA | 1 | 1.7 | NA | NA |
| MLLT1 | 1 | 2 | NA | NA | NA | NA | 1 | 2 | NA | NA |
| MRE11A | 3 | 4.3 | 2 | 4 | 2 | 4 | 3 | 4.3 | NA | NA |
| MSH6 | 1 | 1.5 | NA | NA | NA | NA | 1 | 1.5 | NA | NA |
| MTA2 | 2 | 3 | NA | NA | 1 | 2.2 | 2 | 3 | 1 | 1.5 |
| MTDH | 2 | 6.9 | 3 | 7 | 4 | 10.1 | 2 | 6.9 | 7 | 5 |
| MYBBP1A | 5 | 4 | 8 | 5 | NA | NA | 5 | 4 | NA | NA |
| MYCBP2 | 1 | 0.5 | NA | NA | NA | NA | 1 | 0.5 | NA | NA |
| MYO1C | 1 | 1.2 | 16 | 17 | 22 | 16.8 | 1 | 1.2 | NA | NA |
| NAT10 | 4 | 4.7 | 9 | 7.9 | 3 | 2.3 | 4 | 4.7 | 1 | 1.6 |
| NCBP1 | 1 | 1.4 | NA | NA | NA | NA | 1 | 1.4 | NA | NA |
| NCL | 76 | 29.4 | 14 | 18.3 | 4 | 6.1 | 76 | 29.4 | 40 | 20.7 |
| NCOR2 | 5 | 2.7 | NA | NA | NA | NA | 5 | 2.7 | NA | NA |
| NF2 | 1 | 6.8 | NA | NA | NA | NA | 1 | 6.8 | NA | NA |
| NFIC | 5 | 13.1 | NA | NA | NA | NA | 5 | 13.1 | NA | NA |
| NOC2L | 1 | 1.6 | NA | NA | 1 | 1.3 | 1 | 1.6 | NA | NA |
| NOC4L | 1 | 5 | NA | NA | NA | NA | 1 | 5 | NA | NA |
| NOLC1 | 8 | 7.7 | NA | NA | NA | NA | 8 | 7.7 | NA | NA |
| NOP56 | 21 | 24.4 | 7 | 16.3 | 5 | 8.1 | 21 | 24.4 | 5 | 3.7 |
| NOP58 | 10 | 13.6 | 2 | 5.1 | NA | NA | 10 | 13.6 | 5 | 12.9 |
| NSA2 | 1 | 5 | NA | NA | NA | NA | 1 | 5 | NA | NA |
| NUDT21 | 4 | 18.5 | NA | NA | NA | NA | 4 | 18.5 | NA | NA |
| NXF2 | 1 | 3.5 | NA | NA | NA | NA | 1 | 3.5 | NA | NA |
| PABPC1 | NA | NA | 3 | 8.8 | NA | NA | NA | NA | 12 | 11.7 |
| PAF1 | 5 | 10.1 | NA | NA | NA | NA | 5 | 10.1 | NA | NA |
| PAPD5 | 1 | 1.9 | NA | NA | NA | NA | 1 | 1.9 | NA | NA |
| PARP1 | 21 | 13.5 | 3 | 3.8 | 2 | 2.8 | 21 | 13.5 | 5 | 5.1 |
| PBRM1 | 1 | 1.1 | NA | NA | NA | NA | 1 | 1.1 | NA | NA |
| PCBP1 | 1 | 3.7 | 1 | 3.7 | 1 | 3.7 | 1 | 3.7 | NA | NA |
| PDCD11 | 3 | 1.6 | 2 | 1.5 | 3 | 1.8 | 3 | 1.6 | NA | NA |
| PDS5B | 2 | 11.2 | NA | NA | NA | NA | 2 | 11.2 | NA | NA |
| PES1 | 4 | 6.5 | NA | NA | 3 | 3.2 | 4 | 6.5 | 3 | 4.7 |
| PHAX | 1 | 2 | NA | NA | NA | NA | 1 | 2 | NA | NA |
| PHF8 | 1 | 1.6 | NA | NA | NA | NA | 1 | 1.6 | NA | NA |
| PKP1 | 7 | 8.3 | NA | NA | NA | NA | 7 | 8.3 | 10 | 11.8 |
| PNISR | 1 | 1.4 | NA | NA | NA | NA | 1 | 1.4 | NA | NA |
| PNN | 11 | 14.6 | NA | NA | NA | NA | 11 | 14.6 | 5 | 6.8 |
| PPIL4 | 1 | 2.8 | NA | NA | NA | NA | 1 | 2.8 | NA | NA |
| PRKDC | 77 | 11.3 | NA | NA | NA | NA | 77 | 11.3 | NA | NA |
| PRPF19 | 3 | 8.9 | 5 | 11.5 | 3 | 5 | 3 | 8.9 | NA | NA |
| PRPF38A | 2 | 3.8 | NA | NA | 1 | 2.6 | 2 | 3.8 | 1 | 3.8 |
| PRPF38B | 1 | 6.3 | NA | NA | NA | NA | 1 | 6.3 | NA | NA |
| PRPF4 | NA | NA | 2 | 5 | 4 | 6.9 | NA | NA | NA | NA |
| PRPF40A | 10 | 8.3 | 3 | 3.1 | 1 | 1.4 | 10 | 8.3 | 4 | 4.7 |
| PRPF6 | 3 | 3.4 | 6 | 6.2 | 8 | 8.9 | 3 | 3.4 | NA | NA |
| PRPF8 | 22 | 7.4 | 17 | 6 | 17 | 6 | 22 | 4.7 | 4 | 1.5 |
| PSMA5 | 1 | 5.4 | NA | NA | NA | NA | 1 | 5.4 | NA | NA |
| PSMA6 | 1 | 12.1 | 1 | 12.1 | 2 | 20.6 | 1 | 12.1 | 2 | 12.1 |
| PSMA7 | NA | NA | 4 | 22.5 | 1 | 6.2 | NA | NA | 5 | 22.5 |
| PSMB1 | 2 | 5.8 | NA | NA | NA | NA | 2 | 5.8 | NA | NA |
| PSMB4 | 1 | 3.8 | NA | NA | NA | NA | 1 | 3.8 | 2 | 9.5 |
| PSMB6 | 2 | 4.6 | 1 | 4.6 | 1 | 4.6 | 2 | 4.6 | 2 | 4.6 |
| PSPC1 | 2 | 6.4 | 2 | 9.9 | 1 | 2.8 | 2 | 6.4 | NA | NA |
| PTBP1 | 18 | 18.5 | 15 | 16.2 | NA | NA | 18 | 18.5 | NA | NA |
| PTRF | 1 | 2.3 | 7 | 9.7 | 8 | 7.4 | 1 | 2.3 | 9 | 15.9 |
| PURB | NA | NA | NA | NA | NA | NA | NA | NA | 1 | 4.2 |
| PWP2 | 1 | 2.1 | 2 | 2.9 | 1 | 1.7 | 1 | 2.1 | NA | NA |
| RAD21 | 2 | 2.1 | 2 | 4.1 | 2 | 4.1 | 2 | 2.1 | NA | NA |
| RAD50 | 6 | 4.5 | 3 | 2.4 | NA | NA | 6 | 4.5 | NA | NA |
| RBBP4 | 6 | 9 | NA | NA | NA | NA | 6 | 9 | NA | NA |
| RBBP6 | 2 | 1.7 | NA | NA | NA | NA | 2 | 1.7 | NA | NA |
| RBM10 | 4 | 3.5 | NA | NA | NA | NA | 4 | 3.5 | NA | NA |
| RBM15 | 3 | 4.1 | NA | NA | NA | NA | 3 | 4.1 | NA | NA |
| RBM19 | 1 | 1.7 | NA | NA | NA | NA | 1 | 1.7 | NA | NA |
| RBM25 | 10 | 9.4 | NA | NA | NA | NA | 10 | 9.4 | 3 | 5.3 |
| RBM28 | 4 | 7.4 | NA | NA | NA | NA | 4 | 7.4 | 1 | 1.9 |
| RBM8A | 5 | 22 | 1 | 6.4 | 1 | 6.4 | 5 | 22 | 1 | 11 |
| RECQL | 6 | 5.5 | 1 | 1.7 | NA | NA | 6 | 5.5 | NA | NA |
| RFC1 | 3 | 2.6 | NA | NA | NA | NA | 3 | 2.6 | NA | NA |
| RFC2 | 1 | 5.3 | NA | NA | NA | NA | 1 | 5.3 | NA | NA |
| RNF40 | 2 | 3.2 | NA | NA | NA | NA | 2 | 3.2 | NA | NA |
| RPL11 | 3 | 13 | 2 | 13 | 2 | 13 | 3 | 13 | 9 | 13 |
| RPL3 | 2 | 5.2 | NA | NA | NA | NA | 2 | 5.2 | NA | NA |
| RPL5 | NA | NA | NA | NA | NA | NA | NA | NA | 3 | 9.4 |
| RPS10 | NA | NA | 1 | 5.5 | 1 | 5.5 | NA | NA | 2 | 9.1 |

-continued

| | | | | | | | | | |
|---|---|---|---|---|---|---|---|---|---|
| RPS19 | 3 | 15.2 | NA | NA | NA | NA | 3 | 15.2 | 5 | 25.5 |
| RPS3 | NA | NA | NA | NA | 5 | 19.3 | NA | NA | NA | NA |
| RRP1 | 5 | 11.3 | 1 | 2.8 | 1 | 2.8 | 5 | 11.3 | 4 | 7.4 |
| RRP1B | 4 | 5.9 | 1 | 2.6 | 1 | 2.6 | 4 | 5.9 | NA | NA |
| RRP9 | 2 | 5.9 | NA | NA | NA | NA | 2 | 5.9 | NA | NA |
| RRS1 | 5 | 8.2 | 8 | 12.1 | 2 | 7.7 | 5 | 8.2 | NA | NA |
| RUVBL1 | NA | NA | 6 | 18.7 | 9 | 16 | NA | NA | NA | NA |
| S100P | NA | NA | NA | NA | NA | NA | NA | NA | 1 | 13.7 |
| SART1 | 11 | 15.1 | 2 | 3.8 | 2 | 3.9 | 11 | 15.1 | 2 | 4 |
| SCAF1 | 3 | 3.7 | NA | NA | NA | NA | 3 | 3.7 | NA | NA |
| SERBP1 | 4 | 7 | 4 | 7 | 2 | 8.8 | 4 | 7 | 6 | 11.6 |
| SET | 6 | 13.2 | 1 | 3.8 | NA | NA | 6 | 13.2 | NA | NA |
| SF3A1 | 5 | 7.7 | 8 | 9 | 9 | 10.8 | 5 | 7.7 | NA | NA |
| SF3B1 | 3 | 3.6 | 9 | 8.7 | 8 | 8.2 | 3 | 3.6 | NA | NA |
| SF3B3 | 9 | 5.1 | 6 | 5.8 | 4 | 3.4 | 9 | 5.1 | NA | NA |
| SFN | NA | NA | NA | NA | NA | NA | NA | NA | 2 | 11.6 |
| SMC1A | NA | NA | NA | NA | 3 | 2.4 | NA | NA | NA | NA |
| SMC3 | 9 | 7.2 | 3 | 3.7 | 5 | 5.7 | 9 | 7.2 | 4 | 4.7 |
| SMCHD1 | 2 | 3.1 | 1 | 1.3 | 2 | 2.9 | 2 | 3.1 | NA | NA |
| SMU1 | 4 | 7.4 | 1 | 3.7 | NA | NA | 4 | 7.4 | NA | NA |
| SND1 | NA | NA | NA | NA | NA | NA | NA | NA | 2 | 2.1 |
| SNRNP200 | 35 | 11.4 | 18 | 8.6 | 13 | 5.6 | 35 | 11.4 | 4 | 1.6 |
| SNRNP40 | NA | NA | 2 | 11.8 | 1 | 3.4 | NA | NA | NA | NA |
| SNRPA1 | 3 | 14.1 | 4 | 15.7 | NA | NA | 3 | 14.1 | NA | NA |
| SNRPD3 | 3 | 15.8 | 2 | 8.3 | 3 | 15.8 | 3 | 15.8 | 1 | 8.3 |
| SP100 | 12 | 13.3 | NA | NA | NA | NA | 12 | 13.3 | 4 | 10.1 |
| SPATS2L | NA | NA | NA | NA | NA | NA | NA | NA | 4 | 7 |
| SPIN1 | 1 | 3.8 | NA | NA | NA | NA | 1 | 3.8 | NA | NA |
| SREK1 | 5 | 3.1 | NA | NA | NA | NA | 5 | 3.1 | NA | NA |
| SRRM2 | 36 | 9.7 | 2 | 1 | 3 | 1.6 | 36 | 9.7 | 13 | 5.7 |
| SRRT | 16 | 11.3 | NA | NA | NA | NA | 16 | 11.3 | NA | NA |
| SRSF1 | 31 | 32.3 | 4 | 23.4 | 3 | 17.9 | 31 | 32.3 | 9 | 14.9 |
| SRSF10 | 1 | 6.7 | NA | NA | NA | NA | 1 | 6.7 | NA | NA |
| SRSF3 | 5 | 13.7 | 1 | 16.9 | 1 | 7.3 | 5 | 13.7 | 3 | 7.3 |
| SRSF4 | 4 | 7.9 | NA | NA | NA | NA | 4 | 7.9 | 2 | 5.7 |
| SRSF6 | 1 | 2.7 | NA | NA | NA | NA | 1 | 2.7 | NA | NA |
| SRSF7 | 9 | 22.7 | 4 | 31.8 | 1 | 6.8 | 9 | 22.7 | 4 | 22.7 |
| SSB | 11 | 9.6 | NA | NA | NA | NA | 11 | 9.6 | NA | NA |
| SSRP1 | 16 | 13.8 | NA | NA | NA | NA | 16 | 13.8 | NA | NA |
| SUMO2 | 4 | 31 | NA | NA | 1 | 16.9 | 4 | 31 | 3 | 16.9 |
| SUPT16H | 33 | 18 | NA | NA | NA | NA | 33 | 18 | 3 | 3.4 |
| SURF6 | 1 | 3 | NA | NA | NA | NA | 1 | 3 | NA | NA |
| TADA2B | 6 | 2.1 | 2 | 2.1 | NA | NA | 6 | 2.1 | 7 | 2.1 |
| TCEB3 | 2 | 2 | NA | NA | NA | NA | 2 | 2 | NA | NA |
| THRAP3 | 44 | 23.8 | 6 | 6.9 | 4 | 3.8 | 44 | 23.8 | 18 | 15.5 |
| TOP1 | 29 | 16.7 | 3 | 4.6 | 4 | 3.4 | 29 | 16.7 | 10 | 5.9 |
| TOP2A | 10 | 3.7 | 3 | 2.1 | 2 | 1.3 | 10 | 3.7 | 1 | 0.6 |
| TOP2B | 6 | 2.7 | 5 | 3.5 | 6 | 4.1 | 6 | 2.7 | NA | NA |
| TPR | 32 | 10.5 | 22 | 11 | 24 | 11.1 | 32 | 10.5 | 2 | 1.6 |
| TRA2A | 3 | 12.4 | NA | NA | NA | NA | 3 | 12.4 | 2 | 12.4 |
| TRA2B | 4 | 22.9 | NA | NA | NA | NA | 4 | 22.9 | 3 | 13.8 |
| TSPYL1 | 1 | 3.9 | NA | NA | NA | NA | 1 | 3.9 | NA | NA |
| TXN | 7 | 38.8 | NA | NA | NA | NA | 7 | 38.8 | 4 | 36.5 |
| U2AF1 | 5 | 8.8 | NA | NA | NA | NA | 5 | 8.8 | 2 | 5.4 |
| U2SURP | 5 | 6.5 | NA | NA | NA | NA | 5 | 6.5 | NA | NA |
| UBTF | 9 | 9.5 | 2 | 1.7 | 1 | 1.7 | 9 | 9.5 | 2 | 2.6 |
| UHRF1 | 3 | 2.1 | 1 | 1.9 | 1 | 1.9 | 3 | 2.1 | NA | NA |
| UTP18 | 2 | 5.2 | 1 | 2.3 | 3 | 5.6 | 2 | 5.2 | NA | NA |
| UTP3 | 1 | 1.9 | 1 | 2.7 | NA | NA | 1 | 1.9 | 1 | 1.9 |
| VCP | 4 | 5.1 | 11 | 10 | 3 | 4.8 | 4 | 5.1 | NA | NA |
| WDR12 | NA | NA | NA | NA | NA | NA | NA | NA | NA | NA |
| WDR36 | 1 | 1.3 | 1 | 1.6 | NA | NA | 1 | 1.3 | 1 | 1.3 |
| WDR43 | 1 | 1.6 | NA | NA | NA | NA | 1 | 1.6 | 1 | 1.6 |
| XRCC5 | 5 | 7.5 | 1 | 1.6 | 1 | 1.6 | 5 | 7.5 | NA | NA |
| XRN2 | 1 | 1.4 | 1 | 1.4 | 1 | 1.4 | 1 | 1.4 | NA | NA |
| YBX1 | 7 | 23.5 | 3 | 11.1 | 3 | 13 | 7 | 23.5 | 17 | 28.4 |
| YTHDC1 | 3 | 3.5 | NA | NA | NA | NA | 3 | 3.5 | NA | NA |
| ZC3H18 | 8 | 7.5 | NA | NA | NA | NA | 8 | 7.5 | NA | NA |
| ZC3HAV1 | NA | NA | NA | NA | NA | NA | NA | NA | 1 | 2.4 |
| ZCCHC17 | 1 | 6.5 | NA | NA | NA | NA | 1 | 6.5 | NA | NA |
| ZFP91 | 3 | 7 | NA | NA | NA | NA | 3 | 7 | 4 | 7 |
| ZIC4 | 2 | 6.3 | NA | NA | NA | NA | 2 | 6.3 | NA | NA |
| ZRANB2 | 2 | 8.1 | NA | NA | NA | NA | 2 | 8.1 | NA | NA |

-continued

| | SAMPLE [a] | | | | | | | |
|---|---|---|---|---|---|---|---|---|
| | gD4Z4-1[+3] | | gD4Z4-3[+1] | | gMYOD1 | | gMYOD1[+] | |
| GENE NAME | Pseudoquant | Percent coverage | Pseudoquant | Percent coverage | Pseudoquant | Percent coverage | Pseudoquant | Percent coverage |
| AATF | NA | NA | 1 | 2.5 | NA | NA | NA | NA |
| ACTN4 | NA | NA | NA | NA | NA | NA | NA | NA |
| ADAR | NA | NA | 2 | 3.5 | NA | NA | 2 | 3.5 |
| AFF4 | NA | NA | NA | NA | NA | NA | NA | NA |
| AHNAK | 92 | 13 | 53 | 8.4 | NA | NA | 56 | 7.3 |
| ALYREF | 4 | 7 | 6 | 33.1 | NA | NA | 1 | 7 |
| ANXA1 | 2 | 7.8 | 2 | 8.4 | NA | NA | NA | NA |
| API5 | NA | NA | 1 | 3 | NA | NA | NA | NA |
| ARGLU1 | 1 | 2.6 | 2 | 5.5 | NA | NA | 2 | 5.5 |
| BCLAF1 | 11 | 10.7 | 14 | 11.4 | NA | NA | 15 | 11.1 |
| BMS1 | 1 | 0.7 | 2 | 1.6 | NA | NA | NA | NA |
| BOP1 | 1 | 1.7 | 4 | 9.3 | NA | NA | 2 | 3.9 |
| BRD3 | NA | NA | NA | NA | NA | NA | NA | NA |
| BRD4 | NA | NA | NA | NA | NA | NA | NA | NA |
| BRIX1 | NA | NA | 4 | 7.9 | NA | NA | 3 | 8.8 |
| CACTIN | NA | NA | NA | NA | NA | NA | NA | NA |
| CASP14 | 5 | 17.4 | 8 | 21.9 | 2 | 9.5 | 10 | 22.7 |
| CBX3 | NA | NA | NA | NA | NA | NA | NA | NA |
| CBX5 | 1 | 5.8 | 1 | 5.8 | NA | NA | 1 | 5.8 |
| CCAR2 | NA | NA | 2 | 2.6 | NA | NA | NA | NA |
| CD3EAP | NA | NA | 3 | 11 | NA | NA | 6 | 12.7 |
| CDC5L | 2 | 1.5 | 8 | 16.3 | NA | NA | 3 | 5 |
| CDC73 | NA | NA | NA | NA | NA | NA | NA | NA |
| CDK11A | 1 | 2.8 | 1 | 2.8 | NA | NA | 1 | 2.8 |
| CDK11B | NA | NA | NA | NA | NA | NA | NA | NA |
| CEBPZ | 1 | 1.2 | 1 | 0.9 | NA | NA | NA | NA |
| CENPB | NA | NA | 1 | 2 | NA | NA | NA | NA |
| CHAMP1 | NA | NA | NA | NA | NA | NA | NA | NA |
| CHD2 | NA | NA | 1 | 0.5 | NA | NA | NA | NA |
| CHD4 | 5 | 1.9 | NA | NA | NA | NA | NA | NA |
| CHERP | NA | NA | NA | NA | NA | NA | NA | NA |
| CKAP4 | 38 | 25.4 | 48 | 39.4 | 6 | 9.1 | 36 | 32.9 |
| COIL | 2 | 4.3 | NA | NA | NA | NA | NA | NA |
| CPSF1 | NA | NA | 1 | 1.2 | NA | NA | NA | NA |
| dCas9 | 1313 | 0 | 1264 | 0 | 153 | 0 | 1383 | 0 |
| DDX1 | 1 | 1.5 | 1 | 1.5 | NA | NA | 1 | 1.5 |
| DDX18 | 2 | 3.9 | 9 | 9.4 | NA | NA | 3 | 3.9 |
| DDX23 | 5 | 6 | 5 | 4.9 | NA | NA | 2 | 2.9 |
| DDX27 | 9 | 8.8 | 20 | 14.4 | 2 | 2.5 | 7 | 7.5 |
| DDX39B | NA | NA | NA | NA | NA | NA | NA | NA |
| DDX3X | 4 | 7.7 | 5 | 6.5 | NA | NA | 10 | 11.1 |
| DDX42 | NA | NA | NA | NA | NA | NA | NA | NA |
| DDX46 | 2 | 2.1 | 4 | 4.2 | NA | NA | NA | NA |
| DDX47 | NA | NA | 1 | 3.2 | NA | NA | NA | NA |
| DDX5 | 8 | 8 | 6 | 8.6 | 3 | 5.2 | 11 | 11.2 |
| DDX50 | 1 | 3.4 | 6 | 7.7 | NA | NA | 6 | 6.4 |
| DDX54 | 2 | 3.5 | 5 | 4.8 | NA | NA | 2 | 2.2 |
| DHX15 | 5 | 5.2 | 17 | 18.1 | NA | NA | 12 | 9.6 |
| DHX9 | 18 | 9.9 | 29 | 15.9 | 3 | 2.4 | 13 | 8.4 |
| DIDO1 | NA | NA | NA | NA | NA | NA | NA | NA |
| DKC1 | 2 | 5.6 | 6 | 9.7 | NA | NA | 3 | 7.6 |
| DNAJC2 | NA | NA | NA | NA | NA | NA | NA | NA |
| DNTTIP2 | NA | NA | NA | NA | NA | NA | NA | NA |
| EBNA1BP2 | 4 | 12.7 | 7 | 19.9 | 1 | 2.3 | 3 | 13.7 |
| EEF1A1 | 4 | 4.1 | 5 | 9.3 | 2 | 4.1 | 7 | 9.3 |
| EFTUD2 | 1 | 1.4 | 8 | 10.2 | NA | NA | 7 | 7.7 |
| EIF4A3 | 1 | 3.2 | 10 | 20.9 | NA | NA | 10 | 14.6 |
| EIF6 | NA | NA | 3 | 10.6 | NA | NA | 2 | 10.6 |
| ELAVL1 | 3 | 5.5 | 5 | 18.7 | NA | NA | 5 | 14.4 |
| FKBP5 | NA | NA | NA | NA | NA | NA | NA | NA |
| FTSJ3 | 10 | 14 | 17 | 20.8 | 1 | 0.9 | 11 | 15.3 |
| FUBP1 | NA | NA | NA | NA | NA | NA | NA | NA |
| FUS | 6 | 12.8 | 11 | 17.3 | NA | NA | 8 | 13.1 |
| G3BP1 | 12 | 11.6 | 10 | 14.4 | NA | NA | 7 | 14.4 |
| GAR1 | 1 | 4.5 | 2 | 4.5 | NA | NA | 1 | 4.5 |
| GNL3 | 3 | 3.5 | 11 | 14.2 | NA | NA | 8 | 10.8 |
| GSDMA | 1 | 5.8 | NA | NA | NA | NA | NA | NA |
| H1F0 | 1 | 5.6 | 1 | 5.6 | NA | NA | 1 | 5.6 |
| H1FX | NA | NA | 3 | 10.3 | 1 | 4.7 | 4 | 10.3 |
| H2AFV | 3 | 8.8 | 2 | 8.8 | 8 | 22.8 | 2 | 8.8 |
| H2AFY | 1 | 3 | 8 | 23 | NA | NA | 9 | 21.1 |
| H2AFY2 | 2 | 3.2 | 1 | 3.2 | NA | NA | 1 | 3.2 |

-continued

| | | | | | | | |
|---|---|---|---|---|---|---|---|
| H2AFZ | NA | NA | NA | NA | NA | NA | NA | NA |
| H3F3B | 4 | 7.6 | 5 | 17.4 | 1 | 7.6 | 5 | 17.4 |
| HDAC2 | 3 | 6.8 | 4 | 6.8 | NA | NA | 3 | 6.8 |
| HIST1H1B | 24 | 15 | 22 | 14.6 | 6 | 14.6 | 25 | 15 |
| HIST1H1C | 26 | 16 | 23 | 16 | 10 | 15.5 | 23 | 16 |
| HIST1H2AA | 8 | 22.9 | 8 | 17.6 | NA | NA | 8 | 17.6 |
| HIST1H2AB | 1 | 8.5 | NA | NA | NA | NA | NA | NA |
| HIST1H2AH | 2 | 8.6 | 14 | 23.4 | NA | NA | 14 | 14.8 |
| HIST1H2BJ | 4 | 7.9 | 5 | 7.9 | 2 | 15.1 | 5 | 7.9 |
| HIST1H2BK | 3 | 7.9 | 3 | 7.9 | NA | NA | 3 | 7.9 |
| HIST1H4A | 57 | 51.5 | 30 | 51.5 | 12 | 50.5 | 30 | 51.5 |
| HMGA2 | NA | NA | 1 | 26.7 | NA | NA | 5 | 41.9 |
| HNRNPA0 | 2 | 5.2 | 5 | 11.8 | NA | NA | 5 | 11.8 |
| HNRNPA1 | 35 | 34.5 | 15 | 30.3 | NA | NA | 18 | 30.3 |
| HNRNPDL | 3 | 9.8 | 3 | 14.8 | NA | NA | 3 | 9.8 |
| HNRNPF | NA | NA | 4 | 8 | NA | NA | 3 | 4.1 |
| HNRNPL | 7 | 13.6 | 7 | 10.5 | NA | NA | 5 | 10.5 |
| HNRNPM | 12 | 9.6 | 22 | 21.7 | 2 | 2.7 | 20 | 21.7 |
| HNRNPUL2 | 3 | 4.3 | NA | NA | NA | NA | NA | NA |
| HP1BP3 | NA | NA | 10 | 23.7 | NA | NA | NA | NA |
| HSPB1 | NA | NA | NA | NA | NA | NA | NA | NA |
| IFI16 | 9 | 12.5 | 11 | 15.2 | NA | NA | 12 | 14.4 |
| IK | NA | NA | 2 | 3.1 | NA | NA | NA | NA |
| ILF2 | 2 | 2.6 | 15 | 34.9 | 1 | 2.6 | 9 | 16.7 |
| ILF3 | 8 | 9.1 | 18 | 15.1 | 1 | 1.4 | 13 | 12.2 |
| IMP3 | NA | NA | 1 | 8.2 | NA | NA | NA | NA |
| ISY1 | NA | NA | NA | NA | NA | NA | NA | NA |
| IWS1 | 2 | 2.8 | 1 | 2.8 | NA | NA | 1 | 2.8 |
| KHSRP | NA | NA | 5 | 4.3 | NA | NA | NA | NA |
| KRR1 | NA | NA | 1 | 4.3 | NA | NA | 1 | 4.3 |
| KRT14 | 78 | 28.4 | 52 | 23.7 | 8 | 9.7 | 62 | 28.4 |
| LARP7 | NA | NA | NA | NA | NA | NA | NA | NA |
| LGALS7 | 1 | 8.1 | 4 | 30.1 | NA | NA | 4 | 30.1 |
| LMNA | 96 | 49.5 | 113 | 48.5 | 25 | 33.4 | 108 | 49.5 |
| LMNB1 | NA | NA | NA | NA | NA | NA | 11 | 14.8 |
| LMNB2 | 4 | 6.3 | 5 | 10.7 | 2 | 1.7 | 8 | 12.3 |
| LRRC59 | 5 | 3.9 | 6 | 11.4 | 1 | 3.3 | 8 | 11.4 |
| LYAR | NA | NA | 1 | 2.9 | NA | NA | 1 | 3.7 |
| MATR3 | NA | NA | 8 | 7.1 | NA | NA | 9 | 9 |
| MCM3 | NA | NA | NA | NA | NA | NA | NA | NA |
| MCM5 | NA | NA | NA | NA | NA | NA | NA | NA |
| MCM7 | NA | NA | NA | NA | NA | NA | NA | NA |
| MLLT1 | NA | NA | 1 | 2 | NA | NA | NA | NA |
| MRE11A | NA | NA | 2 | 3.4 | NA | NA | 1 | 1.5 |
| MSH6 | NA | NA | NA | NA | NA | NA | NA | NA |
| MTA2 | NA | NA | 1 | 1.5 | NA | NA | 1 | 1.5 |
| MTDH | 9 | 9.8 | 8 | 13.6 | NA | NA | 11 | 14.8 |
| MYBBP1A | 11 | 8.7 | 14 | 7.5 | NA | NA | NA | NA |
| MYCBP2 | NA | NA | NA | NA | NA | NA | NA | NA |
| MYO1C | 2 | 3.3 | 2 | 2.7 | NA | NA | 1 | 1.8 |
| NAT10 | 2 | 2.6 | 6 | 6.7 | NA | NA | 4 | 5.7 |
| NCBP1 | NA | NA | NA | NA | NA | NA | NA | NA |
| NCL | 46 | 22.3 | 76 | 30.4 | 5 | 4.1 | 63 | 24.2 |
| NCOR2 | NA | NA | NA | NA | NA | NA | NA | NA |
| NF2 | NA | NA | NA | NA | NA | NA | NA | NA |
| NFIC | NA | NA | 1 | 7.9 | NA | NA | NA | NA |
| NOC2L | 1 | 1.6 | 2 | 1.3 | NA | NA | NA | NA |
| NOC4L | 1 | 5 | NA | NA | NA | NA | NA | NA |
| NOLC1 | 5 | 5.6 | 4 | 6 | NA | NA | 3 | 5 |
| NOP56 | NA | NA | 22 | 16.2 | NA | NA | NA | NA |
| NOP58 | 9 | 12.1 | 17 | 19.8 | NA | NA | 6 | 11 |
| NSA2 | 1 | 5 | 1 | 5 | NA | NA | 1 | 5 |
| NUDT21 | NA | NA | NA | NA | NA | NA | NA | NA |
| NXF2 | NA | NA | NA | NA | NA | NA | NA | NA |
| PABPC1 | 7 | 6.9 | 4 | 6.8 | NA | NA | NA | NA |
| PAF1 | 2 | 5.8 | 2 | 5.8 | NA | NA | NA | NA |
| PAPD5 | NA | NA | 1 | 1.9 | NA | NA | NA | NA |
| PARP1 | 13 | 11 | 20 | 13.1 | NA | NA | 15 | 8.8 |
| PBRM1 | NA | NA | NA | NA | NA | NA | NA | NA |
| PCBP1 | NA | NA | 1 | 3.7 | NA | NA | 2 | 3.7 |
| PDCD11 | 3 | 2.8 | 9 | 2.8 | NA | NA | NA | NA |
| PDS5B | NA | NA | NA | NA | NA | NA | NA | NA |
| PES1 | 3 | 6.2 | 5 | 8.1 | NA | NA | 4 | 8.5 |
| PHAX | NA | NA | NA | NA | NA | NA | NA | NA |
| PHF8 | NA | NA | NA | NA | NA | NA | NA | NA |
| PKP1 | 4 | 4.3 | 1 | 1.5 | 2 | 2.1 | 5 | 7.9 |
| PNISR | NA | NA | NA | NA | NA | NA | NA | NA |
| PNN | 5 | 7.7 | 6 | 8.4 | NA | NA | 11 | 15.1 |
| PPIL4 | NA | NA | NA | NA | NA | NA | NA | NA |

-continued

| | | | | | | | | |
|---|---|---|---|---|---|---|---|---|
| PRKDC | 31 | 6.7 | NA | NA | NA | NA | NA | NA |
| PRPF19 | 1 | 2.2 | 2 | 9.3 | NA | NA | 2 | 9.3 |
| PRPF38A | 1 | 3.8 | NA | NA | NA | NA | NA | NA |
| PRPF38B | NA | NA | NA | NA | NA | NA | NA | NA |
| PRPF4 | NA | NA | 1 | 3.1 | NA | NA | NA | NA |
| PRPF40A | 5 | 5.2 | 8 | 6.9 | NA | NA | 10 | 8.4 |
| PRPF6 | 1 | 1.7 | 4 | 5.3 | NA | NA | 1 | 1 |
| PRPF8 | 9 | 3.3 | 27 | 9.7 | NA | NA | 12 | 5 |
| PSMA5 | NA | NA | NA | NA | NA | NA | 1 | 5.4 |
| PSMA6 | 1 | 12.1 | 1 | 12.1 | 2 | 12.1 | 3 | 12.1 |
| PSMA7 | NA | NA | 2 | 16.3 | NA | NA | NA | NA |
| PSMB1 | NA | NA | 2 | 11.6 | NA | NA | 3 | 11.6 |
| PSMB4 | NA | NA | NA | NA | NA | NA | 1 | 5.7 |
| PSMB6 | NA | NA | 1 | 4.6 | 1 | 4.6 | 1 | 4.6 |
| PSPC1 | NA | NA | 1 | 5.9 | NA | NA | 1 | 5.9 |
| PTBP1 | 5 | 12.4 | 22 | 18.5 | NA | NA | 19 | 14.7 |
| PTRF | 7 | 15.9 | 5 | 11.3 | NA | NA | 5 | 6.9 |
| PURB | 1 | 4.2 | 2 | 9.9 | NA | NA | NA | NA |
| PWP2 | NA | NA | NA | NA | NA | NA | NA | NA |
| RAD21 | 1 | 2.1 | NA | NA | NA | NA | NA | NA |
| RAD50 | 6 | 4.5 | 9 | 7.9 | NA | NA | NA | NA |
| RBBP4 | 3 | 6.9 | 3 | 5.1 | NA | NA | 4 | 6.9 |
| RBBP6 | NA | NA | NA | NA | NA | NA | NA | NA |
| RBM10 | NA | NA | NA | NA | NA | NA | NA | NA |
| RBM15 | 1 | 1.3 | NA | NA | NA | NA | 2 | 3.4 |
| RBM19 | 2 | 3 | NA | NA | NA | NA | NA | NA |
| RBM25 | 7 | 8.1 | 7 | 6.3 | NA | NA | 7 | 9.4 |
| RBM28 | 2 | 3.9 | 6 | 9.9 | NA | NA | 2 | 3.9 |
| RBM8A | 6 | 17.3 | 4 | 22 | NA | NA | 3 | 6.4 |
| RECQL | NA | NA | NA | NA | NA | NA | 2 | 1.7 |
| RFC1 | 1 | 1.6 | NA | NA | NA | NA | NA | NA |
| RFC2 | NA | NA | 1 | 5.3 | NA | NA | NA | NA |
| RNF40 | NA | NA | NA | NA | NA | NA | NA | NA |
| RPL11 | 8 | 13 | 5 | 13 | NA | NA | 5 | 13 |
| RPL3 | 37 | 25.8 | 14 | 23.1 | NA | NA | 26 | 25.8 |
| RPL5 | 1 | 4 | NA | NA | NA | NA | NA | NA |
| RPS10 | 3 | 14.5 | 2 | 13.9 | NA | NA | 1 | 5.5 |
| RPS19 | 4 | 28.3 | 6 | 28.3 | NA | NA | 5 | 21.4 |
| RPS3 | 19 | 38.3 | 28 | 52.3 | NA | NA | 27 | 40.3 |
| RRP1 | 3 | 7.4 | 4 | 7.4 | NA | NA | 3 | 7.4 |
| RRP1B | 1 | 1.5 | 2 | 4.1 | NA | NA | 1 | 2.6 |
| RRP9 | 3 | 5.9 | 1 | 2.1 | NA | NA | NA | NA |
| RRS1 | NA | NA | 10 | 13.4 | NA | NA | 6 | 13.4 |
| RUVBL1 | NA | NA | 1 | 3.5 | NA | NA | NA | NA |
| S100P | NA | NA | 1 | 13.7 | NA | NA | NA | NA |
| SART1 | 6 | 9.1 | 4 | 7.1 | 1 | 1.5 | 2 | 4 |
| SCAF1 | NA | NA | NA | NA | NA | NA | NA | NA |
| SERBP1 | 5 | 11.6 | 4 | 15.8 | NA | NA | 9 | 15.8 |
| SET | NA | NA | 2 | 9 | NA | NA | NA | NA |
| SF3A1 | 1 | 1.6 | 5 | 10.1 | NA | NA | 1 | 3 |
| SF3B1 | 4 | 3.3 | 5 | 5.7 | NA | NA | 4 | 4.1 |
| SF3B3 | 5 | 2.5 | 1 | 1.2 | NA | NA | NA | NA |
| SFN | NA | NA | 2 | 9.7 | NA | NA | NA | NA |
| SMC1A | 9 | 7.5 | 9 | 7.5 | NA | NA | 2 | 1.8 |
| SMC3 | 11 | 9.4 | 10 | 9.2 | NA | NA | 1 | 1 |
| SMCHD1 | NA | NA | 1 | 1.7 | NA | NA | NA | NA |
| SMU1 | NA | NA | 1 | 4.3 | NA | NA | NA | NA |
| SND1 | 5 | 4.2 | 5 | 6 | NA | NA | 7 | 6.5 |
| SNRNP200 | 23 | 7.9 | 21 | 7.9 | NA | NA | 17 | 6.9 |
| SNRNP40 | NA | NA | 2 | 10.6 | NA | NA | NA | NA |
| SNRPA1 | NA | NA | NA | NA | NA | NA | NA | NA |
| SNRPD3 | 1 | 8.3 | 3 | 15.8 | 1 | 8.3 | 3 | 15.8 |
| SP100 | 6 | 13.3 | NA | NA | NA | NA | NA | NA |
| SPATS2L | 5 | 14.7 | 4 | 8 | NA | NA | 2 | 4.3 |
| SPIN1 | NA | NA | NA | NA | 1 | 3.8 | NA | NA |
| SREK1 | 2 | 3.1 | 1 | 3.1 | NA | NA | 1 | 3.1 |
| SRRM2 | 23 | 7.3 | 23 | 8 | NA | NA | 31 | 11.5 |
| SRRT | 7 | 6.9 | 10 | 9.8 | NA | NA | 5 | 5.8 |
| SRSF1 | 16 | 31.3 | 21 | 31.3 | NA | NA | 15 | 37.8 |
| SRSF10 | 1 | 6.7 | NA | NA | NA | NA | 1 | 6.7 |
| SRSF3 | 4 | 13.7 | 5 | 13.7 | 1 | 7.3 | 2 | 7.3 |
| SRSF4 | 3 | 7.5 | 6 | 9.9 | NA | NA | 4 | 9.3 |
| SRSF6 | NA | NA | NA | NA | NA | NA | NA | NA |
| SRSF7 | 6 | 22.7 | 9 | 22.7 | 1 | 6.8 | 5 | 22.7 |
| SSB | 6 | 9.6 | 7 | 9.6 | NA | NA | NA | NA |
| SSRP1 | 3 | 4.1 | 7 | 10 | NA | NA | 2 | 3.8 |
| SUMO2 | 2 | 16.9 | 4 | 16.9 | NA | NA | 4 | 16.9 |
| SUPT16H | 10 | 11.6 | 17 | 12.4 | NA | NA | 9 | 8.4 |
| SURF6 | 1 | 3 | NA | NA | NA | NA | 1 | 3 |

-continued

| | | | | | | | | |
|---|---|---|---|---|---|---|---|---|
| TADA2B | 3 | 2.1 | 3 | 2.1 | NA | NA | 5 | 2.1 |
| TCEB3 | 2 | 4.1 | 2 | 2 | NA | NA | 1 | 2 |
| THRAP3 | 32 | 23.2 | 32 | 20.2 | 1 | 0.9 | 32 | 22.5 |
| TOP1 | 21 | 12.3 | 21 | 12.4 | NA | NA | 16 | 15 |
| TOP2A | 4 | 2.2 | 3 | 2.4 | NA | NA | 1 | 0.8 |
| TOP2B | NA | NA | NA | NA | NA | NA | NA | NA |
| TPR | 11 | 5.6 | 20 | 8.3 | NA | NA | 8 | 3.1 |
| TRA2A | 4 | 12.4 | 2 | 12.4 | NA | NA | 3 | 12.4 |
| TRA2B | 3 | 13.8 | 4 | 17.6 | NA | NA | 5 | 22.9 |
| TSPYL1 | NA | NA | NA | NA | NA | NA | NA | NA |
| TXN | 4 | 25.9 | 5 | 38.8 | NA | NA | 6 | 36.5 |
| U2AF1 | 4 | 8.8 | 2 | 5.4 | NA | NA | 3 | 8.8 |
| U2SURP | NA | NA | NA | NA | NA | NA | NA | NA |
| UBTF | 5 | 5.1 | 3 | 3.9 | NA | NA | 5 | 5.9 |
| UHRF1 | NA | NA | NA | NA | NA | NA | NA | NA |
| UTP18 | 1 | 1.9 | 1 | 1.9 | NA | NA | NA | NA |
| UTP3 | NA | NA | 1 | 1.9 | NA | NA | 1 | 1.9 |
| VCP | 1 | 2.1 | 5 | 6.7 | NA | NA | 3 | 2.1 |
| WDR12 | 1 | 5.9 | 2 | 5.9 | NA | NA | 2 | 5.9 |
| WDR36 | 1 | 1.3 | 1 | 1.3 | NA | NA | NA | NA |
| WDR43 | 1 | 1.6 | 1 | 1.6 | NA | NA | 1 | 1.6 |
| XRCC5 | 2 | 3.3 | 6 | 9 | NA | NA | 1 | 1.4 |
| XRN2 | 1 | 1.8 | 1 | 1.7 | NA | NA | 1 | 1.8 |
| YBX1 | 18 | 28.1 | 13 | 28.1 | NA | NA | 11 | 28.1 |
| YTHDC1 | NA | NA | 1 | 1 | NA | NA | 1 | 1 |
| ZC3H18 | NA | NA | NA | NA | NA | NA | 4 | 5 |
| ZC3HAV1 | NA | NA | 1 | 2.2 | NA | NA | NA | NA |
| ZCCHC17 | NA | NA | 1 | 6.5 | NA | NA | 1 | 6.5 |
| ZFP91 | 1 | 4.7 | 2 | 4.7 | NA | NA | 1 | 4.7 |
| ZIC4 | NA | NA | NA | NA | NA | NA | NA | NA |
| ZRANB2 | NA | NA | NA | NA | NA | NA | NA | NA |

[a] Each sample is derived from one FLAG-dCas9 immunoprecipitation carried out using a unique MB135 + gD4Z4- or gMYOD1-expressing cell line.
[b] In this case, the MB135 + gD4Z4-1 and MB135 + gD4Z4-3 cell lines were combined after trypsinization and the sample split for processing with either 1% or 2% formaldehyde.

Example 3

Gene ontology analysis of D4Z4-associated proteins. The table shows the gene ontology (GO) biological process categories enriched among the D4Z4-associated proteins identified by enChIP-MS, along with the number of observed versus expected proteins in each category and the associated fold enrichment score and p-value.

Gene ontology analysis of D4Z4-associated proteins.

| | | D4Z4-associated proteins | | | |
|---|---|---|---|---|---|
| GO biological process complete | *Homo sapiens* (REF) # | # | expected | Fold Enrichment | P value |
| DNA metabolism | | | | | |
| DNA duplex unwinding | 79 | 18 | 1.07 | 16.88 | 9.00E−13 |
| DNA replication | 216 | 19 | 2.91 | 6.52 | 1.83E−06 |
| negative regulation of DNA metabolic process | 115 | 13 | 1.55 | 8.38 | 7.59E−05 |
| DNA repair | 482 | 25 | 6.50 | 3.84 | 1.22E−04 |
| RNA metabolism | | | | | |
| RNA secondary structure unwinding | 44 | 13 | 0.59 | 21.89 | 6.67E−10 |
| positive regulation of DNA-templated transcription, elongation | 23 | 6 | 0.31 | 19.33 | 7.40E−03 |
| mRNA | | | | | |
| mRNA 3'-end processing | 71 | 16 | 0.96 | 16.70 | 5.45E−11 |
| termination of RNA polymerase II transcription | 62 | 14 | 0.84 | 16.73 | 2.64E−09 |
| regulation of alternative mRNA splicing, via spliceosome | 36 | 11 | 0.49 | 22.64 | 3.89E−08 |
| mRNA export from nucleus | 101 | 15 | 1.36 | 11.01 | 1.33E−07 |
| nuclear-transcribed mRNA catabolic process, nonsense-mediated decay | 119 | 11 | 1.61 | 6.85 | 7.49E−03 |
| positive regulation of mRNA processing | 22 | 6 | 0.30 | 20.21 | 5.73E−03 |
| negative regulation of mRNA splicing, via spliceosome | 20 | 6 | 0.27 | 22.23 | 3.31E−03 |
| mRNA stabilization | 31 | 7 | 0.42 | 16.73 | 2.36E−03 |
| mRNA cis splicing, via spliceosome | 18 | 5 | 0.24 | 20.59 | 4.55E−02 |
| mRNA splice site selection | 28 | 6 | 0.38 | 15.88 | 2.28E−02 |

Gene ontology analysis of D4Z4-associated proteins.

| GO biological process complete | Homo sapiens (REF) # | D4Z4-associated proteins | | | |
|---|---|---|---|---|---|
| | | # | expected | Fold Enrichment | P value |
| ncRNA | | | | | |
| maturation of SSU-rRNA from tricistronic rRNA transcript (SSU-rRNA, 5.8S rRNA, LSU-rRNA) | 36 | 8 | 0.49 | 16.47 | 3.73E−04 |
| maturation of LSU-rRNA | 24 | 6 | 0.32 | 18.53 | 9.44E−03 |
| maturation of 5.8S rRNA | 31 | 7 | 0.42 | 16.73 | 2.36E−03 |
| rRNA modification | 32 | 6 | 0.43 | 13.89 | 4.85E−02 |
| Protein metabolism | | | | | |
| ribosome assembly | 55 | 10 | 0.74 | 13.47 | 5.06E−05 |
| protein sumoylation | 116 | 11 | 1.57 | 7.03 | 5.86E−03 |
| regulation of translation | 340 | 18 | 4.59 | 3.92 | 1.01E−02 |
| Chromatin/nucleosome/epigenetics | | | | | |
| nucleosome assembly | 114 | 15 | 1.54 | 9.75 | 6.98E−07 |
| covalent chromatin modification | 459 | 23 | 6.19 | 3.71 | 8.61E−04 |
| chromatin silencing | 66 | 10 | 0.89 | 11.23 | 2.75E−04 |
| negative regulation of chromosome organization | 95 | 10 | 1.28 | 7.8 | 7.47E−03 |
| chromatin remodeling | 144 | 12 | 1.94 | 6.18 | 7.02E−03 |
| positive regulation of gene expression, epigenetic | 53 | 8 | 0.72 | 11.19 | 6.76E−03 |
| chromatin modification | 289 | 17 | 3.9 | 4.36 | 4.91E−03 |
| positive regulation of chromosome organization | 145 | 11 | 1.96 | 5.62 | 4.84E−02 |
| Telomere | | | | | |
| telomere maintenance via telomerase | 17 | 5 | 0.23 | 21.80 | 3.45E−02 |
| regulation of telomere maintenance | 66 | 8 | 0.89 | 8.98 | 3.37E−02 |
| Cell cycle | | | | | |
| mitotic M phase | 173 | 13 | 2.33 | 5.57 | 7.68E−03 |
| regulation of cell cycle phase transition | 320 | 18 | 4.32 | 4.17 | 4.31E−03 |
| mitotic cell cycle process | 749 | 33 | 10.11 | 3.27 | 2.95E−05 |
| regulation of mitotic cell cycle | 469 | 21 | 6.33 | 3.32 | 1.83E−02 |
| Viral/stress response | | | | | |
| viral process | 822 | 38 | 11.09 | 3.43 | 4.43E−07 |
| protein localization to cytoplasmic stress granule | 7 | 5 | 0.09 | 52.93 | 4.56E−04 |
| regulation of viral genome replication | 78 | 9 | 1.05 | 8.55 | 1.26E−02 |
| General | | | | | |
| multi-organism metabolic process | 138 | 11 | 1.86 | 5.91 | 3.05E−02 |
| nucleic acid phosphodiester bond hydrolysis | 275 | 16 | 3.71 | 4.31 | 1.21E−02 |

Example 4

Characteristics of myoblast cell lines used in this study. The table summarizes details of the muscle cell lines used for this study.

Characteristics of myoblast cell lines used in this study.

| CELL LINE | GROUP | PRIMARY CELL LINE IMMORTALIZED WITH CDK4 and hTERT? | DONOR AGE (AT TIME OF BIOPSY) | SEX | ALLELE 4₁ | |
|---|---|---|---|---|---|---|
| | | | | | NUMBER OF D4Z4 UNITS | LENGTH OF D4Z4 ARRAY (kb) |
| MB135 | Control (non-FSHD) | Yes | | Female | 74 | 250 |

Characteristics of myoblast cell lines used in this study.

| | | | | | | |
|---|---|---|---|---|---|---|
| MB2401 | Control (non-FSHD) | Yes | 58 | Male | 11 | 42 |
| MB073 | FSHD1 | Yes | 40 | Male | 8 | 31 |
| 54-2 | FSHD1 | Yes | 54 | Male | 3 | 17 |
| MB200 | FSHD2 | Yes | 44 | Male | 13 | 50 |
| 2305 | FSHD2 | No | 69 | Female | 11 | 43 |
| 2453 | FSHD2 | Yes | 29 | Male | 12 | 35 |
| 2338 | FSHD2 | Yes | 36 | Male | 12 | 46 |
| 1881 | FSHD2 | No | | Male | 15 | 55 |

| CELL LINE | ALLELE 4$_1$ ALLELE TYPE | ALLELE 4$_2$ NUMBER OF D4Z4 UNITS | ALLELE 4$_2$ LENGTH OF D4Z4 ARRAY (kb) | ALLELE 4$_2$ ALLELE TYPE | SMCHD1 MUTATION |
|---|---|---|---|---|---|
| MB135 | A161 | 18 | 65 | B163 | None |
| MB2401 | A161 | 21 | 74 | B168 | None |
| MB073 | A161 | | | | None |
| 54-2 | A161 | 23 | 80 | B | None |
| MB200 | A161 | 43 | 147 | B168 | c.610A > G |
| 2305 | A161 | 21 | 76 | A161 | c.4661T > C |
| 2453 | A161 | 18 | 54 | A161L | c.5720-2A > C |
| 2338 | A161 | 16 | 59 | A161 | 1.2 Mb deletion (including SMCHD1) on chromosome 18p |
| 1881 | A161 | 19 | 70 | A161 | c.3801 + 1G > A3 |

Example 5

Oligonucleotide sequences. The table lists all oligonucleotides used in this study, including gRNAs, siRNAs, shRNAs and primers used for enChIP-qPCR, ChIP-qPCR and RT-qPCR.

gRNAs

| NAME | | SEQUENCE |
|---|---|---|
| gD4Z4-1 | SEQ ID NO: 1 | GAACACCTGGCTGGCTACGG |
| gD4Z4-2 | SEQ ID NO: 2 | AGGGTGCTGTCCGAGGGTGT |
| gD4Z4-3 | SEQ ID NO: 3 | GTGAGCAACAGGCCGCCTTG |
| gMYOD1 | SEQ ID NO: 4 | AGGCATGGAGAGGTCTGAAA | enChIP-/ChIP-qPCR primers

| NAME | | SEQUENCE |
|---|---|---|
| Chr18q12 F | SEQ ID NO: 5 | GGTATGCCTGAGGTCTTTGG |
| Chr18q12 R | SEQ ID NO: 6 | ATTGGGGTTCAGTCTCATGG |
| D4Z4 3' F | SEQ ID NO: 7 | TGGGATTCCTGCCTTCTAGG |
| D4Z4 3' R | SEQ ID NO: 8 | GATGCCCAGGAAAGAATGG |
| D4Z4 5' F | SEQ ID NO: 9 | GGAGGCGTGATTTTGGTTTC |
| D4Z4 5' R | SEQ ID NO: 10 | ACCCTTCCTGCATGTTTC |
| D4Z4 ORF F | SEQ ID NO: 11 | CCGCGTCCGTCCGTGAAA |
| D4Z4 ORF R | SEQ ID NO: 12 | TCCGTCGCCGTCCTCGTC |
| MYOD1 DDR F | SEQ ID NO: 13 | AACCAGAAGGGTGATTCCAG |
| MYOD1 DDR R | SEQ ID NO: 14 | TTGTTTGCTACCAGGCTTCC |
| TMEM130 prom F | SEQ ID NO: 15 | GGGGTGGAAGCAGGAATC |
| TMEM130 prom R | SEQ ID NO: 16 | TTTCCCCTCTCCTTTCATCC | siRNAs

| NAME | | SEQUENCE |
|---|---|---|
| siCHAF1A-1 | SEQ ID NO: 17 | CACGCACGTTTCCACCCGGAA |
| siCHAF1A-2 | SEQ ID NO: 18 | TTCCGAGAACTCAGTGTATGA |
| siCHAF1B-1 | SEQ ID NO: 19 | ACGGAAAGTCTGGACCCTTGA |
| siCHAF1B-2 | SEQ ID NO: 20 | CTCCACCAAGTTCTGTACCAA |
| siCHD3-1 | SEQ ID NO: 21 | AGCGACAAGCGTAAAGTGAAA |
| siCHD3-2 | SEQ ID NO: 22 | CAGGCCATAAGAGGCGGAGTA |
| siCHD4-1 | SEQ ID NO: 23 | CATGAAGGTTATAAATACGAA |
| siCHD4-2 | SEQ ID NO: 24 | CAGCAAGAAGATCTAGCCCGA |
| siControl-1 | SEQ ID NO: 25 | AATTCTCCGAACGTGTCACGT |
| siControl-2 | SEQ ID NO: 26 | TGGTTTACATGTCGACTAA |
| siHDAC1-1 | SEQ ID NO: 27 | CACAGCGATGACTACATTAAA |
| siHDAC1-2 | SEQ ID NO: 28 | CACCCGGAGGAAAGTCTGTTA |
| siHDAC2-1 | SEQ ID NO: 29 | ACGGTCAATAAGACCAGATAA |
| siHDAC2-2 | SEQ ID NO: 30 | CTGGGTTGTTTCAATCTAACA |
| siKDM1A-1 | SEQ ID NO: 31 | CTGGAAATGACTATGATTTAA | siRNAs

| NAME | SEQUENCE |
|---|---|
| siKDM1A-2 SEQ ID NO: 32 | AGGCCTAGACATTAAACTGAA |
| siMBD1-1 SEQ ID NO: 33 | CAGGATCCGAAGCAAAGTTGA |
| siMBD1-2 SEQ ID NO: 34 | AAGACTGTCGAGCACAGAGAA |
| siMBD2-1 SEQ ID NO: 35 | GATGATGCCTAGTAAATTA |
| siMBD2-2 SEQ ID NO: 36 | GCGAAACGATCCTCTCAAT |
| siMBD3-1 SEQ ID NO: 37 | CGGGAAGAAGTTCCGCAGCAA |
| siMBD3-2 SEQ ID NO: 38 | GCCGGTGACCAAGATTACCAA |
| siSETDB1-1 SEQ ID NO: 39 | TCGGGTGGTCGCCAAATACAA |
| siTRIM28-1 SEQ ID NO: 40 | CAGGAGATGATCCCTACTCAA |
| siTRIM28-2 SEQ ID NO: 41 | AGCGTCCTGGCACTAACTCAA | shRNAs

| NAME | SEQUENCE |
|---|---|
| shMBD3L-1 SEQ ID NO: 42 | GGGCTTTACAGAAGAAACG |
| shMBD3L-2 SEQ ID NO: 43 | AGGTTCAAGTCCACTGCAT |

RT-qPCR primers

| NAME | SEQUENCE |
|---|---|
| AFP F SEQ ID NO: 44 | AGTGAGGACAAACTATTGGCCT |
| AFP R SEQ ID NO: 45 | ACACCAGGGTTTACTGGAGTC |
| CDX2 F SEQ ID NO: 46 | GGAACCTGTGCGAGTGGAT |
| CDX2 R SEQ ID NO: 47 | TCGATATTTGTCTTTCGTCCTG |
| CHAF1A F SEQ ID NO: 48 | AGCACAGCAGTACCAGTCCC |
| CHAF1A R SEQ ID NO: 49 | CTTCTCTGTAGAGCCTTTGACGA |
| CHAF1B F SEQ ID NO: 50 | TGTTGTGCGTTTTTCTCCAA |
| CHAF1B R SEQ ID NO: 51 | TCGTCCTCATCCTGAAAAGC |
| CHD3 F SEQ ID NO: 52 | CCAACTACAAAGCCTTCAGCC |
| CHD3 R SEQ ID NO: 53 | GGGTTGTTGGCACTGAACTC |
| CHD4 F SEQ ID NO: 54 | CACTTTTGAACAACAGCCTGC |
| CHD4 R SEQ ID NO: 55 | TCCCGAGGTTTCTTAGGCTT |
| DUX4 F SEQ ID NO: 56 | CGGAGAACTGCCATTCTTTC |
| DUX4 R SEQ ID NO: 57 | CAGCCAGAATTTCACGGAAG |
| DUX4L R SEQ ID NO: 58 | GTAGAAGACCAGAGCGAGACCCCAGAGAG |

RT-qPCR primers

| NAME | SEQUENCE |
|---|---|
| GAPDH F SEQ ID NO: 59 | GTGAAGGTCGGAGTCAAC |
| GAPDH R SEQ ID NO: 60 | TGAGGTCAATGAAGGGGTC |
| HDAC1 F SEQ ID NO: 61 | TAAATTCTTGCGCTCCATCC |
| HDAC1 R SEQ ID NO: 62 | CAGGCCATCGAATACTGGAC |
| HDAC2 F SEQ ID NO: 63 | ATTGTGCTTGCCATCCTTGA |
| HDAC2 R SEQ ID NO: 64 | AAGCTTCTTCAACACCATCACC |
| KDM1A F SEQ ID NO: 65 | GGCAGCAGCTCGACAGTTAC |
| KDM1A R SEQ ID NO: 66 | GTTTCCTTTGCGAAATGTGG |
| KDR F SEQ ID NO: 67 | GTGATCGGAAATGACACTGGAG |
| KDR R SEQ ID NO: 68 | CATGTTGGTCACTAACAGAAGCA |
| MBD1 F SEQ ID NO: 69 | AAGTCTTTCGCAAGTCAGGGG |
| MBD1 R SEQ ID NO: 70 | TCAGCTCAACTTTGCTTCGGA |
| MBD2 F SEQ ID NO: 71 | AGAGACTGCGAAACGATCCTC |
| MBD2 R SEQ ID NO: 72 | GCTGACGTGGCTGTTCATTC |
| MBD3 F SEQ ID NO: 73 | CTGGGAGAGGGAAGAAGTGC |
| MBD3 R SEQ ID NO: 74 | AAGTCGAAGGTGCTCAGGTC |
| MBD3L2 F SEQ ID NO: 75 | GCGTTCACCTCTTTTCCAAG |
| MBD3L2 R SEQ ID NO: 76 | GCCATGTGGATTTCTCGTTT |
| NCAM1 F SEQ ID NO: 77 | GCCAGGAGACAGAAACGAAG |
| NCAM1 R SEQ ID NO: 78 | GGTGTTGGAAATGCTCTGGT |
| OCT4 F SEQ ID NO: 79 | GACAGGGGGAGGGGAGGAGCTAGG |
| OCT4 R SEQ ID NO: 80 | CTTCCCTCCAACCAGTTGCCCCAAAC |

RT-qPCR primers

| NAME | SEQUENCE |
|---|---|
| pCW57.1 transgene F SEQ ID NO: 81 | TGACTGGATATGTTGTGTTTTAC |
| pCW57.1 transgene R SEQ ID NO: 82 | CAACCCCGGATCCTTAGTG |
| RPL13A F SEQ ID NO: 83 | AACCTCCTCCTTTTCCAAGC |
| RPL13A R SEQ ID NO: 84 | GCAGTACCTGTTTAGCCACGA |
| RPL27 F SEQ ID NO: 85 | GCAAGAAGAAGATCGCCAAG |
| RPL27 R SEQ ID NO: 86 | TCCAAGGGGATATCCACAGA |
| SETDB1 F SEQ ID NO: 87 | CAGAACAAGGGCTGGGGTAT |

| RT-qPCR primers | |
|---|---|
| NAME | SEQUENCE |
| SETDB1 R SEQ ID NO: 88 | TCATCACCCATTTCCAGACC |
| TMEM130 F SEQ ID NO: 89 | AAGACCGCCTTGTTTCTCTACA |
| TMEM130 R SEQ ID NO: 90 | TGAAGGTCCCGATGATGGAATA |
| TRIM28 F SEQ ID NO: 91 | TGAGACCTGTGTAGAGGCG |
| TRIM28 R SEQ ID NO: 92 | CGTTCACCATCCCGAGACTT |
| TRIM43 F SEQ ID NO: 93 | ACCCATCACTGGACTGGTGT |
| TRIM43 R SEQ ID NO: 94 | CACATCCTCAAAGAGCCTGA |

| RT-qPCR primers | |
|---|---|
| NAME | SEQUENCE |
| ZSCAN4 F SEQ ID NO: 95 | TGGAAATCAAGTGGCAAAAA |
| ZSCAN4 R SEQ ID NO: 96 | CTGCATGTGGACGTGGAC |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of treating facioscapulohumeral muscular dystrophy (FSHD) in a subject in need thereof, comprising administering to the subject an effective amount of a short hairpin RNA (shRNA) to inhibit methyl-CpG-binding domain protein 3 like-1 (MBD3L) family RNA to treat one or more signs or symptoms associated with FSHD, wherein the shRNA consists of the nucleic acid sequence of SEQ ID NO: 42 or SEQ ID NO: 43, and wherein the MBD3L family RNA comprises methyl-CpG binding domain protein 3 like 1 (MBD3L1) or methyl-CpG binding domain protein 3 like 2 (MBD3L2).

2. The method of claim 1, wherein administering the shRNA to the subject comprises injecting the shRNA into a muscle of the subject.

3. The method of claim 2, wherein the muscle is skeletal muscle.

4. The method of claim 1, further comprising selecting the subject with, or believed to have, FSHD.

* * * * *

SEQUENCE LISTING

```
<160> NUMBER OF SEQ ID NOS: 96

<210> SEQ ID NO 1
<211> LENGTH: 20
<212> TYPE: DNA
<213> ORGANISM: Artificial Sequence
<220> FEATURE:
<223> OTHER INFORMATION: Synthetic oligonucleotide gRNA

<400> SEQUENCE: 1
gaacacctgg ctggctacgg                                                   20

<210> SEQ ID NO 2
<211> LENGTH: 20
<212> TYPE: DNA
<213> ORGANISM: Artificial Sequence
<220> FEATURE:
<223> OTHER INFORMATION: Synthetic oligonucleotide gRNA

<400> SEQUENCE: 2
agggtgctgt ccgagggtgt                                                   20

<210> SEQ ID NO 3
<211> LENGTH: 20
<212> TYPE: DNA
<213> ORGANISM: Artificial Sequence
<220> FEATURE:
<223> OTHER INFORMATION: Synthetic oligonucleotide gRNA

<400> SEQUENCE: 3
gtgagcaaca ggccgccttg                                                   20

<210> SEQ ID NO 4
<211> LENGTH: 20
<212> TYPE: DNA
<213> ORGANISM: Artificial Sequence
<220> FEATURE:
<223> OTHER INFORMATION: Synthetic oligonucleotide gRNA

<400> SEQUENCE: 4
aggcatggag aggtctgaaa                                                   20

<210> SEQ ID NO 5
<211> LENGTH: 20
<212> TYPE: DNA
<213> ORGANISM: Artificial Sequence
<220> FEATURE:
```

<223> OTHER INFORMATION: Synthetic oligonucleotide primer

<400> SEQUENCE: 5
ggtatgcctg aggtctttgg                                                    20

<210> SEQ ID NO 6
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 6
attggggttc agtctcatgg                                                    20

<210> SEQ ID NO 7
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 7
tgggattcct gccttctagg                                                    20

<210> SEQ ID NO 8
<211> LENGTH: 19
<212> TYPE: DNA
<213> ORGANISM: Artificial Sequence
<220> FEATURE:
<223> OTHER INFORMATION: Synthetic oligonucleotide primer

<400> SEQUENCE: 8
gatgcccagg aaagaatgg                                                     19

<210> SEQ ID NO 9
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 9
ggaggcgtga ttttggtttc                                                    20

<210> SEQ ID NO 10
<211> LENGTH: 19
<212> TYPE: DNA
<213> ORGANISM: Artificial Sequence
<220> FEATURE:
<223> OTHER INFORMATION: Synthetic oligonucleotide primer

<400> SEQUENCE: 10
acccttccct gcatgtttc                                                     19

<210> SEQ ID NO 11
<211> LENGTH: 18
<212> TYPE: DNA
<213> ORGANISM: Artificial Sequence
<220> FEATURE:
<223> OTHER INFORMATION: Synthetic oligonucleotide primer

<400> SEQUENCE: 11
ccgcgtccgt ccgtgaaa                                                      18

```
<210> SEQ ID NO 12
<211> LENGTH: 18
<212> TYPE: DNA
<213> ORGANISM: Artificial Sequence
<220> FEATURE:
<223> OTHER INFORMATION: Synthetic oligonucleotide primer

<400> SEQUENCE: 12
tccgtcgccg tcctcgtc                                                 18

<210> SEQ ID NO 13
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 13
aaccagaagg gtgattccag                                               20

<210> SEQ ID NO 14
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 14
ttgtttgcta ccaggcttcc                                               20

<210> SEQ ID NO 15
<211> LENGTH: 18
<212> TYPE: DNA
<213> ORGANISM: Artificial Sequence
<220> FEATURE:
<223> OTHER INFORMATION: Synthetic oligonucleotide primer

<400> SEQUENCE: 15
ggggtggaag caggaatc                                                 18

<210> SEQ ID NO 16
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 16
tttcccctct cctttcatcc                                               20

<210> SEQ ID NO 17
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 17
cacgcacgtt tccacccgga a                                             21

<210> SEQ ID NO 18
<211> LENGTH: 21
<212> TYPE: DNA
<213> ORGANISM: Artificial Sequence
<220> FEATURE:
<223> OTHER INFORMATION: Synthetic oligonucleotide siRNA
```

```
<400> SEQUENCE: 18
ttccgagaac tcagtgtatg a                                              21

<210> SEQ ID NO 19
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 19
acggaaagtc tggacccttg a                                              21

<210> SEQ ID NO 20
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 20
ctccaccaag ttctgtacca a                                              21

<210> SEQ ID NO 21
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 21
agcgacaagc gtaaagtgaa a                                              21

<210> SEQ ID NO 22
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 22
caggccataa gaggcggagt a                                              21

<210> SEQ ID NO 23
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 23
catgaaggtt ataaatacga a                                              21

<210> SEQ ID NO 24
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 24
cagcaagaag atctagcccg a                                              21

<210> SEQ ID NO 25
<211> LENGTH: 21
```

```
<212> TYPE: DNA
<213> ORGANISM: Artificial Sequence
<220> FEATURE:
<223> OTHER INFORMATION: Synthetic oligonucleotide siRNA

<400> SEQUENCE: 25
aattctccga acgtgtcacg t                                              21

<210> SEQ ID NO 26
<211> LENGTH: 19
<212> TYPE: DNA
<213> ORGANISM: Artificial Sequence
<220> FEATURE:
<223> OTHER INFORMATION: Synthetic oligonucleotide siRNA

<400> SEQUENCE: 26
tggtttacat gtcgactaa                                                 19

<210> SEQ ID NO 27
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 27
cacagcgatg actacattaa a                                              21

<210> SEQ ID NO 28
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 28
cacccggagg aaagtctgtt a                                              21

<210> SEQ ID NO 29
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 29
acggtcaata agaccagata a                                              21

<210> SEQ ID NO 30
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 30
ctgggttgtt tcaatctaac a                                              21

<210> SEQ ID NO 31
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 31
```

```
ctggaaatga ctatgattta a                                              21

<210> SEQ ID NO 32
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 32
aggcctagac attaaactga a                                              21

<210> SEQ ID NO 33
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 33
caggatccga agcaaagttg a                                              21

<210> SEQ ID NO 34
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 34
aagactgtcg agcacagaga a                                              21

<210> SEQ ID NO 35
<211> LENGTH: 19
<212> TYPE: DNA
<213> ORGANISM: Artificial Sequence
<220> FEATURE:
<223> OTHER INFORMATION: Synthetic oligonucleotide siRNA

<400> SEQUENCE: 35
gatgatgcct agtaaatta                                                 19

<210> SEQ ID NO 36
<211> LENGTH: 19
<212> TYPE: DNA
<213> ORGANISM: Artificial Sequence
<220> FEATURE:
<223> OTHER INFORMATION: Synthetic oligonucleotide siRNA

<400> SEQUENCE: 36
gcgaaacgat cctctcaat                                                 19

<210> SEQ ID NO 37
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 37
cgggaagaag ttccgcagca a                                              21

<210> SEQ ID NO 38
<211> LENGTH: 21
<212> TYPE: DNA
<213> ORGANISM: Artificial Sequence
```

```
<220> FEATURE:
<223> OTHER INFORMATION: Synthetic oligonucleotide siRNA

<400> SEQUENCE: 38
gccggtgacc aagattacca a                                              21

<210> SEQ ID NO 39
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 39
tcgggtggtc gccaaataca a                                              21

<210> SEQ ID NO 40
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 40
caggagatga tccctactca a                                              21

<210> SEQ ID NO 41
<211> LENGTH: 21
<212> TYPE: DNA
<213> ORGANISM: Artificial Sequence
<220> FEATURE:
<223> OTHER INFORMATION: Synthetic oligonucleotide siRNA

<400> SEQUENCE: 41
agcgtcctgg cactaactca a                                              21

<210> SEQ ID NO 42
<211> LENGTH: 19
<212> TYPE: DNA
<213> ORGANISM: Artificial Sequence
<220> FEATURE:
<223> OTHER INFORMATION: Synthetic oligonucleotide shRNA

<400> SEQUENCE: 42
gggctttaca gaagaaacg                                                 19

<210> SEQ ID NO 43
<211> LENGTH: 19
<212> TYPE: DNA
<213> ORGANISM: Artificial Sequence
<220> FEATURE:
<223> OTHER INFORMATION: Synthetic oligonucleotide shRNA

<400> SEQUENCE: 43
aggttcaagt ccactgcat                                                 19

<210> SEQ ID NO 44
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 44
agtgaggaca aactattggc ct                                             22
```

```
<210> SEQ ID NO 45
<211> LENGTH: 21
<212> TYPE: DNA
<213> ORGANISM: Artificial Sequence
<220> FEATURE:
<223> OTHER INFORMATION: Synthetic oligonucleotide primer

<400> SEQUENCE: 45
acaccagggt ttactggagt c                                              21

<210> SEQ ID NO 46
<211> LENGTH: 19
<212> TYPE: DNA
<213> ORGANISM: Artificial Sequence
<220> FEATURE:
<223> OTHER INFORMATION: Synthetic oligonucleotide primer

<400> SEQUENCE: 46
ggaacctgtg cgagtggat                                                 19

<210> SEQ ID NO 47
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 47
tcgatatttg tctttcgtcc tg                                             22

<210> SEQ ID NO 48
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 48
agcacagcag taccagtccc                                                20

<210> SEQ ID NO 49
<211> LENGTH: 23
<212> TYPE: DNA
<213> ORGANISM: Artificial Sequence
<220> FEATURE:
<223> OTHER INFORMATION: Synthetic oligonucleotide primer

<400> SEQUENCE: 49
cttctctgta gagcctttga cga                                            23

<210> SEQ ID NO 50
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 50
tgttgtgcgt ttttctccaa                                                20

<210> SEQ ID NO 51
<211> LENGTH: 20
<212> TYPE: DNA
<213> ORGANISM: Artificial Sequence
<220> FEATURE:
<223> OTHER INFORMATION: Synthetic oligonucleotide primer
```

<400> SEQUENCE: 51
tcgtcctcat cctgaaaagc                                                         20

<210> SEQ ID NO 52
<211> LENGTH: 21
<212> TYPE: DNA
<213> ORGANISM: Artificial Sequence
<220> FEATURE:
<223> OTHER INFORMATION: Synthetic oligonucleotide primer

<400> SEQUENCE: 52
ccaactacaa agccttcagc c                                                       21

<210> SEQ ID NO 53
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 53
gggttgttgg cactgaactc                                                         20

<210> SEQ ID NO 54
<211> LENGTH: 21
<212> TYPE: DNA
<213> ORGANISM: Artificial Sequence
<220> FEATURE:
<223> OTHER INFORMATION: Synthetic oligonucleotide primer

<400> SEQUENCE: 54
cacttttgaa caacagcctg c                                                       21

<210> SEQ ID NO 55
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 55
tcccgaggtt tcttaggctt                                                         20

<210> SEQ ID NO 56
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 56
cggagaactg ccattctttc                                                         20

<210> SEQ ID NO 57
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 57
cagccagaat ttcacggaag                                                         20

<210> SEQ ID NO 58

```
<211> LENGTH: 29
<212> TYPE: DNA
<213> ORGANISM: Artificial Sequence
<220> FEATURE:
<223> OTHER INFORMATION: Synthetic oligonucleotide primer

<400> SEQUENCE: 58
gtagaagacc agagcgagac cccagagag                                    29

<210> SEQ ID NO 59
<211> LENGTH: 18
<212> TYPE: DNA
<213> ORGANISM: Artificial Sequence
<220> FEATURE:
<223> OTHER INFORMATION: Synthetic oligonucleotide primer

<400> SEQUENCE: 59
gtgaaggtcg gagtcaac                                                18

<210> SEQ ID NO 60
<211> LENGTH: 19
<212> TYPE: DNA
<213> ORGANISM: Artificial Sequence
<220> FEATURE:
<223> OTHER INFORMATION: Synthetic oligonucleotide primer

<400> SEQUENCE: 60
tgaggtcaat gaaggggtc                                               19

<210> SEQ ID NO 61
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 61
taaattcttg cgctccatcc                                              20

<210> SEQ ID NO 62
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 62
caggccatcg aatactggac                                              20

<210> SEQ ID NO 63
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 63
attgtgcttg ccatccttga                                              20

<210> SEQ ID NO 64
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 64
```
aagcttcttc aacaccatca cc                                              22

<210> SEQ ID NO 65
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 65
ggcagcagct cgacagttac                                                 20

<210> SEQ ID NO 66
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 66
gtttcctttg cgaaatgtgg                                                 20

<210> SEQ ID NO 67
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 67
gtgatcggaa atgacactgg ag                                              22

<210> SEQ ID NO 68
<211> LENGTH: 23
<212> TYPE: DNA
<213> ORGANISM: Artificial Sequence
<220> FEATURE:
<223> OTHER INFORMATION: Synthetic oligonucleotide primer

<400> SEQUENCE: 68
catgttggtc actaacagaa gca                                             23

<210> SEQ ID NO 69
<211> LENGTH: 21
<212> TYPE: DNA
<213> ORGANISM: Artificial Sequence
<220> FEATURE:
<223> OTHER INFORMATION: Synthetic oligonucleotide primer

<400> SEQUENCE: 69
aagtctttcg caagtcaggg g                                               21

<210> SEQ ID NO 70
<211> LENGTH: 21
<212> TYPE: DNA
<213> ORGANISM: Artificial Sequence
<220> FEATURE:
<223> OTHER INFORMATION: Synthetic oligonucleotide primer

<400> SEQUENCE: 70
tcagctcaac tttgcttcgg a                                               21

<210> SEQ ID NO 71
<211> LENGTH: 21
<212> TYPE: DNA

```
<213> ORGANISM: Artificial Sequence
<220> FEATURE:
<223> OTHER INFORMATION: Synthetic oligonucleotide primer

<400> SEQUENCE: 71
agagactgcg aaacgatcct c                                      21

<210> SEQ ID NO 72
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 72
gctgacgtgg ctgttcattc                                        20

<210> SEQ ID NO 73
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 73
ctgggagagg gaagaagtgc                                        20

<210> SEQ ID NO 74
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 74
aagtcgaagg tgctcaggtc                                        20

<210> SEQ ID NO 75
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 75
gcgttcacct cttttccaag                                        20

<210> SEQ ID NO 76
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 76
gccatgtgga tttctcgttt                                        20

<210> SEQ ID NO 77
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 77
gccaggagac agaaacgaag                                        20
```

```
<210> SEQ ID NO 78
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 78
ggtgttggaa atgctctggt                                              20

<210> SEQ ID NO 79
<211> LENGTH: 24
<212> TYPE: DNA
<213> ORGANISM: Artificial Sequence
<220> FEATURE:
<223> OTHER INFORMATION: Synthetic oligonucleotide primer

<400> SEQUENCE: 79
gacaggggga ggggaggagc tagg                                         24

<210> SEQ ID NO 80
<211> LENGTH: 26
<212> TYPE: DNA
<213> ORGANISM: Artificial Sequence
<220> FEATURE:
<223> OTHER INFORMATION: Synthetic oligonucleotide primer

<400> SEQUENCE: 80
cttccctcca accagttgcc ccaaac                                       26

<210> SEQ ID NO 81
<211> LENGTH: 23
<212> TYPE: DNA
<213> ORGANISM: Artificial Sequence
<220> FEATURE:
<223> OTHER INFORMATION: Synthetic oligonucleotide primer

<400> SEQUENCE: 81
tgactggata tgttgtgttt tac                                          23

<210> SEQ ID NO 82
<211> LENGTH: 19
<212> TYPE: DNA
<213> ORGANISM: Artificial Sequence
<220> FEATURE:
<223> OTHER INFORMATION: Synthetic oligonucleotide primer

<400> SEQUENCE: 82
caaccccgga tccttagtg                                               19

<210> SEQ ID NO 83
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 83
aacctcctcc ttttccaagc                                              20

<210> SEQ ID NO 84
<211> LENGTH: 21
<212> TYPE: DNA
<213> ORGANISM: Artificial Sequence
<220> FEATURE:
```

<223> OTHER INFORMATION: Synthetic oligonucleotide primer

<400> SEQUENCE: 84
gcagtacctg tttagccacg a    21

<210> SEQ ID NO 85
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 85
gcaagaagaa gatcgccaag    20

<210> SEQ ID NO 86
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 86
tccaagggga tatccacaga    20

<210> SEQ ID NO 87
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 87
cagaacaagg gctggggtat    20

<210> SEQ ID NO 88
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 88
tcatcaccca tttccagacc    20

<210> SEQ ID NO 89
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 89
aagaccgcct tgtttctcta ca    22

<210> SEQ ID NO 90
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 90
tgaaggtccc gatgatggaa ta    22

```
<210> SEQ ID NO 91
<211> LENGTH: 19
<212> TYPE: DNA
<213> ORGANISM: Artificial Sequence
<220> FEATURE:
<223> OTHER INFORMATION: Synthetic oligonucleotide primer

<400> SEQUENCE: 91
tgagacctgt gtagaggcg                                                   19

<210> SEQ ID NO 92
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 92
cgttcaccat cccgagactt                                                  20

<210> SEQ ID NO 93
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 93
acccatcact ggactggtgt                                                  20

<210> SEQ ID NO 94
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 94
cacatcctca aagagcctga                                                  20

<210> SEQ ID NO 95
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 95
tggaaatcaa gtggcaaaaa                                                  20

<210> SEQ ID NO 96
<211> LENGTH: 18
<212> TYPE: DNA
<213> ORGANISM: Artificial Sequence
<220> FEATURE:
<223> OTHER INFORMATION: Synthetic oligonucleotide primer

<400> SEQUENCE: 96
ctgcatgtgg acgtggac                                                    18
```